US012801676B2

(12) United States Patent
Sahoo

(10) Patent No.: US 12,801,676 B2
(45) Date of Patent: Nov. 17, 2026

(54) SYSTEMS AND METHODS FOR PERFORMING AI-DRIVEN RELEVANCY SEARCH

(71) Applicant: Ingram Micro Inc., Irvine, CA (US)

(72) Inventor: Sanjib Sahoo, Naperville, IL (US)

(73) Assignee: Ingram Micro Inc., Irvine, CA (US)

( * ) Notice: Subject to any disclaimer, the term of this patent is extended or adjusted under 35 U.S.C. 154(b) by 0 days.

(21) Appl. No.: 19/200,538

(22) Filed: May 6, 2025

(65) Prior Publication Data

US 2025/0265299 A1 Aug. 21, 2025

Related U.S. Application Data

(63) Continuation-in-part of application No. 18/349,836, filed on Jul. 10, 2023, and a continuation-in-part of application No. 18/341,714, filed on Jun. 26, 2023.

(51) Int. Cl.
*G06Q 10/087* (2023.01)
*G06F 16/9535* (2019.01)
(Continued)

(52) U.S. Cl.
CPC ....... *G06F 16/9535* (2019.01); *G06Q 10/087* (2013.01); *G06Q 30/0201* (2013.01); *G06Q 30/0246* (2013.01); *G06Q 30/0641* (2013.01)

(58) Field of Classification Search
CPC ............ G06F 16/9535; G06Q 30/0641; G06Q 30/0246; G06Q 30/0201; G06Q 10/087
See application file for complete search history.

(56) References Cited

U.S. PATENT DOCUMENTS 5,237,495 A 8/1993 Morii
5,515,269 A 5/1996 Willis
(Continued)

FOREIGN PATENT DOCUMENTS

AU 2019101249 A4 11/2019
AU 2022256517 A1 11/2023
(Continued)

OTHER PUBLICATIONS

BasuMallick. "What Is a Software Engine? Types, Applications, and Importance". Oct. 7, 2022. URL Link: <https://www.spiceworks.com/tech/devops/articles/what-is-software-engine/> Accessed Sep. 2024. (Year: 2022).
(Continued)

*Primary Examiner* — Etienne P Leroux
(74) *Attorney, Agent, or Firm* — Ice Miller LLP

(57) ABSTRACT

Computerized systems and methods are described for enhancing search capabilities and user engagement within technology distribution platforms. The system integrates components including Real-Time Data Mesh, Single Pane of Glass User Interface, Advanced Analytics and Machine-Learning Module, and Relevancy Search Engine Module, Embodiments aggregate real-time data from multiple sources, standardize it for efficient processing, and utilize advanced analytics and machine learning models to optimize search results. A Relevancy Search Engine prioritizes search results based on relevancy scores using machine learning models and natural language processing. A Dynamic SKU Search Engine enables dynamic and responsive search functionalities personalized to user needs. A Personalization Engine provides personalized recommendations based on user profiles and interactions. A Real-Time Relevancy Adjustment Module ensures continuous optimization of search relevancy. Methods include initiating enhancement
(Continued)

processes, analyzing search queries, processing data, and adjusting relevancy in real-time. Impact is measured using performance indicators.

18 Claims, 28 Drawing Sheets

(51) Int. Cl.
*G06Q 30/0201* (2023.01)
*G06Q 30/0242* (2023.01)
*G06Q 30/0601* (2023.01)

(56) References Cited

U.S. PATENT DOCUMENTS 5,870,717 A 2/1999 Wiecha
5,870,719 A 2/1999 Maritzen
6,093,559 A 7/2000 Bookbinder et al.
6,167,383 A 12/2000 Henson
6,272,472 B1 8/2001 Danneels
6,385,543 B1 5/2002 Keiser
7,024,459 B2 4/2006 McNamara
7,039,604 B1 5/2006 Srinivasan
7,065,499 B1 6/2006 Seth
7,085,729 B1 8/2006 Kennedy
7,130,853 B2 10/2006 Roller
7,151,438 B1 12/2006 Hall
7,188,075 B1 3/2007 Smirnov
7,302,405 B2 11/2007 Hoskin
7,471,990 B2 12/2008 Hotta
7,548,612 B2 6/2009 Weissman
7,584,155 B1 9/2009 Carter, III
7,698,170 B1 4/2010 Darr
7,720,720 B1 5/2010 Sharma
7,809,601 B2 10/2010 Shaya et al.
7,912,899 B2 3/2011 Beauchamp
8,015,021 B2 * 9/2011 Boyle .................. H04L 67/306
709/229
8,024,059 B2 9/2011 Kienzle
8,024,217 B2 9/2011 Sadre
8,069,435 B1 11/2011 Lai
8,091,065 B2 1/2012 Mir et al.
8,127,278 B2 2/2012 Bohle
8,237,792 B2 8/2012 Uehara
8,255,454 B2 8/2012 Broda
8,301,522 B2 10/2012 Sun
8,311,863 B1 11/2012 Kemp
8,386,296 B2 2/2013 Hage
8,386,299 B2 2/2013 Kumble
8,443,036 B2 5/2013 Li et al.
8,452,636 B1 5/2013 Verastigui
D685,812 S 7/2013 Bork et al.
8,589,444 B2 11/2013 Alcorn
8,738,421 B1 * 5/2014 Ali .................... G06Q 30/0223
705/28
8,781,882 B1 7/2014 Arboletti
D718,324 S 11/2014 Lee et al.
8,914,544 B2 12/2014 Lalji et al.
D733,176 S 6/2015 Lin
9,063,943 B1 6/2015 Smith
D748,661 S 2/2016 Addaguduru
9,317,807 B1 4/2016 Staddon
9,390,089 B2 7/2016 Pitzo et al.
9,390,428 B2 7/2016 Rehman et al.
D766,285 S 9/2016 Yang
D779,514 S 2/2017 Baris et al.
9,652,530 B1 5/2017 Bendersky et al.
9,727,906 B1 8/2017 Sarmento
9,727,909 B2 8/2017 Mackay
9,781,212 B2 10/2017 Briere
9,792,597 B1 10/2017 Jen
9,805,412 B1 10/2017 Joseph
9,958,291 B1 5/2018 Shunturov
9,959,551 B1 5/2018 Schermerhorn
9,965,526 B1 5/2018 Chanda
D820,296 S 6/2018 Aufmann et al.
D823,326 S 7/2018 Pinzon Garcia et al.
10,078,843 B2 9/2018 Dadia et al.
10,108,974 B1 10/2018 Shariff et al.
10,114,964 B2 10/2018 Ramesh
D833,459 S 11/2018 Blechschmidt et al.
D834,605 S 11/2018 Blechschmidt et al.
10,134,003 B1 11/2018 Loyens
10,146,751 B1 * 12/2018 Zhang .................. G06F 16/313
10,277,672 B2 4/2019 Kung
D851,110 S 6/2019 Bang et al.
D854,030 S 7/2019 Dascola et al.
10,354,239 B1 7/2019 Nguyen et al.
10,373,105 B2 8/2019 Feng
D858,545 S 9/2019 Hazam et al.
10,410,125 B1 9/2019 Finkelstein
10,417,728 B1 9/2019 Yoggi
10,489,845 B2 11/2019 Mullakkara Azhuvath
10,592,852 B1 3/2020 Karipides
D880,498 S 4/2020 Shahidi et al.
D880,518 S 4/2020 Martell et al.
10,616,347 B1 4/2020 Van Oort et al.
10,650,449 B2 5/2020 Courbage
10,664,799 B2 5/2020 O'Brien
10,693,824 B2 * 6/2020 Silva ...................... H04L 51/04
10,699,329 B2 6/2020 Zakula
D890,199 S 7/2020 Kumar et al.
10,718,632 B1 7/2020 Platt
10,757,154 B1 8/2020 Jacobs
D898,759 S 10/2020 Carrigan et al.
D902,227 S 11/2020 Burnell et al.
10,839,029 B2 * 11/2020 Lawrence ......... G06F 16/24578
10,861,077 B1 12/2020 Liu
10,891,105 B1 1/2021 Gates et al.
10,893,036 B2 1/2021 Chang et al.
D912,694 S 3/2021 Clarke et al.
D914,040 S 3/2021 Butka et al.
D916,767 S 4/2021 Vansickler et al.
D916,781 S 4/2021 Conaway
D920,351 S 5/2021 Zhang
11,036,713 B2 6/2021 Inturi
11,062,319 B1 7/2021 Hecht
11,074,643 B1 7/2021 Ellithorpe
11,080,239 B2 8/2021 Demoor
11,113,770 B1 9/2021 Magoon
11,120,038 B1 9/2021 Ossher et al.
11,151,608 B1 10/2021 Guo
D937,299 S 11/2021 Varga et al.
11,163,846 B1 11/2021 Kadayam
11,171,950 B1 11/2021 Zhuravlev et al.
11,176,693 B1 11/2021 Gonzalez-Nicolas
D937,851 S 12/2021 Patel et al.
11,205,147 B1 12/2021 Anderson
D940,178 S 1/2022 Ang
D941,334 S 1/2022 Roche, Jr. et al.
11,222,003 B1 1/2022 Jones et al.
11,282,145 B2 3/2022 Ehrhart
D947,862 S 4/2022 Alhimiri
11,334,554 B2 5/2022 Andreakis
11,343,142 B1 5/2022 Wang et al.
11,379,219 B2 7/2022 Bhalla et al.
11,386,456 B1 7/2022 Lightbody
11,393,127 B2 7/2022 Parkison et al.
11,487,797 B2 * 11/2022 Shukla ................ G06F 16/3349
11,556,864 B2 1/2023 Yuan
11,568,305 B2 1/2023 Negi et al.
11,620,310 B1 4/2023 Akidau
D987,668 S 5/2023 Mairs et al.
D989,119 S 6/2023 Vansickler et al.
11,714,537 B2 8/2023 Lin et al.
11,714,698 B1 8/2023 Curtis
11,729,058 B1 8/2023 Agarwal et al.
11,770,304 B1 9/2023 Mcnally
11,798,058 B2 10/2023 Silverstein
11,811,928 B2 11/2023 Shaaban et al.
11,816,721 B2 11/2023 Ksyta
D1,009,077 S 12/2023 Matlin et al.
D1,011,377 S 1/2024 Ye

(56) References Cited

U.S. PATENT DOCUMENTS 11,860,613 B2 1/2024 Maury
11,886,965 B1 1/2024 Schwartz
D1,013,709 S 2/2024 Callanta et al.
11,892,817 B2 2/2024 Jacobs, II
11,899,678 B2 * 2/2024 Kadel ................. G06F 16/9577
11,906,415 B1 2/2024 Galburt
11,977,964 B1 5/2024 Winstead
11,983,806 B1 5/2024 Ramesh et al.
12,014,375 B2 6/2024 Brakob et al.
D1,038,142 S 8/2024 Roche, Jr. et al.
12,077,313 B1 9/2024 Whaley et al.
D1,044,839 S 10/2024 Bowen et al.
D1,044,841 S 10/2024 Shriniwar
12,106,621 B2 10/2024 Boerger
12,107,934 B1 10/2024 Bailey
D1,051,145 S 11/2024 McIver et al.
12,142,091 B2 11/2024 Fang
12,204,323 B1 1/2025 Malviya et al.
D1,061,571 S 2/2025 Arora
D1,067,240 S 3/2025 Duffy et al.
12,242,491 B2 * 3/2025 Li ....................... G06F 18/2155
12,248,962 B2 3/2025 Qu
12,271,491 B2 4/2025 Cameron et al.
D1,078,763 S 6/2025 Arora
D1,080,661 S 6/2025 Shope
12,333,412 B1 6/2025 Mazed
12,346,702 B1 7/2025 Burbine et al.
D1,091,608 S 9/2025 Li et al.
D1,093,421 S 9/2025 Pitkin et al.
D1,098,125 S 10/2025 Donnelly
12,444,126 B1 10/2025 Tremblay et al.
D1,101,762 S 11/2025 Gordonov et al.
D1,102,464 S 11/2025 Varga et al.
12,474,936 B2 11/2025 Dostie, Jr. et al.
D1,110,338 S 1/2026 Goodrich et al.
12,537,998 B1 1/2026 Perelli-Minetti et al.
D1,112,264 S 2/2026 Bharadwaj
D1,139,382 S 8/2026 Valle et al.
2001/0042036 A1 11/2001 Sanders
2002/0015480 A1 2/2002 Daswani
2002/0023046 A1 2/2002 Callahan
2002/0042755 A1 4/2002 Kumar
2002/0059201 A1 5/2002 Work
2002/0062262 A1 5/2002 Vasconi
2002/0087438 A1 7/2002 Kunieda
2002/0091991 A1 7/2002 Castro
2002/0120521 A1 8/2002 Forth
2002/0138358 A1 9/2002 Scheer
2002/0161664 A1 10/2002 Shaya et al.
2002/0165747 A1 11/2002 Shriver
2002/0188514 A1 12/2002 Kritt
2002/0198743 A1 12/2002 Ariathurai
2003/0009397 A1 1/2003 Whitenack et al.
2003/0018546 A1 1/2003 Ayala
2003/0028451 A1 2/2003 Ananian
2003/0050819 A1 3/2003 Koenigbauer
2003/0055700 A1 3/2003 Hoffman
2003/0070061 A1 4/2003 Wong
2003/0074248 A1 4/2003 Braud
2003/0078846 A1 4/2003 Burk
2003/0084053 A1 5/2003 Govrin
2003/0130863 A1 7/2003 Grey
2003/0144858 A1 7/2003 Jain
2003/0149608 A1 8/2003 Kall
2003/0163513 A1 8/2003 Schaeck
2003/0171962 A1 9/2003 Hirth
2003/0173403 A1 9/2003 Vogler
2003/0216950 A1 11/2003 Chen
2003/0229550 A1 12/2003 DiPrima
2003/0233264 A1 12/2003 Jones
2004/0006516 A1 1/2004 Anagol-Subbarao
2004/0019494 A1 1/2004 Ridgeway
2004/0044565 A1 3/2004 Kumar
2004/0044582 A1 3/2004 Chowdhary
2004/0054800 A1 3/2004 Shah
2004/0102981 A1 5/2004 Schuh
2004/0111304 A1 6/2004 Meka
2004/0111327 A1 6/2004 Kidd
2004/0267674 A1 12/2004 Feng
2005/0049938 A1 3/2005 Venkiteswaran
2005/0138642 A1 6/2005 Breh
2005/0144082 A1 6/2005 Coolman
2005/0163951 A1 7/2005 Oles
2005/0262196 A1 11/2005 Mueller
2005/0283410 A1 12/2005 Gosko
2006/0100889 A1 5/2006 Gosko
2006/0178918 A1 8/2006 Mikurak
2006/0277086 A1 12/2006 Ball
2006/0287932 A1 12/2006 Wulteputte
2007/0033569 A1 2/2007 Davidson
2007/0050229 A1 3/2007 Tatro
2007/0192216 A1 8/2007 Arnold et al.
2007/0203798 A1 8/2007 Caballero et al.
2007/0233574 A1 10/2007 Koegler
2007/0250545 A1 10/2007 Surlaker
2008/0052205 A1 2/2008 Dolley
2008/0082426 A1 4/2008 Gokturk et al.
2008/0133569 A1 6/2008 Vu
2008/0228657 A1 9/2008 Nabors
2008/0270256 A1 10/2008 Caballero
2008/0319849 A1 12/2008 Rapoport
2009/0063305 A1 3/2009 Kreifels
2009/0063309 A1 3/2009 Stephens
2009/0112727 A1 4/2009 Chi
2009/0150663 A1 6/2009 Perry
2009/0171816 A1 7/2009 del Rosario
2009/0177714 A1 7/2009 Obermeyer
2010/0005085 A1 1/2010 Millmore
2010/0145831 A1 6/2010 Esfandiari et al.
2010/0161364 A1 6/2010 Lokowandt
2010/0211550 A1 8/2010 Daniello
2010/0250598 A1 9/2010 Brauer et al.
2011/0029345 A1 2/2011 Kienzle
2011/0156651 A1 6/2011 Christensen
2011/0238484 A1 9/2011 Toumayan
2011/0313882 A1 12/2011 Barthes
2012/0036089 A1 2/2012 Washington
2012/0054642 A1 3/2012 Balsiger et al.
2012/0071999 A1 3/2012 Trammell
2012/0084215 A1 4/2012 Trier
2012/0163225 A1 6/2012 Mishkin et al.
2012/0209824 A1 8/2012 Morimoto
2012/0226573 A1 9/2012 Zakas
2012/0226612 A1 * 9/2012 Kurtis ................... G06Q 40/00
705/44
2012/0232952 A1 9/2012 Leonard
2012/0259675 A1 10/2012 Roehrs
2012/0316935 A1 12/2012 Feuerstin
2012/0323933 A1 12/2012 He
2012/0330918 A1 12/2012 Carey
2012/0330973 A1 12/2012 Ghuneim
2013/0013346 A1 1/2013 O'Connor
2013/0018651 A1 1/2013 Djordjevic et al.
2013/0041781 A1 2/2013 Freydberg
2013/0066745 A1 3/2013 De Heer
2013/0091033 A1 4/2013 Goodman
2013/0110860 A1 5/2013 Taranov et al.
2013/0117080 A1 5/2013 Madsen
2013/0138485 A1 5/2013 Zou et al.
2013/0159145 A1 6/2013 Stevens
2013/0166403 A1 6/2013 Jin et al.
2013/0191185 A1 7/2013 Galvin
2013/0191481 A1 7/2013 Prevost
2013/0246215 A1 9/2013 Faith et al.
2013/0290234 A1 10/2013 Harris et al.
2013/0311271 A1 11/2013 Rahul
2014/0025529 A1 1/2014 Honeycutt
2014/0052491 A1 2/2014 Narayanan
2014/0052840 A1 2/2014 Shukla
2014/0059144 A1 2/2014 Lehmann
2014/0095265 A1 4/2014 Steinman
2014/0095343 A1 4/2014 Daniel
2014/0095488 A1 4/2014 Malone
2014/0122377 A1 5/2014 Goodman

(56) References Cited

U.S. PATENT DOCUMENTS

2014/0156329 A1 6/2014 Hwang et al.
2014/0200965 A1 7/2014 Mcconnell
2014/0222453 A1 8/2014 Wills
2014/0222641 A1 8/2014 Køber
2014/0278804 A1 9/2014 Lanxner
2014/0279254 A1 9/2014 Hastman
2014/0322678 A1 10/2014 Briancon
2014/0324530 A1 10/2014 Thompson
2014/0324549 A1 10/2014 Chelap
2014/0358723 A1 12/2014 Ballaro
2014/0379422 A1 12/2014 Chapman
2015/0032526 A1 1/2015 Calman et al.
2015/0066570 A1 3/2015 Hellen
2015/0189014 A1 7/2015 Grunenberger
2015/0203673 A1 7/2015 Alric
2015/0281148 A1* 10/2015 Masterson ............. G06Q 10/10 715/752
2015/0286645 A1 10/2015 Sinha
2015/0295766 A1 10/2015 Dickey
2015/0302303 A1 10/2015 Hakim
2016/0092474 A1 3/2016 Stojanovic
2016/0196564 A1 7/2016 Dadia et al.
2016/0203319 A1* 7/2016 Coen .................. G06Q 30/0185 726/25
2016/0232624 A1 8/2016 Goldberg
2016/0239855 A1 8/2016 Feng
2016/0267102 A1 9/2016 Klein
2016/0300144 A1 10/2016 Santhanam
2016/0321344 A1 11/2016 Aragone
2016/0335345 A1 11/2016 Wang
2017/0006135 A1 1/2017 Siebel
2017/0017677 A1 1/2017 Jolfaei
2017/0017969 A1* 1/2017 Noursalehi ........ G06Q 30/0201
2017/0053558 A1 2/2017 Zhou
2017/0060641 A1 3/2017 Ramaswamy
2017/0063750 A1 3/2017 Vardhan
2017/0091327 A1 3/2017 Bostic
2017/0109675 A1 4/2017 Hosny
2017/0134516 A1 5/2017 Gutman
2017/0147941 A1 5/2017 Bauer et al.
2017/0193412 A1 7/2017 Easton
2017/0193433 A1 7/2017 Qin
2017/0193527 A1 7/2017 Backer
2017/0243465 A1 8/2017 Bourne, Jr.
2017/0255903 A1 9/2017 Chowdhry
2017/0255987 A1 9/2017 Bacharach
2017/0278173 A1 9/2017 Ettl
2017/0286909 A1 10/2017 Baynes
2017/0287038 A1* 10/2017 Krasadakis ........ G06Q 30/0201
2017/0364046 A1 12/2017 Westrick, Jr. et al.
2017/0364534 A1 12/2017 Zhang
2017/0364796 A1 12/2017 Wiebe
2018/0005296 A1 1/2018 Eades
2018/0024986 A1 1/2018 Singh et al.
2018/0136992 A1 5/2018 Solinger
2018/0143975 A1 5/2018 Casal
2018/0165604 A1 6/2018 Minkin
2018/0210937 A1 7/2018 Shi
2018/0218322 A1 8/2018 Bhargava
2018/0232786 A1 8/2018 Kuzkin et al.
2018/0240158 A1 8/2018 Peng
2018/0285790 A1 10/2018 Huynh
2018/0288363 A1 10/2018 Amengual Galdon
2018/0293640 A1 10/2018 Krappe
2018/0308151 A1 10/2018 Ainsworth, III
2018/0314925 A1 11/2018 Gauci
2018/0315141 A1 11/2018 Hunn
2018/0332102 A1 11/2018 Sheidaei
2018/0336514 A1 11/2018 Ranjanghatmuralidhar et al.
2018/0337798 A1 11/2018 Ilic
2018/0343491 A1 11/2018 Loheide
2018/0349793 A1 12/2018 Triolo et al.
2019/0034838 A1 1/2019 Canis
2019/0050688 A1 2/2019 Iyer
2019/0050771 A1 2/2019 Meharwade et al.
2019/0095992 A1 3/2019 Soh
2019/0102162 A1* 4/2019 Pitre ................... H04L 41/5048
2019/0102418 A1 4/2019 Vasudevan
2019/0102753 A1 4/2019 Harrison
2019/0114689 A1 4/2019 Wang
2019/0147400 A1 5/2019 Knight
2019/0149725 A1 5/2019 Adato
2019/0163985 A1 5/2019 Wang
2019/0192074 A1 6/2019 Smets
2019/0215424 A1 7/2019 Adato
2019/0220914 A1 7/2019 Flannery
2019/0243836 A1 8/2019 Nanda
2019/0251457 A1 8/2019 Byrnes
2019/0265971 A1 8/2019 Behzadi et al.
2019/0286620 A1 9/2019 Al-Haimi et al.
2019/0286759 A1 9/2019 Wilkins
2019/0303487 A1 10/2019 Mehta
2019/0303579 A1 10/2019 Reddy
2019/0377807 A1 12/2019 Dean et al.
2020/0026552 A1 1/2020 Zhang
2020/0045519 A1 2/2020 Raleigh et al.
2020/0073642 A1 3/2020 Koryakin
2020/0117757 A1 4/2020 Yanamandra
2020/0126013 A1 4/2020 Hochheiser et al.
2020/0134683 A1 4/2020 Boren
2020/0143313 A1 5/2020 Ohlsson et al.
2020/0184416 A1 6/2020 Javaheri
2020/0210947 A1 7/2020 Devarakonda
2020/0219159 A1 7/2020 Choudhary
2020/0235941 A1 7/2020 Nguyen
2020/0265512 A1 8/2020 James
2020/0272981 A1 8/2020 Kirkegaard
2020/0279200 A1 9/2020 Makhija
2020/0320095 A1 10/2020 Haase
2020/0327252 A1 10/2020 Mcfall
2020/0334608 A1 10/2020 Ramanathan
2020/0349624 A1 11/2020 Ramanathan
2020/0394398 A1 12/2020 Pamarthi
2020/0394455 A1 12/2020 Lee
2021/0012329 A1 1/2021 Gandhi
2021/0012358 A1 1/2021 Wical
2021/0036889 A1 2/2021 Jain et al.
2021/0042767 A1 2/2021 Guan et al.
2021/0065134 A1 3/2021 Chhabra
2021/0065294 A1 3/2021 Trevathan
2021/0117384 A1 4/2021 Leite Pinheiro De Paiva
2021/0125144 A1 4/2021 Liu
2021/0133788 A1 5/2021 Jacobs
2021/0133850 A1 5/2021 Ayush
2021/0142385 A1 5/2021 Alahmady
2021/0144250 A1 5/2021 Mahar
2021/0158259 A1 5/2021 Evans
2021/0166179 A1 6/2021 Pande
2021/0166251 A1 6/2021 Mehmanpazir
2021/0182730 A1* 6/2021 Clarke ................... G06N 20/00
2021/0182746 A1 6/2021 Muthukrishnan
2021/0201346 A1 7/2021 Dejardins
2021/0211825 A1 7/2021 Joyner et al.
2021/0226573 A1 7/2021 George
2021/0233129 A1 7/2021 Bikumala
2021/0241299 A1 8/2021 Ramini
2021/0241301 A1 8/2021 Christensen
2021/0241337 A1 8/2021 Bikumala
2021/0248151 A1 8/2021 Kadel
2021/0269244 A1 9/2021 Ahmann
2021/0287275 A1 9/2021 Karlan-Mason
2021/0303420 A1 9/2021 Willoughby
2021/0334871 A1 10/2021 Quinn
2021/0350429 A1 11/2021 Gangadarappa
2021/0350432 A1 11/2021 Kushner
2021/0357959 A1 11/2021 Cella
2021/0377203 A1 12/2021 Hou
2021/0378779 A1 12/2021 Lenzenhuber
2021/0383316 A1 12/2021 Mimassi
2021/0397989 A1 12/2021 Mayers
2022/0019204 A1 1/2022 Maury
2022/0051183 A1 2/2022 Franzo
2022/0058723 A1* 2/2022 Swett ................. G06Q 20/3276
2022/0067085 A1 3/2022 Nihas

(56) References Cited

U.S. PATENT DOCUMENTS

| | | | |
|---|---|---|---|
| 2022/0114509 | A1 | 4/2022 | Pinheiro |
| 2022/0116470 | A1 | 4/2022 | Sethi |
| 2022/0122134 | A1 | 4/2022 | Hoffman |
| 2022/0122142 | A1 | 4/2022 | Cao |
| 2022/0129477 | A1 | 4/2022 | Son |
| 2022/0129803 | A1 | 4/2022 | Bikumala |
| 2022/0156275 | A1 | 5/2022 | Burke |
| 2022/0197246 | A1 | 6/2022 | Cella |
| 2022/0198431 | A1 | 6/2022 | Foster, Jr. |
| 2022/0210141 | A1 | 6/2022 | Parekh et al. |
| 2022/0245008 | A1 | 8/2022 | Deljavan Farshi |
| 2022/0245115 | A1 | 8/2022 | Kulkarni et al. |
| 2022/0245574 | A1 | 8/2022 | Cella et al. |
| 2022/0245727 | A1 | 8/2022 | Roll |
| 2022/0253775 | A1* | 8/2022 | Burkhead .......... G06Q 30/0201 |
| 2022/0270160 | A1 | 8/2022 | Sadhankar |
| 2022/0284459 | A1 | 9/2022 | Kwok |
| 2022/0292160 | A1* | 9/2022 | Mehta .................. G06F 16/972 |
| 2022/0309436 | A1 | 9/2022 | Evans |
| 2022/0319504 | A1* | 10/2022 | Owhadi ................. G10L 25/57 |
| 2022/0327119 | A1 | 10/2022 | Gasper |
| 2022/0327597 | A1 | 10/2022 | Griesmer |
| 2022/0329595 | A1 | 10/2022 | Wynter |
| 2022/0357971 | A1* | 11/2022 | Feliciano .............. G08B 25/14 |
| 2022/0373346 | A1 | 11/2022 | Abhishek |
| 2022/0374737 | A1 | 11/2022 | Dhara |
| 2022/0383400 | A1 | 12/2022 | Wade |
| 2022/0405775 | A1 | 12/2022 | Siebel |
| 2023/0005330 | A1 | 1/2023 | Hartwig |
| 2023/0012041 | A1* | 1/2023 | Holloran ............... G06N 20/00 |
| 2023/0012650 | A1* | 1/2023 | Aggarwal .......... G06Q 30/0206 |
| 2023/0030234 | A1 | 2/2023 | Fichuk et al. |
| 2023/0030262 | A1 | 2/2023 | Springer |
| 2023/0032447 | A1 | 2/2023 | Mackie |
| 2023/0051934 | A1 | 2/2023 | Devan et al. |
| 2023/0055677 | A1 | 2/2023 | Dhelaria |
| 2023/0058148 | A1 | 2/2023 | Chen et al. |
| 2023/0059565 | A1 | 2/2023 | Karthik |
| 2023/0064747 | A1 | 3/2023 | Inoue Sardenberg |
| 2023/0067777 | A1 | 3/2023 | Hadar |
| 2023/0074782 | A1 | 3/2023 | Prasad |
| 2023/0075794 | A1 | 3/2023 | Muttreja |
| 2023/0091441 | A1 | 3/2023 | Go |
| 2023/0094635 | A1 | 3/2023 | Meng et al. |
| 2023/0099557 | A1 | 3/2023 | Thapliyal et al. |
| 2023/0102048 | A1 | 3/2023 | Cella |
| 2023/0113006 | A1 | 4/2023 | Liu |
| 2023/0125533 | A1 | 4/2023 | Estes |
| 2023/0162258 | A1 | 5/2023 | Das Gupta |
| 2023/0185878 | A1 | 6/2023 | Subhash |
| 2023/0206251 | A1 | 6/2023 | Acharya |
| 2023/0206265 | A1 | 6/2023 | Girija |
| 2023/0214773 | A1 | 7/2023 | Ha |
| 2023/0214854 | A1 | 7/2023 | Colombier |
| 2023/0214864 | A1 | 7/2023 | Colombier |
| 2023/0222536 | A1 | 7/2023 | Hoang |
| 2023/0259521 | A1 | 8/2023 | Alfons |
| 2023/0273915 | A1 | 8/2023 | Dev |
| 2023/0275973 | A1 | 8/2023 | Sakamoto et al. |
| 2023/0282350 | A1 | 9/2023 | Devore |
| 2023/0316377 | A1 | 10/2023 | Harrison |
| 2023/0325900 | A1 | 10/2023 | Edwards |
| 2023/0342344 | A1 | 10/2023 | Brown |
| 2023/0350963 | A1 | 11/2023 | Saad |
| 2023/0359161 | A1 | 11/2023 | O'Rourke |
| 2023/0367696 | A1 | 11/2023 | Liu |
| 2023/0385288 | A1 | 11/2023 | Kulkarni et al. |
| 2023/0394426 | A1 | 12/2023 | Bauders |
| 2023/0410095 | A1 | 12/2023 | Cella |
| 2023/0418980 | A1 | 12/2023 | Abrougui |
| 2023/0419387 | A1 | 12/2023 | Ballaro |
| 2024/0004860 | A1 | 1/2024 | Soundararajan et al. |
| 2024/0022492 | A1 | 1/2024 | Nanda |
| 2024/0037115 | A1 | 2/2024 | Simanjuntak et al. |
| 2024/0062099 | A1 | 2/2024 | Crockett |
| 2024/0070750 | A1 | 2/2024 | Smith, Jr. |
| 2024/0095788 | A1 | 3/2024 | Vaishnav |
| 2024/0095789 | A1 | 3/2024 | Vaishnav |
| 2024/0106828 | A1 | 3/2024 | Jain |
| 2024/0107122 | A1* | 3/2024 | Akhoury ............ H04N 21/4828 |
| 2024/0118702 | A1 | 4/2024 | Cella |
| 2024/0144141 | A1 | 5/2024 | Cella et al. |
| 2024/0144170 | A1 | 5/2024 | Kim |
| 2024/0169410 | A1 | 5/2024 | Zhao |
| 2024/0184650 | A1 | 6/2024 | O'Kelley |
| 2024/0211828 | A1 | 6/2024 | Iwamoto |
| 2024/0232941 | A1 | 7/2024 | Vajge |
| 2024/0248919 | A1* | 7/2024 | Kumar .................. G06F 16/338 |
| 2024/0266010 | A1 | 8/2024 | Adhikari |
| 2024/0281419 | A1 | 8/2024 | Alfaras |
| 2024/0281423 | A1 | 8/2024 | Perrin |
| 2024/0311853 | A1 | 9/2024 | Rendahl |
| 2024/0330983 | A1 | 10/2024 | Isaacs |
| 2024/0354423 | A1 | 10/2024 | Mardikar |
| 2024/0354686 | A1 | 10/2024 | Hegde |
| 2024/0354867 | A1 | 10/2024 | Young |
| 2024/0362576 | A1 | 10/2024 | Rajagopal |
| 2024/0370902 | A1 | 11/2024 | Miglani |
| 2024/0372856 | A1 | 11/2024 | Black et al. |
| 2024/0386015 | A1 | 11/2024 | Crabtree et al. |
| 2024/0419678 | A1 | 12/2024 | Sharma |
| 2024/0420012 | A1* | 12/2024 | Austin ................... G06N 20/00 |
| 2024/0427789 | A1 | 12/2024 | Sahoo |
| 2024/0428166 | A1 | 12/2024 | Sahoo |
| 2024/0428181 | A1 | 12/2024 | Sahoo |
| 2024/0428318 | A1 | 12/2024 | Sahoo |
| 2025/0005479 | A1 | 1/2025 | Sanjib |
| 2025/0036648 | A1 | 1/2025 | Hunter |
| 2025/0047663 | A1 | 2/2025 | Brennan et al. |
| 2025/0062949 | A1 | 2/2025 | Nimmagadda |
| 2025/0077601 | A1* | 3/2025 | Liu ..................... G06F 16/9538 |
| 2025/0139656 | A1 | 5/2025 | Durvasula |
| 2025/0217114 | A1 | 7/2025 | Roper, Jr. et al. |
| 2025/0259032 | A1 | 8/2025 | Crabtree et al. |
| 2025/0301489 | A1 | 9/2025 | Gabizon et al. |
| 2025/0328341 | A1 | 10/2025 | Gutierrez |
| 2025/0355656 | A1 | 11/2025 | Khalil et al. |

FOREIGN PATENT DOCUMENTS

| | | | |
|---|---|---|---|
| AU | 2024204660 | A1 | 1/2025 |
| CN | 101025799 | A | 8/2007 |
| CN | 104731791 | A | 6/2015 |
| CN | 107908778 | A | 4/2018 |
| CN | 108122157 | A | 6/2018 |
| CN | 110570245 | A | 12/2019 |
| CN | 112990988 | A | 6/2021 |
| CN | 308638129 | S | 5/2024 |
| CN | 118297564 | A | 7/2024 |
| CN | 118536118 | A | 8/2024 |
| CN | 308771199 | S | 8/2024 |
| CN | 118734829 | A | 10/2024 |
| EM | 15013860 | | 3/2023 |
| JP | H05143614 | A | 6/1993 |
| JP | 2001005863 | A | 1/2001 |
| JP | 2002024334 | A | 1/2002 |
| JP | 2002108668 | A | 4/2002 |
| JP | 2002279236 | A | 9/2002 |
| JP | 2004538542 | A | 12/2004 |
| JP | 2005078422 | A | 3/2005 |
| JP | 2019101725 | A | 6/2019 |
| JP | 2019523927 | A | 8/2019 |
| JP | 2020514860 | A | 5/2020 |
| JP | 2020514860 | A5 | 2/2021 |
| JP | 2021532444 | A | 11/2021 |
| JP | 2022175317 | A | 11/2022 |
| JP | 2023500378 | A | 1/2023 |
| JP | 2023508188 | A | 3/2023 |
| JP | 2023539284 | A | 9/2023 |
| KR | 20070057806 | A | 6/2007 |
| SK | 28733 | | 6/2020 |
| WO | 9425161 | A1 | 11/1994 |
| WO | 1999062261 | A1 | 12/1999 |
| WO | 0233581 | A2 | 4/2002 |

(56) References Cited

FOREIGN PATENT DOCUMENTS

| | | | |
|---|---|---|---|
| WO | 02063530 | A2 | 8/2002 |
| WO | 2004104739 | A2 | 12/2004 |
| WO | 2006026673 | A2 | 3/2006 |
| WO | 2010107730 | A1 | 9/2010 |
| WO | 2010151368 | A2 | 12/2010 |
| WO | 2012019097 | A2 | 2/2012 |
| WO | 2013181736 | A1 | 12/2013 |
| WO | 2014060050 | A1 | 4/2014 |
| WO | 2016013972 | A1 | 1/2016 |
| WO | 2016118979 | A2 | 7/2016 |
| WO | 2018116252 | A1 | 6/2018 |
| WO | 2018231850 | A1 | 12/2018 |
| WO | 2019157399 | A1 | 8/2019 |
| WO | 2021171250 | A1 | 9/2021 |
| WO | 2021262530 | A1 | 12/2021 |
| WO | 2022008567 | A1 | 1/2022 |
| WO | 2022132040 | A1 | 6/2022 |
| WO | 2022221719 | A3 | 12/2022 |
| WO | 2023026313 | A1 | 3/2023 |
| WO | 2023174562 | A1 | 9/2023 |
| WO | 2024073505 | A1 | 4/2024 |
| WO | 2024226421 | A1 | 10/2024 |
| WO | 2024233674 | A2 | 11/2024 |
| WO | 2025038523 | A1 | 2/2025 |

OTHER PUBLICATIONS

Holzer et al. "Developing a Framework for Linking Design Intelligence from Multiple Professions in the AEC Industry". 2007. URL Link: <https://link.springer.com/content/pdf/10.1007/978-1-4020-6528-6_23.pdf>. Accessed Sep. 2024. (Year: 2007).

PCMag. "engine" definition. Dec. 1, 2020 snapshot via Archive.org. URL Link: < https://www.pcmag.com/encyclopedia/term/ engine>. Accessed Sep. 2024. (Year: 2020).

Technopedia. "Engine" definition. Oct. 19, 2012. URL Link: < https://www.techopedia.com/definition/24155/engine> Accessed Sep. 2024. (Year: 2012).

Biswas S., et al., "A Proposed Architecture for Big Data Driven Supply Chain Analytics," ICFAI University Press (IUP) Journal of Supply Chain Management, 2016, vol. 13, No. 3, pp. 7-34 (24 Pages), Retrieved from URL: https://arxiv.org/abs/1705.04958.

European Search Report for European Application No. 24186933.8, dated Nov. 25, 2024, 09 Pages.

Extended European Search Report for European Application No. 24184819.1, dated Nov. 27, 2024, 10 Pages.

Extended European Search Report for European Application No. 24187943.6, dated Nov. 19, 2024, 8 Pages.

European Search Report issued in European PatentNo. 24187967 mailed Nov. 25, 2024, 8 pgs.

Machado I.A., et al., "Data Mesh: Concepts and Principles of a Paradigm Shift in Data Architectures," Procedia Computer Science, Amsterdam, NL, Jan. 10, 2022, vol. 196, pp. 263-271, DOI: 10.1016/j.procs.2021.12.013, ISSN: 1877-0509, XP093050267, Retrieved from URL: https://www.sciencedirect.com/science/article/pii/S1877050921022365.

Office Action for Japanese Application No. 2024-101794, dated Sep. 13, 2024, 21 Pages.

Office Action for Japanese Application No. 2024-108629, dated Oct. 29, 2024, 10 Pages.

Office Action for Japanese Application No. 2024-112073, dated Oct. 15, 2024, 9 Pages.

Suzumura K., "Latest IT Trends by Field: Inter-System Integration: The Key Lies in the Use of Open Technology, Performance and Reliability," Nikkei Computer, Japan, Nikkei BP, Sep. 23, 2002, No. 557, pp. 28-29 (6 Pages), ISSN 0285-4619.

Anonymous, "Data Mesh," May 25, 2023, XP093199672, wikipedia.org, URL: https://en.wikipedia.org/w/index.php?title=Data_mesh &oldid=1157039904.

Zhamak Dehghani, "How to move beyond a monolithic data lake to a distributed data mesh", published by martinfowler.com on May 20, 2019 (Year: 2019).

Agarwal, Saloni et al., "Improving Bundles Recommendation Coverage in Sparse Product Graphs," WWW 22 Companion, 2022, all pgs.

Carlos, Rafael et al., "Framework for Continuous Agile Technology Roadmap Updating," Emeraldinsight. com, 2017, all pages.

Decision of Refusal issued in Japanese Patent Application No. 2024-108629, dated Apr. 11, 2025, 5 pgs.

English Translation of Decision of Refusal issued in Japanese Patent Application No. 2024-108629, dated Apr. 11, 2025, 7 pgs.

Office Action issued in Japanese Patent Application No. 2024-101794, dated May 16, 2025, 6 pgs.

English Translation of Office Action issued in Japanese Patent Application No. 2024-101794, dated May 16, 2025, 5 pgs.

European Search Report issued in European Patent Application No. 25163362.4 , dated May 2, 2025, 10 pgs.

European Search Report issued in European Patent Application No. EP25156175.9, dated Mar. 13, 2025.

Examination Report issued in Australian Patent Application No. 2024204660, dated Apr. 16, 2025, 4 pgs.

Examination Report issued in Australian Patent Application No. 20244204340, dated Feb. 28, 2025, 5 pgs.

Examination Report issued in Australian Patent Application No. 2025200528, dated Mar. 6, 2025, 5 pgs.

Examination Report issued in Australian Patent Application No. 2025200535, dated Apr. 7, 2025, 7 pgs.

Examination Report issued in Australian Patent Application No. 2025200793, dated Apr. 1, 2025, 9 pgs.

Examination Report issued in Australian Patent Application No. 2025201639, dated Apr. 30, 2025, 6 pgs.

Examination Report issued in Australian Patent Application No. 2025201740, dated Mar. 18, 2025, 5 pgs.

Kohut, Yurii et al., "Recommendation System for Purchasing Goods based on the Decision Tree Algorithm," Advances in Cyber-Physical Systems, vol. 6, No. 2, 2021, 7 pgs.

Palo, Joonas, "Product Roadmapping Tool and Process Unification as part of a Global End-to-End Repeatability Operating Model Development," Haaga-helia, 2023, all pgs.

Sutton, Rowan et al., "A Reinforcement Learning and Synthetic Data Approach to Mobile Notification Management," ACM, 2019, all pgs.

Sun, Zhu et al., "Revisiting Bundle Recommendation: Datasets, Tasks, Challenges and Opportunities for Intent Aware Product Bundling," Association for Computing Machinery, Spain, SIGIR 2022, 12 pgs.

International Search Report and Written Opinion for International Application No. PCT/US2024/037624, dated Oct. 28, 2024, 9 Pages.

Johnson, Renee, "Everything you Need to Know About Global Distribution System", Mar. 2, 2022, itilite. com, 6 pages (Year: 2022).

Search Report from European Patent Application No. 25154230.4, dated Jul. 10, 2025, 10 pgs.

Channelpro Network: "Ingram Micro's New Xvantage Mobile Application is Simplifying How the IT Channel Works," Ingram Macro Inc, Dec 20, 2023, 2 Page, [Retrieved on 2025-09-18] Retrieved from URL: https://www.channelpronetwork.com/2023/12/20/ingram-micros-new-xvantage-mobile-application-is-simplifying-how-the-it-channel-works/.

Costa C, "Data Mesh: Concepts and Principles of a Paradigm Shift in Data Architectures," published by ScienceDirect in 2022 (Year: 2022), 9 pages.

Dehghani Z., "Data Mesh Principles and Logical Architecture", published by martinfowler.com on May 20, 2019 (Year: 2019), 9 pages.

Dey D., et al., "Appraise: A Governance Framework for Innovation with Artificial Intelligence Systems," ACM, 2024, 13 Pages.

Extended European Search Report for European Application No. 25154210.6, dated Jun. 11, 2025, 09 Pages.

Extended European Search Report for European Application No. 25161920.1, dated Jul. 24, 2025, 15 Pages.

Gately E., "Ingram Micro Debuts Xvantage Mobile App," Channel Futures, Dec 20, 2023, 1 Page, [Retrieved on Sep. 2, 2025]

(56) References Cited

OTHER PUBLICATIONS

Retrieved from URL: https://www.channelfutures.com/channel-sales-marketing/ingram-micro-debuts-xvantage-mobile-app.
He Z., et al., "Enhancing Web Accessibility: Automated Detection of Issues with Generative AI," Proceedings of the ACM on Software Engineering, Jul. 2025, vol. 2, No. FSE, Article FSE101, pp. 1-24.
Ingram Industries Inc: "Ingram Micro," Registered Trademark U.S. Appl. No. 86/365,487, filed May 30, 2017, 3 Pages, [Retrieved on Aug. 13, 2025] Retrieved from URL: https://tsdr.uspto.gov/#caseNumber=86365487&caseSearchType=US_APPLICATION&caseType=DEFAULT&search Type=statusSearch.
Jonas P.,“ Moving from data lakes to data mesh", Oct. 18, 2022, medium. com, 22 pages (Year: 2022).
Kundu S., et al., "Detecting Functional Safety Violations in Online Al Accelerators," IEEE, 2022, pp. 1-4.
Mailparser, "Enter Mailparser: Your Solution for Data Entry," 2024, 7 Pages, [Retrieved on Dec. 2, 2025] Retrieved from URL: https://mailparser.io/email-to-erp.
Robert J.E., "Applying Generative AI to Detect Document Incompleteness, Inconsistencies, and Discrepancies," ACM, FSE Companion'25, Jun. 23-28, 2025, pp. 1381-1385.
Sryheni S., "Introduction to Depth First Search Algorithm (DFS)," Baeldung.com, Mar. 24, 2023, 6 Pages.
Wolfart D., et al., "Modernizing Legacy Systems with Microservices: A Roadmap," Association for Computing Machinery, Jun. 21-23, 2021, 11 Pages.
Youtube.Com: "Welcome to Xvantage Mobile-Your Anywhere, Anytime App," Ingram Micro USA, Oct. 24, 2023, 3 Pages, [Retrieved on Aug. 13, 2025] Retrieved from URL: https://www.youtube.com/watchv=QyZOeBLJODM.
Aksu E., et al., "Is Personalization the Future of User Interfaces A Systematic Mapping and Review," Proceedings of the 2025 11th International HCI and UX Conference, 2025, pp. 67-72.
European Search Report for European Application No. 25201138.2, dated Jan. 7, 2026, 12 Pages.
Examination Report issued in Australian Patent Application No. 2026200987, mailed Mar. 31, 2026, 7 pages.
Examination Report No. 1 for Australian Patent Application No. 2025223770, dated Sep. 10, 2025, 5 pages.
Extended European Search Report for European Application No. 25227599.5, dated Apr. 14, 2026, 09 Pages.
Nallamothu T.K., "Enhance Cross-Device Experiences Using Smart Connect Ecosystem," International Journal of Technology , Management and Humanities, Aug. 30, 2023, vol. 9 No. 03, 5 pages.
Office Action for Canadian Patent Application No. 3285874, mailed Apr. 1, 2026, 5 pages.
Office Action issued in Japanese Patent Application No. 2025-151910, mailed Apr. 21, 2026, 9 pgs.
Rahm E., et al., "A survey of approaches to automatic schema matching," the VLDB Journal, vol. 10, No. 4, 2001, pp. 334-350.
Sahay T., et al., "Schema Matching using Machine Learning," 2019, 07 Pages, arXiv: 1911.1154 [5].
Sivagnanasothy L., "How Change Data Capture is used for Real-Time Data Integration and Analytics," medium.com, May 22, 2019, 7 pages.
Tunali O., et al., "Targeted Personalized Product Bundle Generation," IEEE, 2021, 5 pages.
Van De Wiel., M., "Change Data Capture (CDC): Tools, Benefits, and Best Practices," fivetran.com, Aug. 4, 2022, 10 pages.
Ingram Micro Inc., "Pending Trademark U.S. Appl. No. 97/331,192," U.S. Patent and Trademark Office, Published Mar. 21, 2023 [Retrieved on Jun. 11, 2026], 1 page, Retrieved from the Internet: URL: https://tsdr.uspto.gov/#caseNumber=97331192&caseSearchType=US_APPLICATION&caseType=DEFAULT&searchType=statusSearch.
Office Action for Canadian Patent Application No. 3244397, mailed on Apr. 28, 2026, 09 pages.
Blohm I., et al., "Data Products, Data Mesh, and Data Fabric: New Paradigm(s) for Data and Analytics," Business & Information Systems Engineering, Jun. 5, 2024, vol. 66, No. 5, pp. 643-652.
Dobbelaere P., et al., "Kafka Versus RabbitMQ: A Comparative Study of Two Industry Reference Publish/Subscribe Implementations: Industry Paper," Proceedings of the 11th ACM International Conference on Distributed and Event-Based Systems (DEBS '17), Jun. 2017, 25 pages, Retrieved from https://arxiv.org/abs/1709.00333.
Examination Report No. 1 for Australian Patent Application No. 2026202865, dated Jul. 22, 2026, 4 pages.
Examination Report No. 1 for Australian Patent Application No. 2026202443 dated Aug. 4, 2026, 06 pages.
Examination Report No. 1 for Australian Patent Application No. 2026202572 dated Aug. 11, 2026, 13 pages.
Examination Report No. 1 for Australian Patent Application No. 2026204701 dated Aug. 11, 2026, 07 pages.
Examination Report No. 2 for Australian Patent Application No. 2025208498, mailed Aug. 20, 2026, 05 pages.
Examination Report No. 2 for Australian Patent Application No. 2025208500, mailed Aug. 13, 2026, 06 pages.
Examination Report No. 2 for Australian Patent Application No. 2025283550, mailed Aug. 5, 2026, 09 pages.
Gavish L., et al., "What Is A Data Mesh And How Not To Mesh It Up," Monte Carlo, Jun. 2024, 15 pages, Retrieved from Internet URL: https://www.montecarlodata.com/blog-what-is-a-data-mesh-and-how-not-to-mesh-it-up/.
Hooshmand Y., et al., "From a Monolithic PLM Landscape to a Federated Domain and Data Mesh," Proceedings of the Design Society, May 2022, vol. 2, pp. 713-722.
Institute of Product Leadership, "A Comprehensive Guide to Successful Product Development," Institute of Product Leadership, Dec 16, 2025, 16 pages, Retrieved from URL: https://www.productleadership.com/blog/product-development/.
Joint Task Force., "Security and Privacy Controls for Information Systems and Organizations," NIST Special Publication 800-53 Rev. 5, Sep. 2020, 492 pages, Retrieved from https://nvlpubs.nist.gov/nistpubs/SpecialPublications/NIST.SP.800-53r5.pdf.
Kreps J., et al., "Kafka: A Distributed Messaging System for Log Processing," Proceedings of the 6th International Workshop on Networking Meets Databases (NetDB '11), Jun. 2011, ACM, pp. 1-7, Retrieved from https://pages.cs.wiscedu/~akella/CS744/F17/838-CloudPapers/Kafka.pdf.
McHale C., "Single Pane of Glass Dashboards: What are they," SPK and Associates, Apr. 27, 2022, 8 pages, Retrieved from URL: https://www.spkaa.com/blog/what-are-single-pane-of-glass-dashboards.
Office Action for Canadian Patent Application No. 3281593, mailed on Jun. 19, 2026, 04 pages.
Office Action for Chinese Patent Application No. 202510198008.1, mailed Jul. 24, 2026, 08 pages.
Office Action for Japanese Patent Application No. 2025011018, mailed Aug. 21, 2026, 16 pages.
Office Action for Japanese Patent Application No. 2025020384, mailed Aug. 28, 2026, 10 pages.
Swanson M., et al., "Contingency Planning Guide for Federal Information Systems," NIST Special Publication 800-34 Rev. 1, May 2010, 149 pages, Retrieved from https://nvlpubs.nist.gov/nistpubs/legacy/sp/nistspecialpublication800-34r1.pdf.
Confluent, "Data Products, Data Contracts, and Change Data Capture," Confluent.com, Feb. 21, 2024, p. 112.
Curran H., "SaaS Design—Employee Onboarding Wizard," Dribbble, Feb. 27, 2024, pp. 12. Retrieved from URL:https://dribbble.com/shots/23726660-SaaS-Design-Employee-Onboarding-Wizard.
Impekable, "Sign Up Wizard—Employee Onboarding," Dribbble, Jan. 22, 2024, pp. 12. Retrieved from URL: https://dribbble.com/shots/23470406-Sign-Up-Wizard-Employee-Onboarding.
Ojetunji D., "Employee Onboarding Modal," Dribbble, Sep. 29, 2023, pp. 12. Retrieved from URL: https://dribbble.com/shots/22690528-Employee-Onboarding-modal.
Ranniaia A., "Onboarding Modals," Dribbble, Aug. 30, 2024, pp. 13. Retrieved from URL: https://dribbble.com/shots/24778275-Onboarding-modals.

(56) References Cited

OTHER PUBLICATIONS

Zilliant, "Zilliant Introduces Real-Time Pricing Engine to Deliver Dynamic Pricing Capabilities Needed in the Digital Age", Zilliant Press Release, 2022, pp. 14.

* cited by examiner

SYSTEMS AND METHODS FOR PERFORMING AI-DRIVEN RELEVANCY SEARCH

CROSS REFERENCE TO RELATED APPLICATIONS

This application is a Continuation-in-Part (CIP) of U.S. patent application Ser. No. 18/341,714, filed on Jun. 26, 2023. This application is also a Continuation-in-Part (CIP) of U.S. patent application Ser. No. 18/349,836, filed on Jul. 10, 2023. Each of these applications is incorporated herein by reference in its entirety.

BACKGROUND

Traditional ordering processes in distribution and supply-chain platforms are marred with inefficiencies, delays, and inaccuracies. In the conventional landscape, multiple systems and vendors usually perform each activity independently, from creating a bill of materials to registering deals, applying pricing, generating quotes, and submitting orders. This approach leads to operational inefficiencies and a heightened likelihood of errors.

Enterprise Resource Planning (ERP) systems have served as the mainstay in managing business processes, including distribution and supply chain. These systems act as central repositories where different departments such as finance, human resources, and inventory management can access and share real-time data. While ERPs are comprehensive, they present several challenges in today's complex distribution and supply chain environment. One of the primary challenges is data fragmentation. Data silos across different departments or even separate ERP systems make real-time visibility difficult to achieve. Users lack a comprehensive view of key distribution and supply chain metrics, which adversely affects decision-making processes.

Moreover, ERP systems often do not offer effective data integration capabilities. Traditional ERP systems are not designed to integrate efficiently with external systems or even between different modules within the same ERP suite. This design results in a cumbersome and error-prone manual process to transfer data between systems and affects the flow of information throughout the supply chain. Data inconsistencies occur when information exists in different formats across systems, hindering accurate data analysis and leading to uninformed decision-making. Conventional data normalization techniques are time-intensive and error-prone when applied to heterogeneous and fragmented data sources. There remains a need for systems capable of interpreting and extracting value from inconsistent data without prior cleansing.

Data inconsistency presents another challenge. When data exists in different formats or units across departments or ERPs, standardizing this data for meaningful analysis becomes a painstaking process. Businesses often resort to time-consuming manual processes for data transformation and validation, which further delays decision-making. Additionally, traditional ERP systems often lack the capabilities to handle large volumes of data effectively. These systems struggle to provide timely insights for operational improvements, particularly problematic for businesses dealing with complex and expansive distribution and supply chain networks.

Data security is another concern, especially considering the sensitive nature of supply chain data, which includes customer details, pricing, and contracts. Ensuring compliance with global regulations on data security and governance adds an additional layer of complexity. Traditional ERP systems often lack robust security features agile enough to adapt to the continually evolving landscape of cybersecurity threats and compliance requirements.

BRIEF SUMMARY OF THE INVENTION

Automated Relevancy Search processes are designed to address deficiencies in search capabilities within technology distribution platforms by integrating various systems and activities into a unified interface, enabling enhanced search experiences and efficient navigation of products and services. This transformation enhances the search experience, facilitates efficient product discovery, and ensures personalized recommendations tailored to individual user preferences and requirements. The platform ensures data integrity and relevance while effectively integrating and optimizing search processes.

In the global distribution industry, challenges such as inefficient search capabilities, SKU management, and the need for real-time relevancy adjustments necessitate innovative solutions. Traditional search methods are increasingly insufficient, particularly with shifts in consumer expectations and market dynamics. By integrating functionalities for real-time data mesh integration, dynamic SKU searches, and personalized recommendations, the platform supports a shift from traditional search methods to a flexible, AI-powered search model. The platform further eliminates the need for manual or rule-based data preparation by employing AI-powered relevance detection across unstructured and inconsistent data formats, enabling meaningful search operations without traditional cleansing or normalization steps.

According to some embodiments, a search optimization module can be configured to incorporate algorithms to optimize search results based on real-time data and user preferences. The system includes a search optimization module that, integrated with Real-Time Data Mesh (RTDM) and Single Pane of Glass User Interface (SPoG UI), optimizes the relevancy of search results. Using advanced algorithms, it adapts search results based on real-time data and user interactions, enhancing the relevance and accuracy of search options.

In a non-limiting example, a Search Recommendation Engine employs sophisticated algorithms to offer dynamic, personalized search options to users. A Real-Time Relevancy Adjustment Module, using models like neural networks or decision trees, dynamically adjusts search relevancy based on real-time market data, user feedback, and historical interactions.

In an embodiment, a Dynamic SKU Search Engine operably connected with the RTDM and SPoG UI conducts dynamic and static SKU searches to retrieve comprehensive search results. The engine optimizes search results based on relevancy scores, considering factors such as product attributes, user preferences, and real-time market dynamics. The system includes a real-time data mesh integration for efficient data retrieval, ensuring comprehensive coverage and accuracy.

In some embodiments, the system enables users to refine their search queries and explore additional options through an intuitive user interface. It includes a module for capturing user feedback and behavior, facilitating continuous improvement and optimization of search results. Additionally, the system employs validation algorithms to ensure the accuracy of search queries, synchronizing real-time data to provide consistent and up-to-date search options.

Embodiments disclosed herein integrate multiple systems, automate processes, and validate to enhance search capabilities within technology distribution platforms. By implementing intelligent rules and algorithms, the system efficiently delivers relevant and accurate search results, reducing search time and improving user satisfaction. The system's adaptability ensures it remains current and evolves to meet market and user demands.

The system uses data-driven methods to optimize search experiences based on user preferences and real-time market data. This includes analyzing user interactions and historical search patterns to discern preferences and anticipate needs. Automated search optimization integrates various factors such as product specifications, user feedback, and market trends to deliver personalized and relevant search options tailored to individual user requirements.

In this process, user profiles are automatically generated based on comprehensive data analysis, encompassing aspects like search history and interaction patterns. This data informs the creation of search options that meet specific user needs in areas such as technology products and services. The system employs advanced algorithms to analyze user data and deliver search options that align with individual preferences and requirements.

The system incorporates advanced algorithms to analyze user data, including historical search patterns and user interactions, to optimize search experiences. This facilitates the delivery of search options that are highly relevant and tailored to individual user preferences. Automated search optimization integrates various factors such as product specifications, user feedback, and real-time market data to deliver accurate and personalized search options.

Single Pane of Glass

The Single Pane of Glass (SPoG) can provide a comprehensive solution that is configured to address these multifaceted challenges. It can be configured to provide a holistic, user-friendly, and efficient platform that facilitates the distribution process.

According to some embodiments, SPoG can be configured to address supply chain and distribution management by enhancing visibility and control over the supply chain process. Through real-time tracking and analytics, SPoG can deliver valuable insights into inventory levels and the status of goods, ensuring that the process of supply chain and distribution management is handled efficiently.

According to some embodiments, SPoG can integrate multiple touchpoints into a single platform to emulate a direct consumer channel into a distribution platform. This integration provides a unified direct channel for consumers to interact with distributors, significantly reducing the complexity of the supply chain and enhancing the overall customer experience.

SPoG offers an innovative solution for improved inventory management through advanced forecasting capabilities. These predictive analytics can highlight demand trends, guiding companies in managing their inventory more effectively and mitigating the risks of stockouts or overstocks.

According to some embodiments, SPoG can include a global compliance database. Updated in real-time, this database enables distributors to stay abreast with the latest international laws and regulations. This feature significantly reduces the burden of manual tracking, ensuring smooth and compliant cross-border transactions.

According to some embodiments, SPoG integrates data from various sources into a single platform, ensuring data consistency and reducing the potential for errors. This integrated data facilitates efficient management of products and enhances automated search relevancy, aligning with specific market needs and requirements.

According to some embodiments, SPoG is its highly configurable and user-friendly platform. Its intuitive interface allows users to easily access and purchase technology, thereby aligning with the expectations of the new generation of tech buyers.

Moreover, SPoG's advanced analytics capabilities offer invaluable insights that can drive strategy and decision-making. It can track and analyze trends in real-time, allowing companies to stay ahead of the curve and adapt to changing market conditions.

SPoG's flexibility and scalability make it a future-proof solution. It can adapt to changing business needs, allowing companies to expand or contract their operations as needed without significant infrastructural changes.

SPoG's innovative approach to resolving the challenges in the distribution industry makes it an invaluable tool. By enhancing supply chain visibility, facilitating inventory management, ensuring compliance, and improving automated search relevancy, it offers a comprehensive solution to the complex problems that have long plagued the distribution sector. Through its implementation, distributors can look forward to increased efficiency, reduced errors, and improved customer satisfaction, leading to sustained growth in the ever-evolving global market.

Real-Time Data Mesh (RTDM)

The platform can be include implementation(s) of a Real-Time Data Mesh (RTDM), according to some embodiments. RTDS offers an innovative solution to address these challenges. RTDM, a distributed data architecture, enables real-time data availability across multiple sources and touchpoints. This feature enhances supply chain visibility, allowing for efficient management and enabling distributors to handle disruptions more effectively.

RTDM's predictive analytics capability offers a solution for efficient inventory control. By providing insights into demand trends, it aids companies in managing inventory, reducing risks of overstocking or stockouts.

RTDM's global compliance database, updated in real-time, ensures distributors are current with international regulations. It significantly reduces the manual tracking burden, enabling cross-border transactions.

The RTDM simplifies data integration from various sources, ensuring data consistency and reducing error potential. Its capabilities for managing products and market data efficiently align with specific market needs and enhance automated search relevancy.

The RTDM enhances customer experience with its intuitive interface, allowing easy access and purchase of technology, meeting the expectations of the new generation of tech buyers.

Advantages of SPoG and RTDM Integration

Integrating the SPoG platform with RTDM provides numerous advantages. Firstly, it offers a holistic solution to longstanding distribution industry challenges. With RTDM's capabilities, SPoG enhances supply chain visibility, facilitates data integration, and improves automated search relevancy.

The real-time tracking and analytics offered by RTDM improve SPoG's ability to manage the supply chain and inventory effectively. It provides accurate and current information, enabling distributors to make informed decisions quickly.

Integrating SPoG with RTDM also ensures data consistency and reduces errors in data management. By providing a centralized platform for managing data from various sources, it simplifies product localization and helps to align with market needs and improve automated search relevancy.

The global compliance database of RTDM, integrated with SPoG, facilitates and compliant cross-border transactions. It also reduces the burden of manual tracking, saving significant time and resources.

In some embodiments, a distribution platform incorporates SPoG and RTDM to provide an improved and comprehensive distribution system. The platform can leverage the advantages of a distribution model, addresses its existing challenges, and positions it for sustained growth in the ever-evolving global market.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 1:
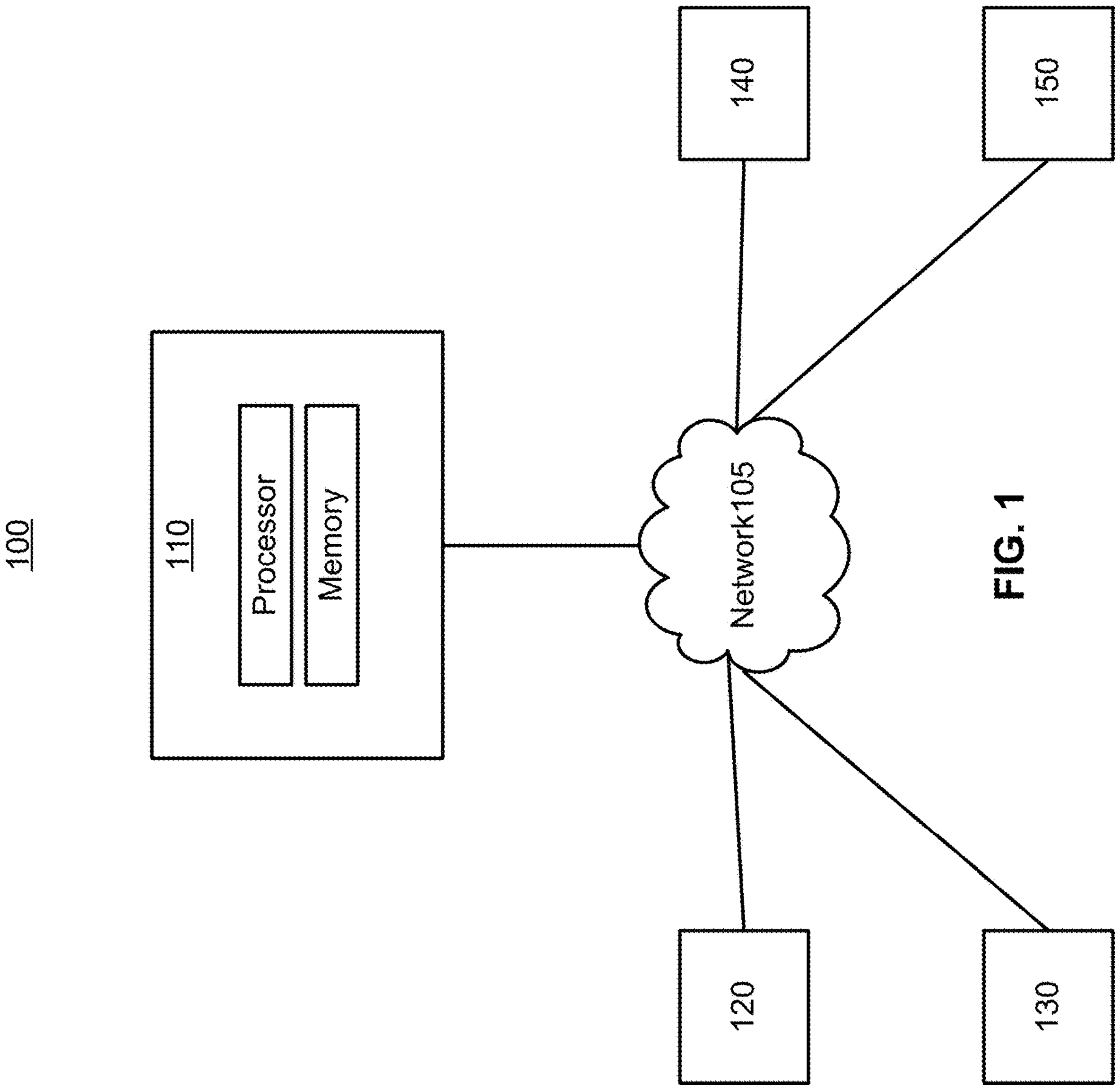
FIG. 1 illustrates one embodiment of an operating environment of a distribution platform, referred to as System in this embodiment.

FIG. 1 illustrates an operating environment 100 of a distribution platform, referred to as System 110 in this embodiment. System 110 operates within the context of an information technology (IT) distribution model, catering to various users such as customers 120, end customers 130, vendors 140, resellers 150, and other entities involved in the distribution process. This operating environment encompasses a broad range of characteristics and dynamics that contribute to the success and efficiency of the distribution platform.

Customers 120 within the operating environment of System 110 represent businesses or individuals seeking IT solutions to meet their specific needs. These customers may require a diverse range of IT products such as hardware components, software applications, networking equipment, or cloud-based services. System 110 provides customers with a user-friendly interface, allowing them to browse, search, and select the most suitable IT solutions based on their requirements. Customers can also access real-time data and analytics through System 110, empowering them to make informed decisions and optimize their IT infrastructure.

End customers 130 can be the ultimate beneficiaries of the IT solutions provided by System 110. They may include businesses or individuals who utilize IT products and services to enhance their operations, productivity, or daily activities. End customers rely on System 110 to access a wide array of IT solutions, ensuring they have access to the latest technologies and innovations in the market. System 110 enables end customers to track their orders, receive updates on delivery status, and access customer support services, thereby enhancing their overall experience.

Vendors 140 play a crucial role within the operating environment of System 110. These vendors encompass manufacturers, distributors, and suppliers who offer a diverse range of IT products and services. System 110 acts as a centralized platform for vendors to showcase their offerings, manage inventory, and facilitate transactions with customers and resellers. Vendors can leverage System 110 to facilitate their supply chain operations, manage pricing and promotions, and gain insights into customer preferences and market trends. By integrating with System 110, vendors can expand their reach, access new markets, and enhance their overall visibility and competitiveness.

Resellers 150 can be intermediaries within the distribution model who bridge the gap between vendors and customers. They play a vital role in the IT distribution ecosystem by connecting customers with the right IT solutions from various vendors. Resellers may include retailers, value-added resellers (VARs), system integrators, or managed service providers. System 110 enables resellers to access a comprehensive catalog of IT solutions, manage their sales pipeline, and provide value-added services to customers. By leveraging System 110, resellers can enhance their customer relationships, optimize their product offerings, and increase their revenue streams.

Within the operating environment of System 110, there can be various dynamics and characteristics that contribute to its effectiveness. These dynamics include real-time data exchange, integration with existing enterprise systems, scalability, and flexibility. System 110 ensures that relevant data can be exchanged in real-time between users, enabling accurate decision-making and timely actions. Integration with existing enterprise systems such as enterprise resource planning (ERP) systems, customer relationship management (CRM) systems, and warehouse management systems allows for communication and interoperability, eliminating data silos and enabling end-to-end visibility.

System 110 can achieve scalability and flexibility. It can accommodate the growing demands of the IT distribution model, whether it involves an expanding customer base, an increasing number of vendors, or a wider range of IT products and services. System 110 can be configured to handle large-scale data processing, storage, and analysis, ensuring that it can support the evolving needs of the distribution platform. Additionally, System 110 leverages a technology stack that includes .NET, Java, and other suitable technologies, providing a robust foundation for its operations.

In summary, the operating environment of System 110 within the IT distribution model encompasses customers 120, end customers 130, vendors 140, resellers 150, and other entities involved in the distribution process. System 110 serves as a centralized platform that facilitates efficient collaboration, communication, and transactional processes between these users. By leveraging real-time data exchange, integration, scalability, and flexibility, System 110 empowers users to optimize their operations, enhance customer experiences, and drive business success within the IT distribution ecosystem.

Figure 2:
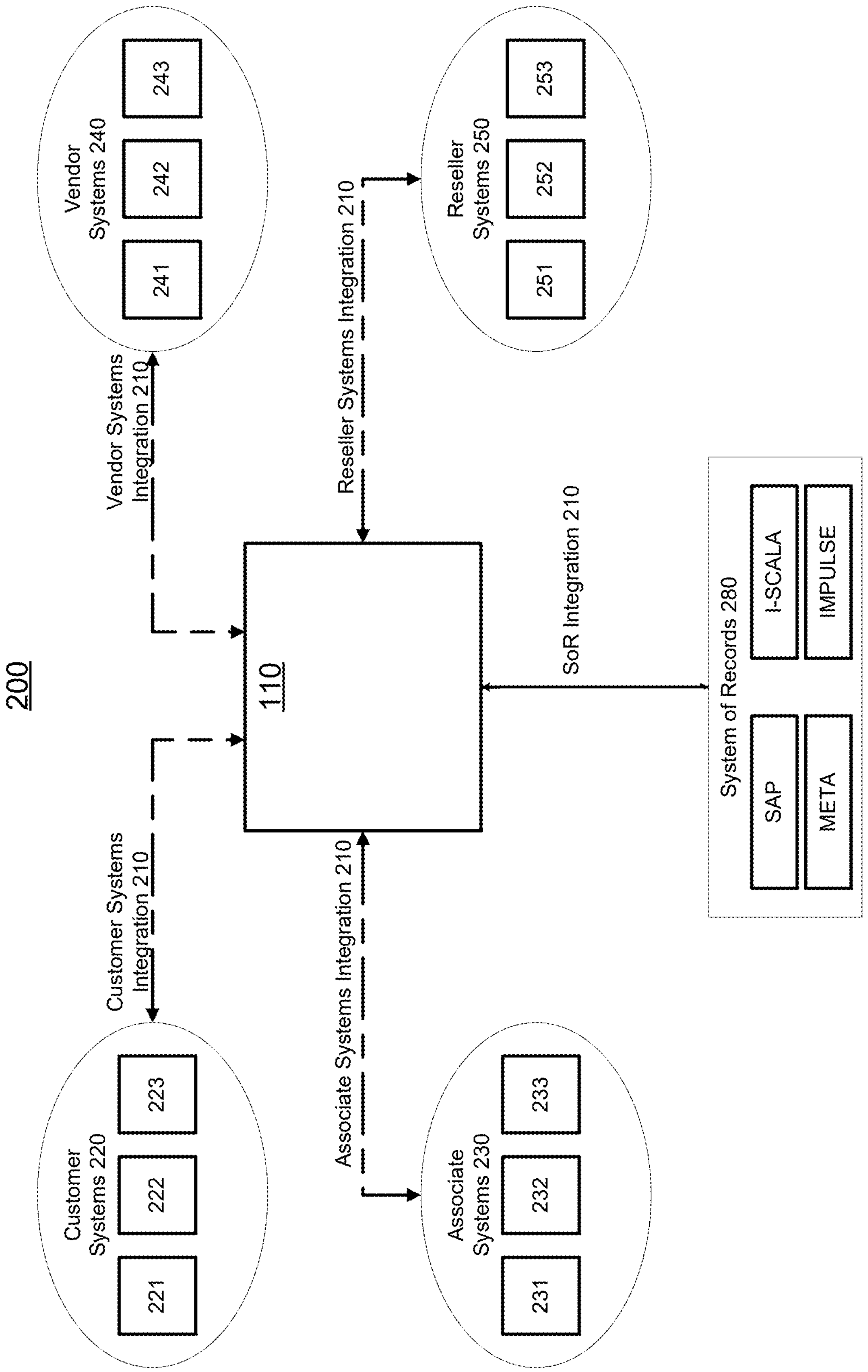
FIG. 2 illustrates one embodiment of an operating environment of the distribution platform, which builds upon the elements introduced in FIG. 1.

FIG. 2 depicts the operating environment 200 of the distribution platform, expanding upon elements introduced in FIG. 1. This environment features integration points 210, which enable data flow and connectivity among various systems like customer systems 220, vendor systems 240, reseller systems 260, and other entities within the Relevancy Search process. FIG. 2 illustrates the network's interconnectedness and mechanisms that facilitate collaborative and data-driven decision-making for Relevancy Search. Operating environment 200 configures to automate Relevancy Search processes using AI and ML technologies, processing and analyzing data for search enhancement.

Some embodiments of the Relevancy Search process involve a systematic approach to enhance search capabilities and user engagement within the distribution platform. This process encompasses several technological components: Collection of diverse data including user search queries, product specifications, and historical search patterns. This data, aggregated from sources like search logs and product databases, feeds into the Real-Time Data Mesh (RTDM). RTDM processes and standardizes this data, serving as a centralized repository for real-time data updating and retrieval. The AAML Module analyzes this aggregated data to identify optimal strategies for enhancing search relevancy. It segments search queries based on data-driven insights and predicted user preferences. The Relevancy Search Engine Module, informed by AAML Module insights, configures search algorithms for each user or market segment. It applies predictive models and heuristic algorithms to determine search results that align with specific user requirements. Users interact with these search results through the SPoG UI, exploring and selecting relevant products or services. The system includes a feedback loop where user interactions with search results are collected and analyzed, continually refining the search experience.

AI algorithms in the Relevancy Search process address search relevancy, user preferences, and optimization of search results. Machine learning models, such as neural networks and decision trees, refine search algorithms. The Relevancy Search process uses ML-based algorithms for real-time search optimization. Advanced analytics, like ensemble learning or reinforcement learning, continuously improve the Relevancy Search process. AI and ML technologies in operating environment 200 employ supervised and unsupervised learning algorithms, including convolutional neural networks for pattern recognition and logistic regression for decision-making. These components adapt dynamically to changing data inputs like user search behavior and market conditions, optimizing search pathways through reinforcement learning. ML components leverage predictive analytics, continuously refining outputs by assimilating new data to enhance search relevancy and user engagement.

Operating environment 200 includes System 110 as the central hub for managing the Relevancy Search process. System 110 functions as a bridge among customer systems 220, vendor systems 240, reseller systems 260, and other entities. It integrates communication, data exchange, and transactional processes, offering a cohesive experience. Moreover, environment 200 features integration points 210, using a hybrid architecture that combines RESTful APIs and WebSockets for real-time data exchange and synchronization. This architecture secures with SSL/TLS protocols, safeguarding data during transit.

Customer System Integration: Integration point 210 enables System 110 to connect with customer systems 220, facilitating efficient data exchange and synchronization. Customer systems 220 may include entities like customer system 221, customer system 222, and customer system 223. These systems represent internal systems used by customers, such as ERP or CRM systems. Integration with customer systems 220 allows customers to access real-time information on search results, including personalized recommendations, pricing details, and other relevant data, enhancing their search experience. This integration offers an automated, real-time solution for optimizing search relevancy and user engagement.

Data exchange among customer systems 220, vendor systems 240, and reseller systems 260 is enabled by a robust ETL (Extract, Transform, Load) described below in reference to the real-time data mesh architecture, in ensuring data consistency and reliability. This interaction can be governed by predefined business rules and logic, which dictate the data flow and processing methodologies. Advanced mapping and transformation tools are employed to harmonize disparate data formats, allowing for integration and utilization of data across these systems. Orchestrated data exchange supports synchronized operations, enabling efficient and informed decision-making across the distribution network.

Associate System Integration: Integration point 210 enables System 110 to connect with associate systems 230, facilitating efficient data exchange and synchronization. These systems contribute to the overall efficiency of Relevancy Search processing by providing relevant market and product data.

Vendor System Integration: Integration point 210 facilitates the connection between System 110 and vendor systems 240. Vendor systems 240 may include entities like vendor system 241, vendor system 242, and vendor system 243, representing inventory management, pricing systems, and product catalogs. Integration with vendor systems 240 ensures vendors can efficiently update their offerings and receive real-time notifications, to facilitate the Relevancy Search process.

Reseller System Integration: Integration point 210 allows reseller systems 260 to connect with System 110. Reseller systems 260 encompass entities such as reseller system 261, reseller system 262, and reseller system 263, handling sales, customer management, and service delivery.

Other Entity System Integration: Integration point 210 also connects other entities involved in the distribution process, facilitating collaboration and efficient distribution. This integration ensures real-time data exchange for Relevancy Search processing and decision-making in the distribution ecosystem.

System 110's configuration includes sophisticated AI and ML capabilities to optimize Relevancy Search processing according to individual preferences, ensuring relevance and optimization in the distribution process.

Integration points 210 also enable connectivity with System of Records 280, for additional data management and integration. Representing System of Records 280 can represent enterprise resource planning (ERP) systems or customer relationship management (CRM) systems, including both future systems as well as legacy ERP systems such as SAP, Impulse, META, I-SCALA, and others. System of Records can include one or more storage repositories of critical and legacy business data. It facilitates integration of data exchange and synchronization between the distribution platform, System 110, and the ERPs, enabling real-time updates and ensuring the availability of accurate and up-to-date information. Integration points 210 establish connectivity between the System of Records 280 and the distribution platform, allowing stakeholders to leverage rich data stored in the ERPs for efficient collaboration, data-driven decision-making, and streamlined distribution processes. These systems represent the internal systems utilized by customers, vendors, and others.

Integration points 210 within the operating environment 200 can be facilitated through standardized protocols, APIs, and data connectors. These mechanisms ensure compatibility, interoperability, and secure data transfer between the distribution platform and the connected systems. System 110 employs industry-standard protocols, such as RESTful APIs, SOAP, or GraphQL, to establish communication channels and enable data exchange.

In some embodiments, System 110 can incorporate authentication and authorization mechanisms to ensure secure access and data protection. Technologies such as OAuth or JSON Web Tokens (JWT) can be employed to authenticate users, authorize data access, and maintain the integrity and confidentiality of the exchanged information.

In some embodiments, integration points 210 and data flow within the operating environment 200 enable users to operate within a connected ecosystem. Data generated at various stages of the Relevancy Search process, including user search queries, product information, and search interactions, flows between customer systems 220, vendor systems 240, reseller systems 260, and other entities. This data exchange facilitates real-time visibility, enables data-driven decision-making, and enhances operational efficiency throughout the distribution platform.

In some embodiments, System 110 leverages advanced technologies such as Typescript, NodeJS, ReactJS, .NET Core, C#, and other suitable technologies to support the integration points 210 and enable communication within the operating environment 200. These technologies provide a robust foundation for System 110, ensuring scalability, flexibility, and efficient data processing capabilities. Moreover, the integration points 210 may also employ algorithms, data analytics, and machine learning techniques to derive valuable insights, optimize distribution processes, and personalize customer experiences. Integration points 210 and data flow within the operating environment 200 enable users to operate within a connected ecosystem. Data generated at various touchpoints, including customer orders, inventory updates, pricing changes, or delivery status, flows between the different entities, systems, and components. The integrated data can be processed, harmonized, and made available in real-time to relevant users through System 110. This real-time access to accurate and current information empowers users to make informed decisions, optimize supply chain operations, and enhance customer experiences.

Several elements in the operating environment depicted in FIG. 2 can include conventional, well-known elements that are explained only briefly here. For example, each of the customer systems, such as customer systems 220, could include a desktop personal computer, workstation, laptop, PDA, cell phone, or any wireless access protocol (WAP) enabled device, or any other computing device capable of interfacing directly or indirectly with the Internet or other network connection. Each of the customer systems typically can run an HTTP client, such as Microsoft's Edge browser, Google's Chrome browser, Opera's browser, or a WAP-enabled browser for mobile devices, allowing customer systems to access, process, and view information, pages, and applications available from the distribution platform over the network.

Moreover, each of the customer systems can typically be equipped with user interface devices such as keyboards, mice, trackballs, touchpads, touch screens, pens, or similar devices for interacting with a graphical user interface (GUI) provided by the browser. These user interface devices enable users of customer systems to navigate the GUI, interact with pages, forms, and applications, and access data and applications hosted by the distribution platform.

The customer systems and their components can be operator-configurable using applications, including web browsers, which run on central processing units such as Intel Pentium processors or similar processors. Similarly, the distribution platform (System 110) and its components can be operator-configurable using applications that run on central processing units, such as the processor system, which may include Intel Pentium processors or similar processors, and/or multiple processor units.

Computer program product embodiments include machine-readable storage media containing instructions to program computers to perform the processes described herein. The computer code for operating and configuring the distribution platform and the customer systems, vendor systems, reseller systems, and other entities' systems to intercommunicate, process webpages, applications, and other data, can be downloaded and stored on hard disks or any other volatile or non-volatile memory medium or device, such as ROM, RAM, floppy disks, optical discs, DVDs, CDs, micro-drives, magneto-optical disks, magnetic or optical cards, nano-systems, or any suitable media for storing instructions and data.

Furthermore, the computer code for implementing the embodiments can be transmitted and downloaded from a software source over the Internet or any other conventional network connection using communication mediums and protocols such as TCP/IP, HTTP, HTTPS, Ethernet, etc. The code can also be transmitted over extranets, VPNs, LANs, or other networks, and executed on client systems, servers, or server systems using programming languages such as C, C++, HTML, Java, JavaScript, ActiveX, VBScript, and others.

It will be appreciated that the embodiments can be implemented in various programming languages executed on client systems, servers, or server systems, and the choice of language may depend on the specific requirements and environment of the distribution platform.

Thereby, operating environment 200 can couple a distribution platform with one or more integration points 210 and data flow to enable efficient collaboration and streamlined distribution processes.

Figure 3:
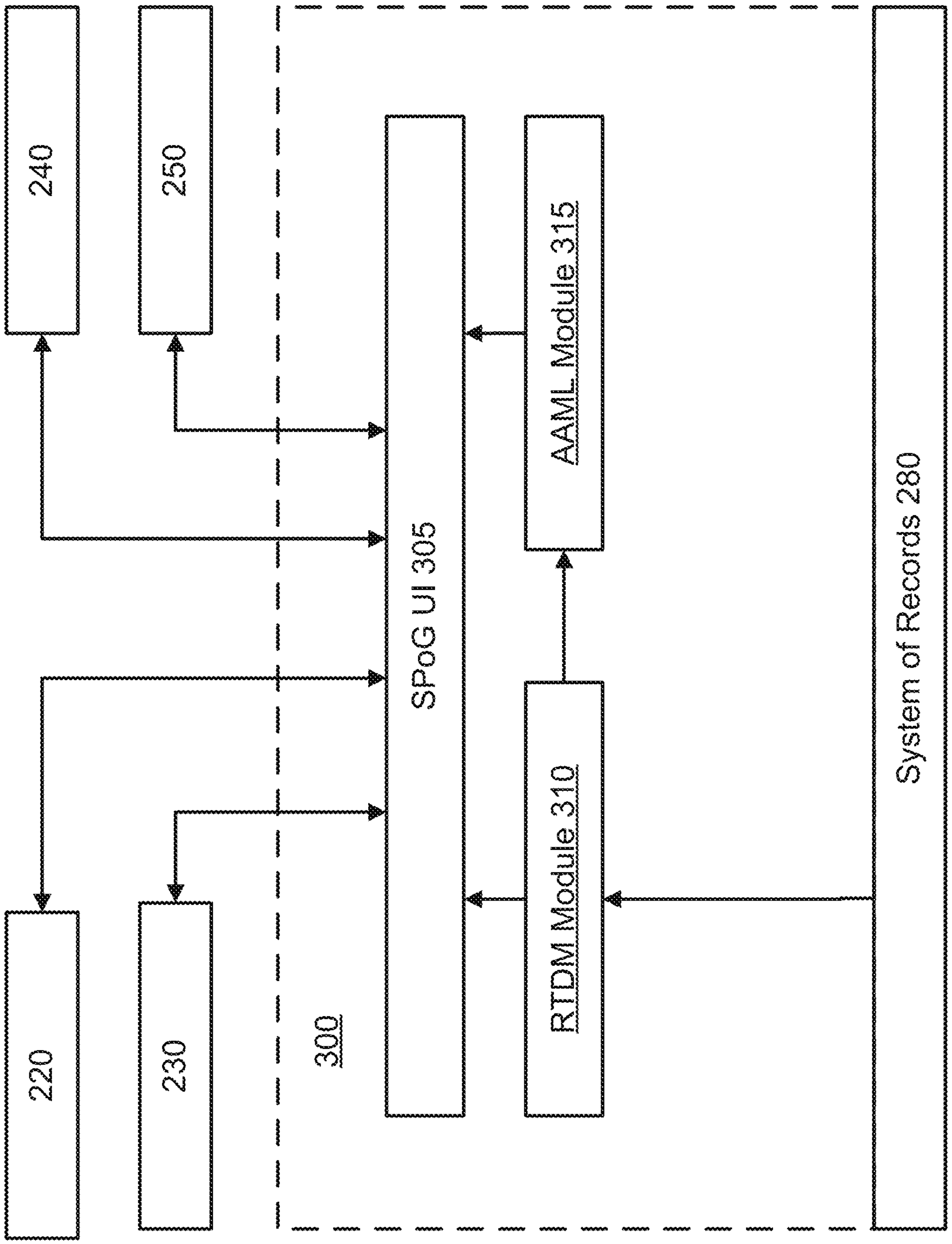
FIG. 3 illustrates an embodiment of a system for distribution management.

FIG. 3 illustrates a system 300 for supply chain and distribution management. System 300 (FIG. 3) is a supply chain and distribution management solution configured to address the challenges faced by fragmented distribution ecosystems in the global distribution industry. System 300 can include several interconnected components and modules that work in harmony to optimize supply chain and distribution operations, enhance collaboration, and drive business efficiency.

The Single Pane of Glass (SPoG) UI 305 serves as a centralized user interface, providing users with a unified view of the entire supply chain. It consolidates information from various sources and presents real-time data, analytics, and functionalities tailored to the specific roles and responsibilities of users. By offering a customizable and intuitive dashboard-style layout, the SPoG UI enables users to access relevant information and tools, empowering them to make data-driven decisions and efficiently manage their supply chain and distribution activities.

For example, a logistics manager can use the SPoG UI to monitor the status of shipments, track delivery routes, and view real-time inventory levels across multiple warehouses. They can visualize data through interactive charts and graphs, such as a map displaying the current location of each shipment or a bar chart showing inventory levels by product category. By having a unified view of the supply chain, the logistics manager can identify bottlenecks, optimize routes, and ensure timely delivery of goods.

The SPoG UI 305 integrates with other modules of System 300, facilitating real-time data exchange, synchronized operations, and workflows. Through API integrations, data synchronization mechanisms, and event-driven architectures, SPoG UI 305 ensures smooth information flow and enables collaborative decision-making across the distribution ecosystem. SPoG UI 305 is designed with a user-centric approach, featuring an intuitive and responsive layout. It utilizes front-end technologies to render dynamic and interactive data visualizations. Customizable dashboards allow users to tailor their views based on specific roles and requirements. The UI supports drag-and-drop functionality for ease of use, and its adaptive design ensures compatibility across various devices and platforms. Advanced filtering and search capabilities enable users to efficiently navigate and access relevant supply chain data and insights.

For instance, when a purchase order is generated in the SPoG UI, the system automatically updates the inventory levels, triggers a notification to the warehouse management system, and initiates the shipping process. This integration enables efficient order fulfillment, reduces manual errors, and enhances overall supply chain visibility.

The Real-Time Data Mesh (RTDM) module 310 is another component of System 300, responsible for ensuring the flow of data within the distribution ecosystem. It aggregates data from multiple sources, harmonizes it, and ensures its availability in real-time.

In a distribution network, the RTDM module collects data from various systems, including inventory management systems, point-of-sale terminals, and customer relationship management systems. It harmonizes this data by aligning formats, standardizing units of measurement, and reconciling any discrepancies. The harmonized data can be then made available in real-time, allowing users to access accurate and current information across the distribution and supply chain.

The RTDM module 310 can be configured to capture changes in data across multiple transactional systems in real-time. It employs a sophisticated Change Data Capture (CDC) mechanism that constantly monitors the transactional systems, detecting any updates or modifications. The CDC component can be specifically configured to work with various transactional systems, including legacy ERP systems, Customer Relationship Management (CRM) systems, and other enterprise-wide systems, ensuring compatibility and flexibility for businesses operating in diverse environments.

By having access to real-time data, users can make timely decisions and respond quickly to changing market conditions. For example, if the RTDM module detects a sudden spike in demand for a particular product, it can trigger alerts to the production team, enabling them to adjust manufacturing schedules and prevent stockouts.

The RTDM module 310 facilitates data management within supply chain operations. It enables real-time harmonization of data from multiple sources, freeing vendors, resellers, customers, and end customers from constraints imposed by legacy ERP systems. This enhanced flexibility supports improved efficiency, customer service, and innovation.

Another component of System 300 is the Advanced Analytics and Machine Learning (AAML) module 315. Leveraging powerful analytics tools and algorithms such as Apache Spark, TensorFlow, or scikit-learn, the AAML module extracts valuable insights from the collected data. It enables advanced analytics, predictive modeling, anomaly detection, and other machine learning capabilities.

For instance, the AAML module can analyze historical sales data to identify seasonal patterns and predict future demand. It can generate forecasts that help optimize inventory levels, ensure stock availability during peak seasons, and minimize excess inventory costs. By leveraging machine learning algorithms, the AAML module automates repetitive tasks, predicts customer preferences, and optimizes supply chain processes.

In addition to demand forecasting, the AAML module can provide insights into customer behavior, enabling targeted marketing campaigns and personalized customer experiences. For example, by analyzing customer data, the module can identify cross-selling or upselling opportunities and recommend relevant products to individual customers.

Furthermore, the AAML module can analyze data from various sources, such as social media feeds, customer reviews, and market trends, to gain a deeper understanding of consumer sentiment and preferences. This information can be used to inform product development decisions, identify emerging market trends, and adapt business strategies to meet evolving consumer expectations.

System 300 emphasizes integration and interoperability to connect with existing enterprise systems such as ERP systems, warehouse management systems, and customer relationship management systems. By establishing connections and data flows between these systems, System 300 enables smooth data exchange, process automation, and end-to-end visibility across the supply chain. Integration protocols, APIs, and data connectors facilitate communication and interoperability among different modules and components, creating a holistic and connected distribution ecosystem.

The implementation and deployment of System 300 can be tailored to meet specific business needs. It can be deployed as a cloud-native solution using containerization technologies like Docker and orchestration frameworks like Kubernetes. This approach ensures scalability, easy management, and efficient updates across different environments. The implementation process involves configuring the system to align with specific supply chain requirements, integrating with existing systems, and customizing the modules and components based on the business's needs and preferences.

System 300 for supply chain and distribution management is a comprehensive and innovative solution that addresses the challenges faced by fragmented distribution ecosystems. It combines the power of the SPoG UI 305, the RTDM module 310, and the AAML module 315, along with integration with existing systems. By leveraging a diverse technology stack, scalable architecture, and robust integration capabilities, System 300 provides end-to-end visibility, data-driven decision-making, and optimized supply chain operations. The examples and options provided in this description are non-limiting and can be customized to meet specific industry requirements, driving efficiency and success in supply chain and distribution management.

Figure 4:
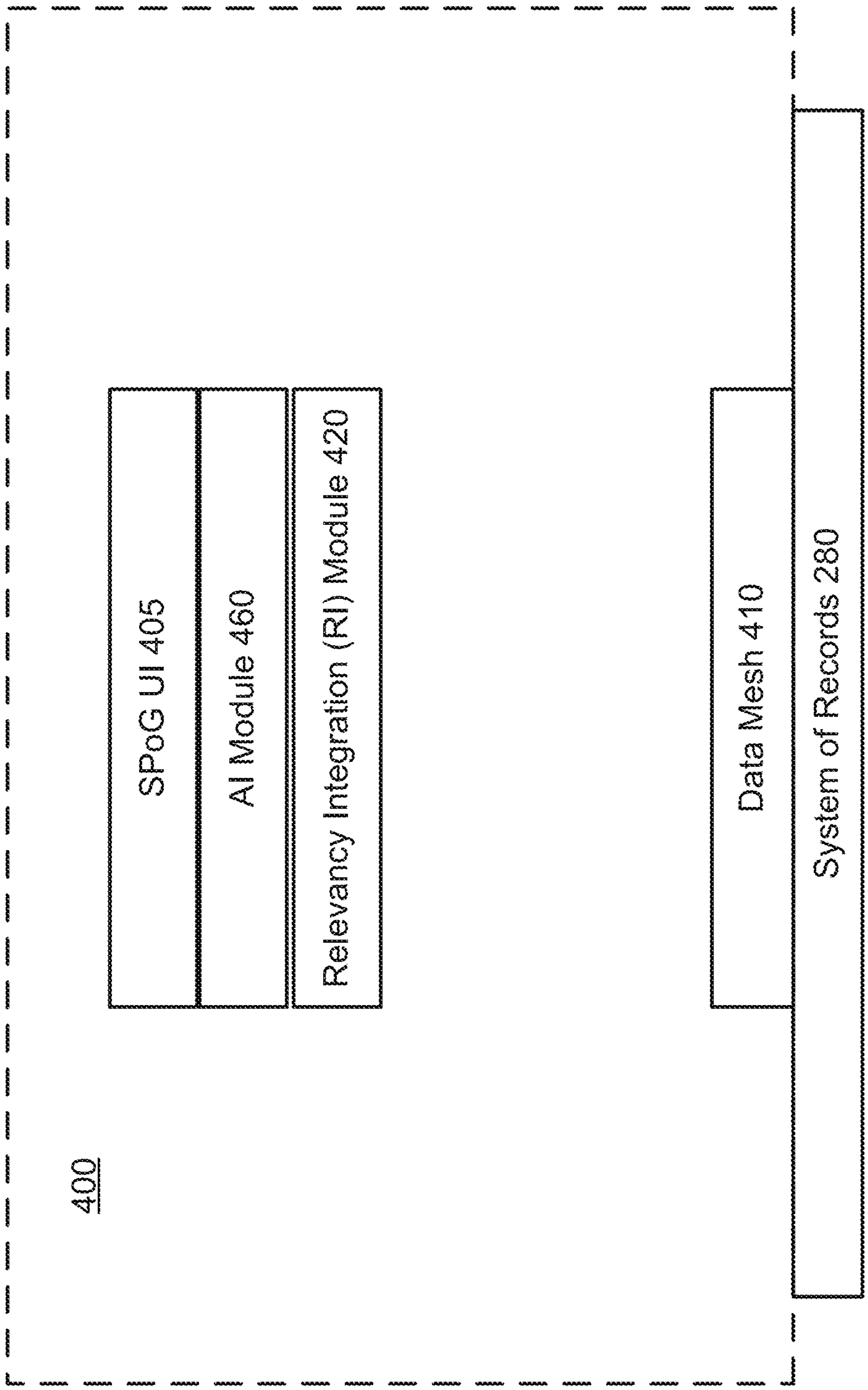
FIG. 4 depicts a system for automated relevancy search processes, according to an embodiment.

FIG. 4 depicts an embodiment of System 400 for an AI-driven relevancy search model, incorporating the SPoG UI, RTDM, and AI/ML technologies, with interactions to achieve a comprehensive relevancy search system. System 400 is configured for integration with existing reseller systems, ensuring efficient data exchange and system synchronization.

The SPoG UI 405 serves as the primary user interface. Users interact with this interface to perform various tasks provides straightforward interaction and customization. It displays information and options that are relevant to the distinct business models and customer demographics of the resellers. It displays real-time data from the Data Mesh 410 and provides controls for initiating actions in System 400. For example, a user can interact with a dynamic display for service options, interactive elements for search customization, and tools for real-time feedback on user selections, directly from the SPoG UI 405. It integrates with other system components to reflect accurate service information and user customization options. The SPoG UI is developed using web-based technologies, allowing it to be accessed from various types of devices such as desktop computers, laptops, tablets, and smartphones. SPoG UI 405 provides a comprehensive view of the entire distribution ecosystem, consolidating data and functionalities from various modules into a centralized, easy-to-navigate platform. SPoG UI 405 simplifies the management of complex distribution tasks, offering a streamlined experience for resellers. In some embodiments, SPoG 405 comprises dynamic pricing tools, displaying variable costs based on individual user consumption patterns.

Data Mesh 410 is a sophisticated data management layer. It aggregates and harmonizes data from various sources, including ERPs, Vendor platforms, third-party databases, etc. This component ensures that all operational modules in System 400 access consistent and up-to-date information. System 400 can synchronize with existing reseller systems, ensuring efficient data exchange and system functionality Data mesh 410 aggregates, harmonizes, and ensures the real-time availability of data from various systems like inventory management, point-of-sale, and CRM. It employs Change Data Capture (CDC) to track real-time changes in transactional systems. This module standardizes data formats and units, ensuring data consistency and accuracy for decision-making processes related to service offerings.

AI Module 460 uses machine learning algorithms and predictive modeling to automate relevancy search models. AI Module 460 analyzes market trends, user preferences, and consumption data to dynamically adjust search experiences. AI Module 460 is configured to dynamically adjust automated search models based on real-time usage data. This allows for a flexible search model that adapts to changing user needs and consumption habits.

AI Module 460 includes decision support systems for personalizing relevancy search criteria based on sophisticated data analysis. In some embodiments, AI Module 460 employs deep learning neural networks, specifically convolutional neural networks (CNNs) and recurrent neural networks (RNNs), for pattern recognition and time-series analysis. For example, CNNs can be used to identify trends and patterns in market data, while RNNs, particularly LSTM (Long Short-Term Memory) networks, can analyze sequential data, such as time-based user interaction patterns. In some embodiments, AI module 460 can use decision trees for classification and regression tasks. These trees analyze user data and market conditions to segment users into different categories based on their service preferences. Random forest and gradient boosting algorithms, ensemble methods of decision trees, provide improved accuracy and stability in predictions. In some embodiments, clustering, particularly K-means and hierarchical clustering, is employed to segment the market and user base into distinct groups. Market/user segmentation assists AI Module 460 in understanding varied user preferences and customizing relevancy search models for different market segments. In some embodiments, these models can be configured to extract semantic meaning and relational patterns even from fragmented or inconsistently formatted input data, reducing dependency on conventional data preparation workflows.

In some embodiments, AI Module 460 can use reinforcement learning (RL) to adapt service offerings based on user feedback. RL algorithms, particularly Q-learning and policy gradient methods, can adjust models to maximize user satisfaction, learning from each interaction to improve recommendation accuracy. I The module integrates reinforcement learning algorithms to continually adapt service offerings based on user feedback, enhancing the accuracy and relevance of customized search models over time. Further, NLP techniques can be employed to analyze user feedback and queries. Utilizing tokenization, sentiment analysis, and named entity recognition, AI Module 460 interprets user feedback, enhancing the service customization process.

Real-time processing based on Data Mesh 410 enables AI module 460 to dynamically adjust service offerings based on current usage patterns and immediate market feedback. Data Mesh 410 also enables precise tracking of real-time usage data for implementing a usage-based pricing strategy. Data Mesh 410 can include collaborative filtering and content-based recommendation systems to analyze user behavior and preferences, comparing them with similar user profiles or content characteristics to suggest appropriate service adjustments.

In some embodiments, AI Module 460 can integrate predictive analytics tools, employing time series forecasting methods (e.g., AutoRegressive Integrated Moving Average, exponential smoothing, etc.) for predicting future service demand. Optimization algorithms, such as linear programming and genetic algorithms, can facilitate optimal relevancy search configurations, considering various factors like cost, user preferences, and resource availability to recommend the most effective service bundles. AI Module 460 can employ Monte Carlo simulations and scenario analysis for risk assessment and strategic planning, simulating different market scenarios, evaluating the potential impacts of relevancy search configurations and models under different conditions.

Relevancy Integration (RI) Module 420 is configured to generate AI-powered relevancy search, incorporating the SPoG UI, Data Mesh, and AI technologies, with interactions to achieve a comprehensive search solution. In some embodiments, RI Module 420 is configured via data mesh for integration with existing distribution systems, ensuring efficient data exchange and system synchronization.

In some embodiments, RI Module 420 is integrated with AI Module 460 to enhance search experiences using machine learning algorithms and predictive modeling. RI Module 420 can leverage historical search data, user preferences, and market trends to dynamically adjust search relevancy and optimize search results, moving away from a pull model, where customers query what they are interested in, to a push model where the system intelligently determines insights and recommendations based on relevancy to the user. RI Module 420 can invoke AI Module 460 to analyze user interactions with search results to continually improve relevancy and engagement. For example, RI Module 420 can integrate with AI Module 460 to provide decision support systems for personalizing search results based on sophisticated data analysis. Deep learning neural networks, such as convolutional neural networks (CNNs) and recurrent neural networks (RNNs), can be employed via AI Module 460 for pattern recognition and analysis of search queries and results. Reinforcement learning algorithms, such as Q-learning and policy gradient methods, can be integrated via AI Module 460 to adapt search results based on user feedback. In another non-limiting example, NLP algorithms can be utilized to analyze user queries and feedback, for enhancing the search customization process.

RI Module 420 can leverage real-time processing based on Data Mesh 410 and AI Module 460 to dynamically adjust search results based on current usage patterns and immediate feedback. Collaborative filtering and content-based recommendation systems can be employed to analyze user behavior and preferences, suggesting relevant search adjustments.

In some embodiments, RI Module 420 can utilize predictive analytics tools, including time series forecasting methods and optimization algorithms, via AI Module 460, for predicting future search trends and optimizing search results. Monte Carlo simulations and scenario analysis can be utilized for risk assessment and strategic planning related to search relevancy and engagement.

RI Module 420 is thereby configured for managing search operations, analyzing search metrics, personalizing search experiences, and optimizing search resources within the distribution ecosystem. AI-powered relevancy search provides a comprehensive solution that addresses challenges faced by distribution ecosystems. System 400 provides personalized and optimized search experiences, driving engagement and efficiency in distribution operations. The examples and options provided in this description are non-limiting and can be customized to meet specific industry requirements, enhancing the search functionality in distribution environments.

Figure 5:
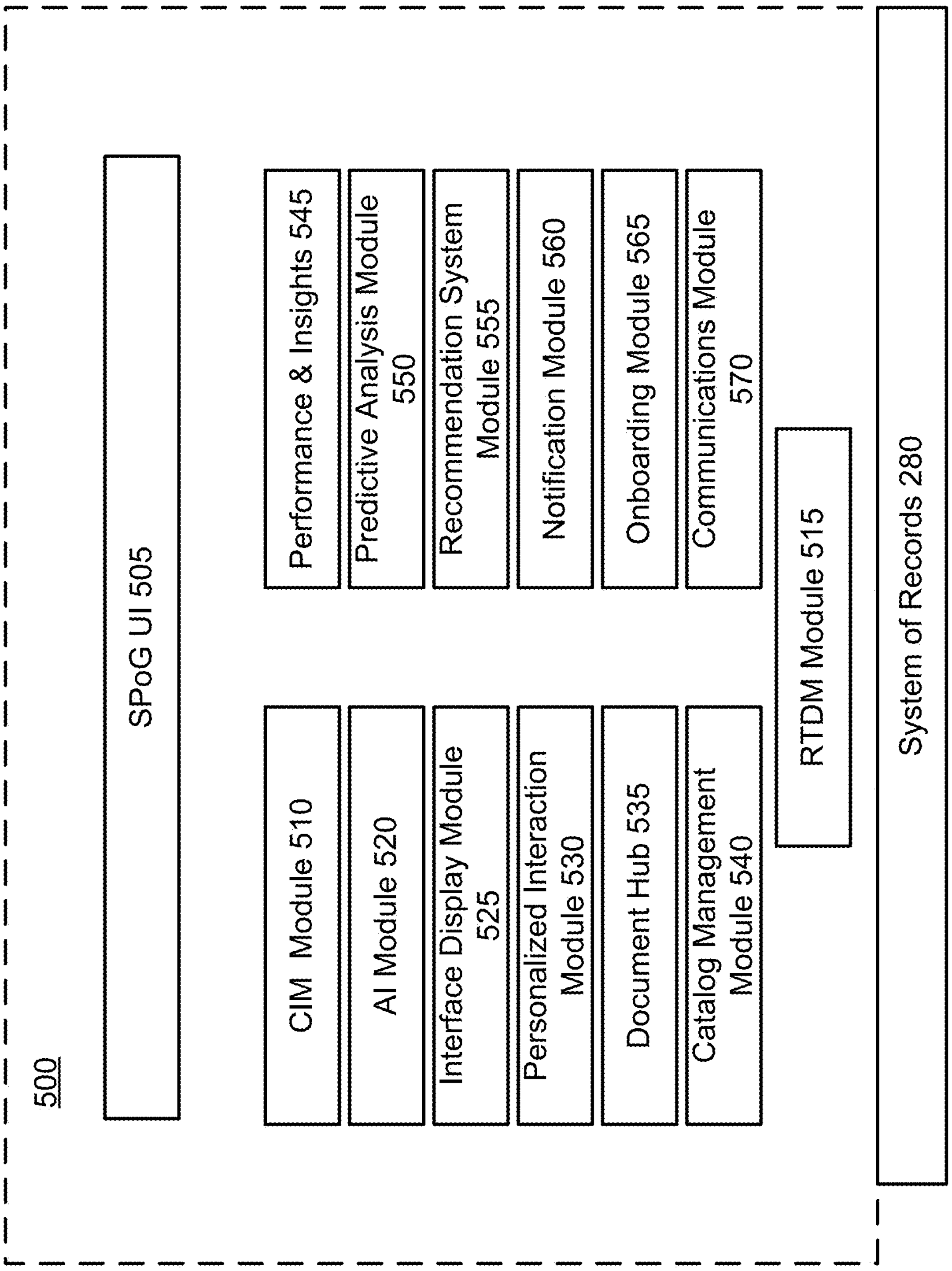
FIG. 5 illustrates an RTDM module, according to an embodiment.

FIG. 5 depicts an embodiment of an advanced distribution platform including System 500 for managing a complex distribution network, which can be an embodiment of System 300, and provides a technology distribution platform for optimizing the management and operation of distribution networks. System 500 includes several interconnected modules, each serving specific functions and contributing to the overall efficiency of supply chain operations. In some embodiments, these modules can include SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570.

System 500, as an embodiment of System 300, can use a range of technologies and algorithms to enable supply chain and distribution management. These technologies and algorithms facilitate efficient data processing, personalized interactions, real-time analytics, secure communication, and effective management of documents, catalogs, and performance metrics.

The SPoG UI 505, in some embodiments, serves as the central interface within System 500, providing users with a unified view of the entire distribution network. It utilizes frontend technologies such as ReactJS, TypeScript, and Node.js to create interactive and responsive user interfaces. These technologies enable the SPoG UI 505 to deliver a user-friendly experience, allowing users to access relevant information, navigate through different modules, and perform tasks efficiently.

The CIM 510, or Customer Interaction Module, employs algorithms and technologies such as Oracle Eloqua, Adobe Target, and Okta to manage customer relationships within the distribution network. These technologies enable the module to handle customer data securely, personalize customer experiences, and provide access control for users.

The RTDM module 515, or Real-Time Data Mesh module, is a component of System 500 that ensures the smooth flow of data across the distribution ecosystem. It utilizes technologies such as Apache Kafka, Apache Flink, or Apache Pulsar for data ingestion, processing, and stream management. These technologies enable the RTDM module 515 to handle real-time data streams, process large volumes of data, and ensure low-latency data processing. Additionally, the module employs Change Data Capture (CDC) mechanisms to capture real-time data updates from various transactional systems, such as legacy ERP systems and CRM systems. This capability allows users to access current and accurate information for informed decision-making.

The AI module 520 within System 500 can use advanced analytics and machine learning algorithms, including Apache Spark, TensorFlow, and scikit-learn, to extract valuable insights from data. These algorithms enable the module to automate repetitive tasks, predict demand patterns, optimize inventory levels, and improve overall supply chain efficiency. For example, the AI module 520 can utilize predictive models to forecast demand, allowing users to optimize inventory management and minimize stockouts or overstock situations.

The Interface Display Module 525 focuses on presenting data and information in a clear and user-friendly manner. It utilizes technologies such as HTML, CSS, and JavaScript frameworks like ReactJS to create interactive and responsive user interfaces. These technologies allow users to visualize data using various data visualization techniques, such as graphs, charts, and tables, enabling efficient data comprehension, comparison, and trend analysis.

The Personalized Interaction Module 530 utilizes customer data, historical trends, and machine learning algorithms to generate personalized recommendations for products or services. It employs technologies like Adobe Target, Apache Spark, and TensorFlow for data analysis, modeling, and delivering targeted recommendations. For example, the module can analyze customer preferences and purchase history to provide personalized product recommendations, enhancing customer satisfaction and driving sales.

The Document Hub 535 serves as a centralized repository for storing and managing documents within System 500. It utilizes technologies like SeeBurger and Elastic Cloud for efficient document management, storage, and retrieval. For instance, the Document Hub 535 can employ SeeBurger's document management capabilities to categorize and organize documents based on their types, such as contracts, invoices, product specifications, or compliance documents, allowing users to easily access and retrieve relevant documents when needed.

The Catalog Management Module 540 enables the creation, management, and distribution of current product catalogs. It ensures that users have access to the latest product information, including specifications, pricing, availability, and promotions. Technologies like Kentico and Akamai can be employed to facilitate catalog updates, content delivery, and caching. For example, the module can use Akamai's content delivery network (CDN) to deliver catalog information to users quickly and efficiently, regardless of their geographical location.

The Performance and Insight Markers Display 545 collects, analyzes, and visualizes real-time performance metrics and insights related to supply chain operations. It utilizes tools like Splunk and Datadog to enable effective performance monitoring and provide actionable insights. For instance, the module can utilize Splunk's log analysis capabilities to identify performance bottlenecks in the supply chain, enabling users to take proactive measures to optimize operations.

The Predictive Analytics Module 550 employs machine learning algorithms and predictive models to forecast demand patterns, optimize inventory levels, and enhance overall supply chain efficiency. It utilizes technologies such as Apache Spark and TensorFlow for data analysis, modeling, and prediction. For example, the module can utilize TensorFlow's deep learning capabilities to analyze historical sales data and predict future demand, allowing users to optimize inventory levels and minimize costs.

The Recommendation System Module 555 focuses on providing intelligent recommendations to users within the distribution network. It generates personalized recommendations for products or services based on customer data, historical trends, and machine learning algorithms. Technologies like Adobe Target and Apache Spark can be employed for data analysis, modeling, and delivering targeted recommendations. For instance, the module can use Adobe Target's recommendation engine to analyze customer preferences and behavior, and deliver personalized product recommendations across various channels, enhancing customer engagement and driving sales.

The Notification Module 560 enables the distribution of real-time notifications to users regarding important events, updates, or alerts within the supply chain. It utilizes technologies like Apigee X and TIBCO for message queues, event-driven architectures, and notification delivery. For example, the module can utilize TIBCO's messaging infrastructure to send real-time notifications to users' devices, ensuring timely and relevant information dissemination.

The Self-Onboarding Module 565 facilitates the onboarding process for new users entering the distribution network. It provides guided steps, tutorials, or documentation to help users become familiar with the system and its functionalities. Technologies such as Okta and Kentico can be employed to ensure secure user authentication, access control, and self-learning resources. For instance, the module can utilize Okta's identity and access management capabilities to securely onboard new users, providing them with appropriate access permissions and guiding them through the system's functionalities.

The Communication Module 570 enables communication and collaboration within System 500. It provides channels for users to interact, exchange messages, share documents, and collaborate on projects. Technologies like Apigee Edge and Adobe Launch can be employed to facilitate secure and efficient communication, document sharing, and version control. For example, the module can utilize Apigee Edge's API management capabilities to ensure secure and reliable communication between users, enabling them to collaborate effectively.

Thereby, System 500 can incorporate various modules that utilize a diverse range of technologies and algorithms to optimize supply chain and distribution management. These modules, including SPoG UI 505, CIM 510, RTDM module 515, AI module 520, Interface Display Module 525, Personalized Interaction Module 530, Document Hub 535, Catalog Management Module 540, Performance and Insight Markers Display 545, Predictive Analytics Module 550, Recommendation System Module 555, Notification Module 560, Self-Onboarding Module 565, and Communication Module 570, work together to provide end-to-end visibility, data-driven decision-making, personalized interactions, real-time analytics, and streamlined communication within the distribution network. The incorporation of specific technologies and algorithms enables efficient data management, secure communication, personalized experiences, and effective performance monitoring, contributing to enhanced operational efficiency and success in supply chain and distribution management.

Real Time Data Mesh

Figure 6:
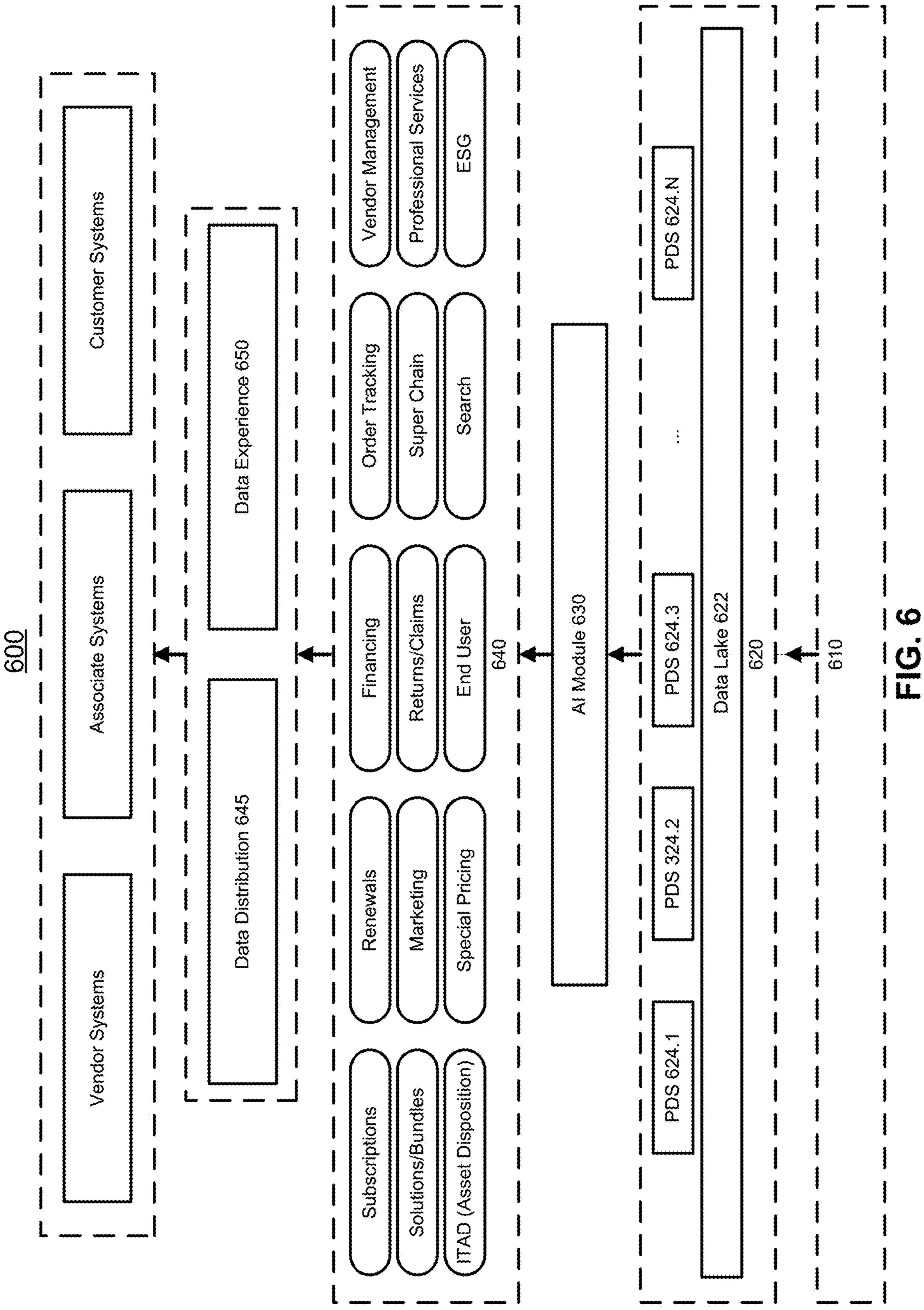
FIG. 6 illustrates a SPoG UI, according to an embodiment.

FIG. 6 illustrates RTDM module 600, according to an embodiment. RTDM module 600, which can be an embodiment of RTDM module 310, can include interconnected components, processes, and sub-systems configured to enable real-time data management and analysis.

The RTDM module 600, as depicted in FIG. 5, represents an effective data mesh and change capture component within the overall system architecture. The module can be configured to provide real-time data management and standardization capabilities, enabling efficient operations within the supply chain and distribution management domain.

RTDM module 600 can include an integration layer 610 (also referred to as a "system of records") that integrates with various enterprise systems. These enterprise systems can include ERPs such as SAP, Impulse, META, and I-SCALA, among others, and other data sources. Integration layer 610 can process data exchange and synchronization between RTDM module 600 and these systems. Data feeds can be established to retrieve relevant information from the system of records, such as sales orders, purchase orders, inventory data, and customer information. These feeds enable real-time data updates and ensure that the RTDM module operates with the most current and accurate data.

RTDM module 600 can include data layer 620 configured to process and translate data for retrieval and analysis. Data layer 620 includes data mesh, a cloud-based infrastructure configured to provide scalable and fault-tolerant data storage capabilities. Within the data mesh, multiple Purposive Datastores (PDS) can be deployed to store specific types of data, such as customer data, product data, or inventory data. Each PDS can be optimized for efficient data retrieval based on specific use cases and requirements. The PDSes can be configured to store specific types of data, such as customer data, product data, finance data, and more. These PDS serve as repositories for canonized and/or standardized data, ensuring data consistency and integrity across the system.

In some embodiments, RTDM module 600 implements a data replication mechanism to capture real-time changes from multiple data sources, including transactional systems like ERPs (e.g., SAP, Impulse, META, I-SCALA). The captured data can then be processed and standardized on-the-fly, transforming it into a standardized format suitable for analysis and integration. This process ensures that the data is readily available and current within the data mesh, facilitating real-time insights and decision-making.

More specifically, data layer 620 within the RTDM module 600 can be configured as a powerful and flexible foundation for managing and processing data within the distribution ecosystem. In some embodiments, data layer 620 can encompasses a highly scalable and robust data lake, which can be referred to as data lake 622, along with a set of purposive datastores (PDSes), which can be denoted as PDSes 624.1 to 624.N. These components integrate to ensure efficient data management, standardization, and real-time availability. In some embodiments, AI-powered relevancy detection operates directly on the ingested heterogeneous data, minimizing the need for prior cleansing or structural harmonization while enabling real-time semantic interpretation across inconsistent data formats.

Data layer 620 incudes data lake 622, a state-of-the-art storage and processing infrastructure configured to handle the ever-increasing volume, variety, and velocity of data generated within the supply chain. Built upon a scalable distributed file system, such as Apache Hadoop Distributed File System (HDFS) or Amazon S3, the data lake provides a unified and scalable platform for storing both structured and unstructured data. Leveraging the elasticity and fault-tolerance of cloud-based storage, data lake 622 can accommodate the influx of data from diverse sources.

Associated with data lake 622, a population of purposive datastores, PDSes 624.1 to 624.N, can be employed. Each PDS 624 can function as a purpose-built repository optimized for storing and retrieving specific types of data relevant to the supply chain domain. In some non-limiting examples, PDS 624.1 may be dedicated to customer data, storing information such as customer profiles, preferences, and transaction history. PDS 624.2 may be focused on product data, encompassing details about SKU codes, descriptions, pricing, and inventory levels. These purposive datastores allow for efficient data retrieval, analysis, and processing, catering to the diverse needs of supply chain users.

To ensure real-time data synchronization, data layer 620 can be configured to employ one or more change data capture (CDC) mechanisms. These CDC mechanisms can be integrated with the transactional systems, such as legacy ERPs like SAP, Impulse, META, and I-SCALA, as well as other enterprise-wide systems. CDC constantly monitors these systems for any updates, modifications, or new transactions and captures them in real-time. By capturing these changes, data layer 620 ensures that the data within the data lake 622 and PDSes 624 remains current, providing users with real-time insights into the distribution ecosystem.

In some embodiments, data layer 620 can be implemented to facilitate integration with existing enterprise systems using one or more frameworks, such as .NET or Java, ensuring compatibility with a wide range of existing systems and providing flexibility for customization and extensibility. For example, data layer 620 can utilize the Java technology stack, including frameworks like Spring and Hibernate, to facilitate integration with a system of records having a population of diverse ERP systems and other enterprise-wide solutions. This can facilitate smooth data exchange, process automation, and end-to-end visibility across the supply chain.

In terms of data processing and analytics, data layer 620 can use the capabilities of distributed computing frameworks, such as Apache Spark or Apache Flink in some non-limiting examples. These frameworks can enable parallel processing and distributed computing across large-scale datasets stored in the data lake and PDSes. By leveraging these frameworks, supply chain users can perform complex analytical tasks, apply machine learning algorithms, and derive valuable insights from the data. For instance, data layer 620 can use Apache Spark's machine learning libraries to develop predictive models for demand forecasting, optimize inventory levels, and identify potential supply chain risks.

In some embodiments, data layer 620 can incorporate robust data governance and security measures. Fine-grained access control mechanisms and authentication protocols ensure that only authorized users can access and modify the data within the data lake and PDSes. Data encryption techniques, both at rest and in transit, safeguard the sensitive supply chain information against unauthorized access. Additionally, data layer 620 can implement data lineage and audit trail mechanisms, allowing users to trace the origin and history of data, ensuring data integrity and compliance with regulatory requirements.

In some embodiments, data layer 620 can be deployed in a cloud-native environment, leveraging containerization technologies such as Docker and orchestration frameworks like Kubernetes. This approach ensures scalability, resilience, and efficient resource allocation. For example, data layer 620 can be deployed on cloud infrastructure provided by AWS, Azure, or Google Cloud, utilizing their managed services and scalable storage options. This allows for scaling of resources based on demand, minimizing operational overhead and providing an elastic infrastructure for managing supply chain data.

Data layer 620 of RTDM module 600 can incorporate a highly scalable data lake, data lake 622, along with purpose-built PDSes, PDSes 624.1 to 624.N, and employing CDC mechanisms, data layer 620 ensures efficient data management, standardization, and real-time availability. In a non-limiting example, Data Layer 620 can be implemented utilizing any appropriate technology, such as .NET or Java, and/or distributed computing frameworks like Apache Spark, enables powerful data processing, advanced analytics, and machine learning capabilities. With robust data governance and security measures, data layer 620 ensures data integrity, confidentiality, and compliance. Through its scalable infrastructure and integration with existing systems, data layer 620 enables supply chain users to make data-driven decisions, optimize operations, and drive business success in the dynamic and complex distribution environment.

RTDM module 600 can include an AI module 630 configured to implement one or more algorithms and machine learning models to analyze the stored data in data layer 620 and derive meaningful insights. In some non-limiting examples, AI module 630 can apply predictive analytics, anomaly detection, and optimization algorithms to identify patterns, trends, and potential risks within the supply chain. AI module 630 can continuously learns from new data inputs and adapts its models to provide accurate and current insights. AI module 630 can generate predictions, recommendations, and alerts and publish such insights to dedicated data feeds.

Data engine layer 640 comprises a set of interconnected systems responsible for data ingestion, processing, transformation, and integration. Data engine layer 640 of RTDM module 600 can include a collection of headless engines 640.1 to 640.N that operate autonomously. These engines represent distinct functionalities within the system and can include, for example, one or more recommendation engines, insights engines, and subscription management engines. Engines 640.1 to 640.N can use the standardized data stored in the data mesh to deliver specific business logic and services. Each engine can be configured to be pluggable, allowing for flexibility and future expansion of the module's capabilities. Exemplary engines are shorn in FIG. 5, which are not intended to be limiting. Any additional headless engine can be included in data engine layer 640 or in other exemplary layers of the disclosed system.

These systems can be configured to receive data from multiple sources, such as transactional systems, IoT devices, and external data providers. The data ingestion process involves extracting data from these sources and transforming it into a standardized format. Data processing algorithms can be applied to cleanse, aggregate, and enrich the data, making it ready for further analysis and integration.

Further, to facilitate integration and access to RTDM module 600, a data distribution mechanism can be employed. Data distribution mechanism 645 can be configured to include one or more APIs to facilitate distribution of data from the data mesh and engines to various endpoints, including user interfaces, micro front ends, and external systems.

Experience layer 650 focuses on delivering an intuitive and user-friendly interface for interacting with supply chain data. Experience layer 650 can include data visualization tools, interactive dashboards, and user-centric functionalities. Through this layer, users can retrieve and analyze real-time data related to various supply chain metrics such as inventory levels, sales performance, and customer demand. The user experience layer supports personalized data feeds, allowing users to customize their views and receive relevant updates based on their roles and responsibilities. Users can subscribe to specific data updates, such as inventory changes, pricing updates, or new SKU notifications, tailored to their preferences and roles.

Thereby, in some embodiments, RTDM module 600 for supply chain and distribution management can include an integration with a system of records and include one or more of a data layer with a data mesh and purposive datastores, an AI component, a data engine layer, and a user experience layer. These components work together to provide users with intuitive access to real-time supply chain data, efficient data processing and analysis, and integration with existing enterprise systems. The technical feeds and retrievals within the module ensure that users can retrieve relevant, current information and insights to make informed decisions and optimize supply chain operations. Accordingly, RTDM module 600 facilitates supply chain and distribution management by providing a scalable, real-time data management solution. Its innovative architecture allows for the rich integration of disparate data sources, efficient data standardization, and advanced analytics capabilities. The module's ability to replicate and standardize data from diverse ERPs, while maintaining auditable and repeatable transactions, provides a distinct advantage in enabling a unified view for vendors, resellers, customers, end customers, and other entities in a distribution system, including an IT distribution system.

Automated Relevancy Search System

Figure 7:
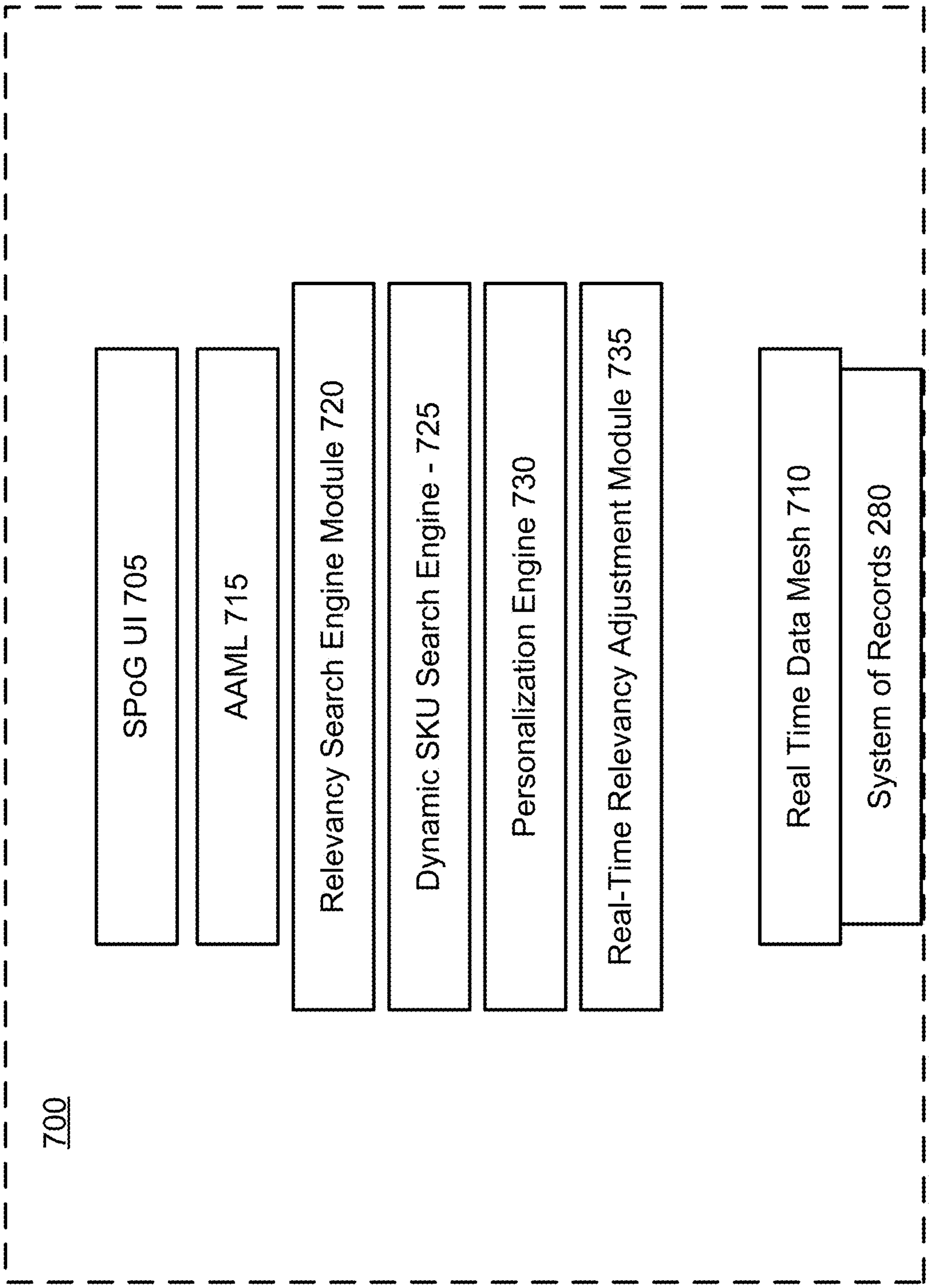
FIG. 7 illustrates a system for automated relevancy search, according to an embodiment.

In an embodiment, FIG. 7 depicts System 700 to enhance search capabilities within technology distribution platforms. System 700 includes the Real-Time Data Mesh 710, Single Pane of Glass User Interface (SPoG UI) 705, Advanced Analytics and Machine-Learning (AAML) Module 715, and the Relevancy Search Engine Module 720.

In some embodiments, SPoG UI 705, which can be an embodiment of SPoG UIs described above, can be enhanced with a push model integrating advanced search functionalities, enabling users to access relevant products and services, thereby improving the search experience and facilitating efficient navigation and discovery of products personalized to user preferences and requirement.

RTDM 710 aggregates and standardizes real-time data from various sources, enabling the efficient operation of the AI-driven relevancy search (AIRS) processes. This includes data on product specifications, subscription usage patterns, and market trends. RTDM 710 establishes a centralized, unified data hub, aggregating and standardizing data from multiple sources such as ERPs, CRM systems, and market intelligence. It utilizes a blend of data warehousing and data lakes to handle both structured and unstructured data efficiently. RTDM 710 employs ETL processes and data normalization techniques to ensure uniformity and accessibility of data. This standardized data is essential for the functioning of the Relevancy Search Engine Module 720. RTDM 710 maintains data integrity and relevance, optimizing search relevancy and user experience. In some embodiments, RTDM 710 is configured to interface with asset management systems, supporting efficient inventory management and product discovery.

AAML Module 715 functions as the central processing unit for the AIRS processes. It contains specialized rules and algorithms specialized algorithms and analytics tools to analyze search queries, product compatibility, and market trends. AAML Module 715 employs analytics tools for big data processing and deep learning capabilities. It conducts sentiment analysis, trend forecasting, and behavioral analytics to understand and anticipate market and user demands. AAML Module 715 integrates and trains machine learning models to understand user intent, predict search behavior, and optimize search results accordingly. It integrates sentiment analysis, trend forecasting, and behavioral analytics to deliver personalized search experiences tailored to individual user preferences. The module adapts its algorithms based on continuous feedback loops and real-time data updates, ensuring search results align with evolving user needs and market conditions. This module plays a pivotal role in enhancing the overall search experience within distribution platforms, driving increased user engagement and satisfaction.

In an embodiment, The AI-Powered Relevancy Search (AIRS) Module 720 is a critical component within System 700, designed to revolutionize search capabilities in the distribution environment. It employs advanced algorithms and techniques to prioritize search results based on relevancy scores, thereby enhancing user experience and engagement. The module utilizes a combination of machine learning models, natural language processing (NLP) algorithms, and real-time data processing to deliver accurate and personalized search results tailored to individual user preferences and requirements.

One of the primary use cases for the AIRS Module 720 is to optimize search results within distribution channels by analyzing various factors such as product specifications, customer preferences, and historical search patterns. For example, consider a scenario where a user searches for a specific product within a distribution platform. The AIRS Module 720 analyzes the search query, interprets user intent, and prioritizes search results based on relevancy scores generated through machine learning algorithms.

Furthermore, the AIRS Module 720 incorporates fuzzy logic and NLP techniques to improve search query interpretation and result relevance. This allows the system to handle vague or fuzzy search queries effectively, ensuring accurate and comprehensive search results for users. For instance, if a user enters a generic search query such as "high-performance laptop," the module utilizes NLP algorithms to understand the underlying intent and retrieve relevant products based on features, specifications, and user preferences.

Additionally, the AIRS Module 720 enables real-time adjustments to search relevancy based on dynamic factors such as market trends, inventory availability, and user feedback. For example, if a particular product becomes popular due to a sudden surge in demand, the module can prioritize search results for that product accordingly, ensuring users have access to the most relevant and up-to-date information.

In terms of implementation, the AIRS Module 720 consists of several components, including data ingestion pipelines, machine learning models, and real-time processing engines. Data from various sources such as distribution channels, inventory systems, and customer interactions is ingested into the module and processed in real-time to generate relevancy scores for search results.

The module employs machine learning models, including neural networks and decision trees, to analyze and prioritize search results based on relevancy scores. These models are trained using historical data sets and continuously updated using feedback loops to improve accuracy and performance over time.

Furthermore, the AIRS Module 720 is designed to be highly scalable and adaptable, enabling integration with existing systems and workflows within the distribution environment. It offers flexibility in terms of customization, allowing organizations to tailor search algorithms and relevancy scoring criteria based on specific business requirements and objectives.

Overall, the AIRS Module 720 represents a significant advancement in search technology within the distribution industry, enabling organizations to deliver personalized, efficient, and relevant search experiences for users, thereby enhancing engagement and conversion rates.

In some embodiments, the system is configured to process heterogeneous data sources without requiring manual data normalization or rule-based cleansing. The system applies AI-based relevance detection techniques to identify patterns, attributes, and relationships across unstructured or inconsistent vendor data formats. This enables the execution of meaningful search and matching operations across disparate data schemas, supporting scalability and adaptability in dynamic distribution environments.

Unlike traditional systems that require full data normalization and cleansing prior to processing, embodiments disclosed herein apply machine learning techniques to operate directly on raw, unprocessed data. The system utilizes real-time pattern recognition and semantic analysis to extract relevant insights from inconsistent or fragmented inputs. This approach eliminates pre-processing delays and enables efficient relevancy scoring and search optimization without requiring intermediate data transformation steps.

In some embodiments, system 700 can include additional functionality modules configured for elevating search capabilities and user engagement within the distribution platform. Embodiments can include Dynamic SKU Search Engine 725 configured to implement algorithms and data processing methodologies to enable dynamic and responsive search functionalities personalized to users' specific needs and preferences.

Dynamic SKU Search Engine 725 operates on a data layer of RTDM 710 configured to handle complexities of SKU (Stock Keeping Unit) data management within a distribution environment. Dynamic SKU Search Engine 725 can include and/or integrate one or more data ingestion pipelines integrated with indexing mechanisms, search algorithms, and real-time processing engines. Dynamic SKU Search Engine 725 retrieves and indexes both static and dynamic SKU data from various sources, such as inventory systems, product databases, and external APIs. This involves implementing data connectors and integration points to gather and consolidate SKU information from disparate sources, ensuring comprehensive coverage and accuracy.

After SKU data is ingested, Dynamic SKU Search Engine 725 employs indexing techniques to organize and structure data for efficient search operations. This may involve utilizing inverted indexing methods, trie data structures, or other indexing mechanisms optimized for fast and scalable search queries. The search algorithms employed by the Dynamic SKU Search Engine 725 can prioritize search results based on relevancy scores, considering factors such as product attributes, user preferences, historical interactions, and real-time market dynamics. These algorithms can be configured to implement machine learning models, natural language processing methodologies, and contextual analysis to deliver accurate and personalized search results personalized to each user's unique context and intent.

Further, Dynamic SKU Search Engine 725 can incorporate real-time processing capabilities to adapt search results dynamically based on changing conditions such as inventory availability, pricing updates, and user feedback. This involves implementing event-driven architectures and stream processing frameworks to handle real-time data updates and ensure timely adjustments to search relevancy.

Personalization Engine 730 complements Dynamic SKU Search Engine 725. In some embodiments, Personalization Engine 730 provides personalized recommendations and personalized search experiences based on user profiles, preferences, and historical interactions. Embodiments of Personalization Engine 730 can employ collaborative filtering algorithms, content-based filtering techniques, and reinforcement learning models to understand user behavior and deliver relevant suggestions and insights.

Real-Time Relevancy Adjustment Module 735 enables continuous optimization of search relevancy based on evolving market trends, user feedback, and performance metrics. In some embodiments, Real-Time Relevancy Adjustment Module 735 can implement one or more feedback loops, A/B testing frameworks, and experimentation platforms to gather insights and refine search algorithms iteratively.

System 700 integrates the above modules and components to perform AI-powered relevancy search to promote expectations and engagement of users within the distribution environment. System 700 efficiently performs efficient and relevant search experiences personalized in real-time to drive increased engagement and conversion rates across global distribution networks.

Figure 8:
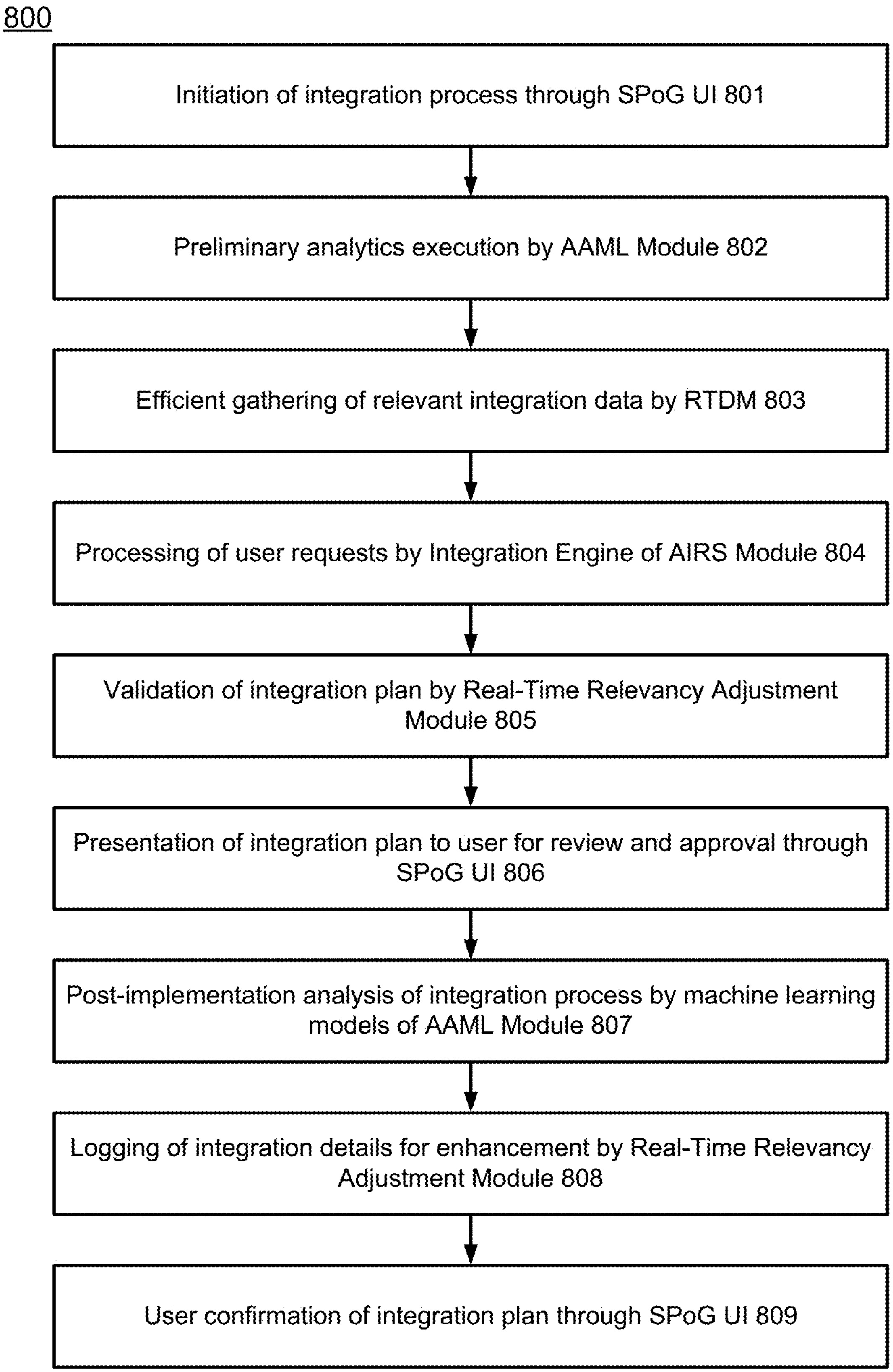
FIG. 8 is a flow diagram of a method for integrating Generative AI and Large Language Models in an automated relevancy search system, according to some embodiments of the present disclosure.

FIG. 8 illustrates a flow diagram of method 800 for integrating Generative AI and Large Language Models, according to embodiments of the present disclosure. This methodology includes operations from initiation to completion, describing the integration process within System 700, which includes SPoG UI 705, RTDM 710, AAML Module 715, AIRS Module 720, Dynamic SKU Search Engine 725, Personalization Engine 730, and Real-Time Relevancy Adjustment Module 735.

At Operation 801, the user initiates the integration process through SPoG UI 705, providing minimal input requirements to expedite the commencement of integration. SPoG UI 705 interacts with AAML Module 715 to gather initial user preferences and system requirements, initializing the integrating process based on a trigger in the user input or other aspects, such as based on a specific time period or other factor.

At Operation 802, AAML Module 715 executes preliminary analytics to identify specific requirements for integrating Generative AI and Large Language Models. Leveraging data structures within RTDM 710, AAML Module 715 employs algorithms such as decision trees and neural networks to assess the compatibility of the system with Generative AI and Large Language Models. For example, decision trees can determine the best integration strategy based on historical usage patterns and prevailing market conditions.

At Operation 803, RTDM 710 efficiently gathers relevant data for integration from various sources, including real-time data streams and historical databases. Using techniques such as data warehousing and data lakes described above, RTDM 710 continuously performs comprehensive aggregation and standardization of data, for perpetual integration with Generative AI and Large Language Models.

At Operation 804, an Integration Engine within AIRS Module 720 processes users' requests, incorporating tools such as Dynamic SKU Search Engine 725 and Personalization Engine 730. AIRS Module 720 can utilize a Model Compatibility Assessment Sub-Module to assess the compatibility of existing data structures with Generative AI and Large Language Models. The Integration Engine, implementing algorithms such as clustering and association rule mining, facilitates a technical integration process by identifying patterns and dependencies within the data.

At Operation 805, Real-Time Relevancy Adjustment Module 735 validates the proposed integration plan, ensuring accuracy and feasibility with advanced error-checking mechanisms. Real-Time Relevancy Adjustment Module 735 can use anomaly detection and outlier analysis, for example, to ensure the integrity and coherence of the integration process, minimizing the risk of errors or inconsistencies.

At Operation 806, the proposed integration plan is presented back to the user through SPoG UI 705 for review and approval, fostering user involvement throughout the process. SPoG UI 705 provides intuitive visualization of the integration plan, allowing users to make informed decisions based on clear, concise information.

At Operation 807, machine learning models within AAML Module 715 analyze the integration process post-implementation, applying predictive analytics to refine the integration mechanism based on real-time data from RTDM 710. Utilizing techniques such as regression analysis and time series forecasting, these models continuously monitor the performance of the integrated Generative AI and Large Language Models, identifying areas for improvement and optimization.

At Operation 808, a logging mechanism records integration details for ongoing enhancement of the system, facilitated by Real-Time Relevancy Adjustment Module 735. This logging mechanism captures comprehensive information about the integration process, including user inputs, system configurations, and integration outcomes, providing valuable insights for future iterations and refinements.

At Operation 809, the user confirms the integration plan through SPoG UI 705, marking the completion of the integration process. This final step ensures user satisfaction and validation of the integrated Generative AI and Large Language Models within System 700, optimizing search relevancy and user engagement. The confirmation process may involve interactive elements within SPoG UI 705, such as prompts for user feedback and suggestions for further improvements, fostering continuous collaboration between users and the system.

Figure 9:
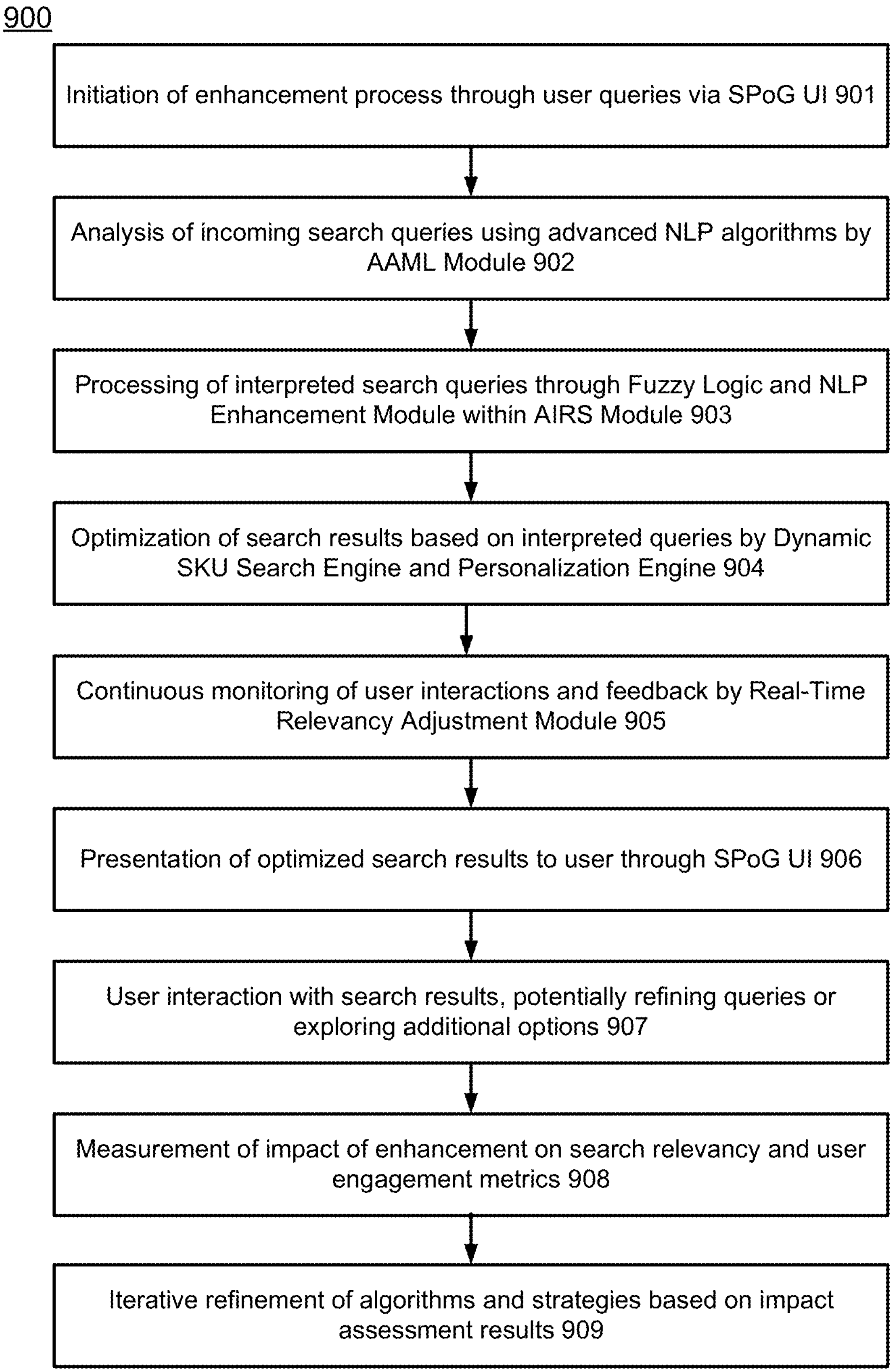
FIG. 9 is a flow diagram of a method for implementing Fuzzy Logic and Natural Language Processing (NLP) Enhancement in an automated relevancy search system, according to some embodiments of the present disclosure.

FIG. 9 illustrates a flow diagram of method 900 for implementing Fuzzy Logic and Natural Language Processing (NLP) Enhancement within System 700, according to embodiments of the present disclosure. This flowchart delineates operations aimed at improving search relevancy and enhancing user experience through the integration of fuzzy logic and NLP algorithms.

At Operation 901, the system initiates the enhancement process by receiving user queries through SPoG UI 705, which serves as the primary interface for user interaction. These queries may include vague or ambiguous search terms such as "long cable" or "laptop battery life," requiring interpretation using fuzzy logic and NLP techniques.

At Operation 902, AAML Module 715 analyzes the incoming search queries using advanced NLP algorithms, which can include techniques such as natural language understanding (NLU) and semantic analysis. These algorithms enable the system to interpret the user's intent behind vague or ambiguous search queries, extracting relevant keywords and context to refine the search process.

At Operation 903, the interpreted search queries are processed through the Fuzzy Logic and NLP Enhancement Module within AIRS Module 720. This module utilizes fuzzy logic algorithms to handle imprecise or uncertain information inherent in vague search queries, allowing for flexible and adaptive search behavior.

At Operation 904, Dynamic SKU Search Engine 725 and Personalization Engine 730 collaborate to optimize search results based on the interpreted queries. Dynamic SKU Search Engine 725 retrieves relevant products or services from the database, considering factors such as product attributes, user preferences, and historical interactions. Personalization Engine 730 further refines the search results based on user profiles and past behavior, ensuring personalized recommendations tailored to individual preferences.

At Operation 905, Real-Time Relevancy Adjustment Module 735 continuously monitors user interactions and feedback to adapt search results dynamically. By analyzing user behavior in real-time, this module identifies patterns and trends, allowing for proactive adjustments to search relevancy and user experience.

At Operation 906, the optimized search results are presented to the user through SPoG UI 705, providing an intuitive browsing experience. The system ensures that relevant products or services aligned with the user's intent are prominently featured, enhancing user satisfaction and engagement.

At Operation 907, the user interacts with the search results, potentially refining their queries or exploring additional options. SPoG UI 705 captures user feedback and behavior, which is fed back into the system for continuous improvement and optimization.

At Operation 908, the system measures the impact of the fuzzy logic and NLP enhancement on search relevancy and user engagement metrics. Key performance indicators such as click-through rates, time spent on the platform, and conversion rates are analyzed to assess the effectiveness of the enhancement.

At Operation 909, based on the impact assessment results, the system iteratively refines its algorithms and strategies to further enhance search relevancy and user experience. This iterative process ensures continuous improvement and adaptation to evolving user needs and preferences.

This operational flow leverages the architecture of System 700 to integrate fuzzy logic and NLP enhancements, ultimately enhancing the search experience and driving increased user engagement and satisfaction within the distribution environment. Method 900 integrates SPoG UI 705, Service Configuration Engine 735, and Error-Check Integrator 780 in a structured flow. This integration facilitates user-centric relevancy search optimization, enhancing the overall user experience within System 700. Alternative embodiments may involve different user interface layouts, configuration algorithms, and validation mechanisms to adapt to diverse user needs and preferences.

Figure 10:
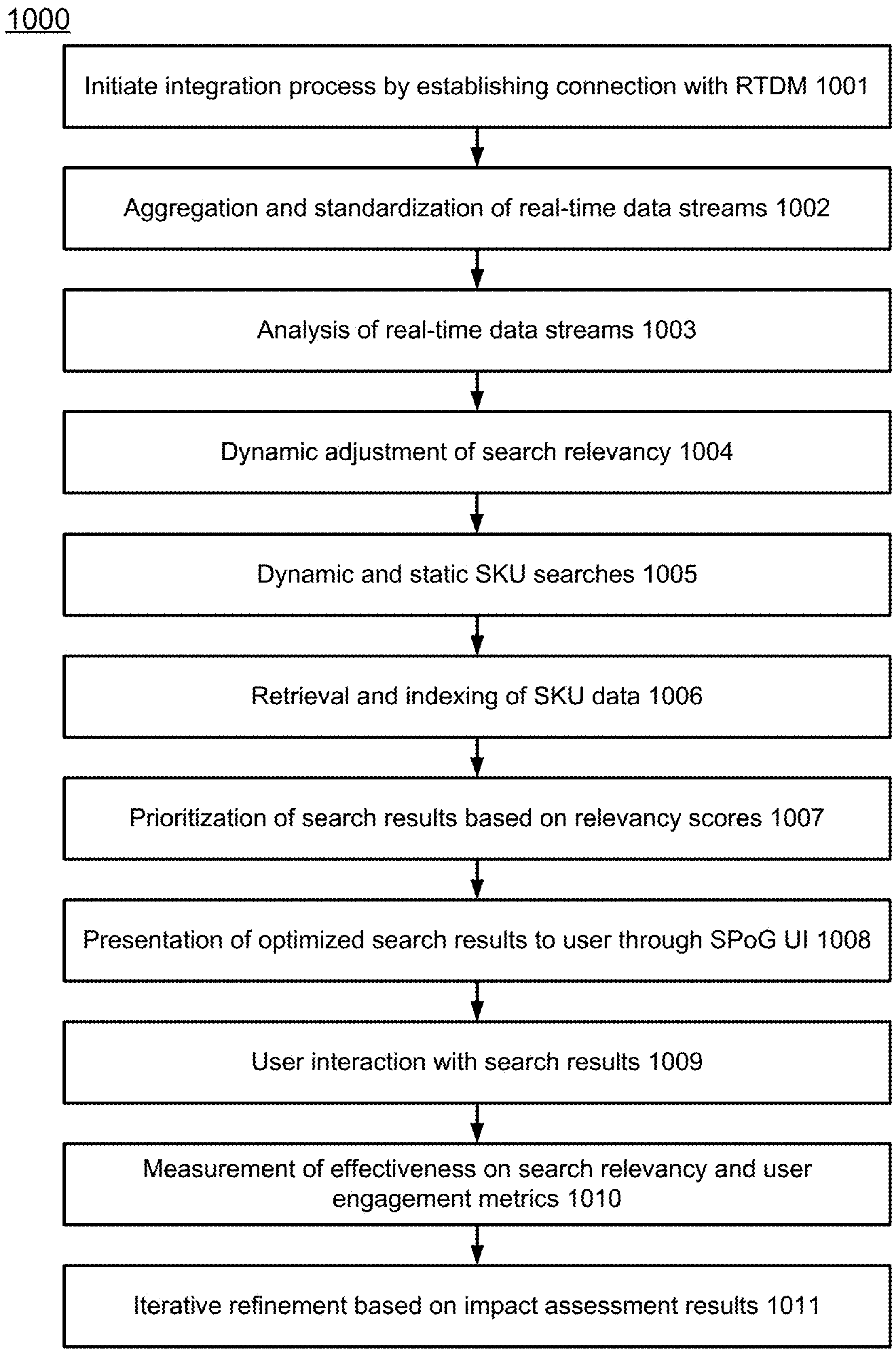
FIG. 10 is a flow diagram of a method for implementing Real-Time Data Mesh Integration and Dynamic SKU Searches, according to some embodiments of the present disclosure.

FIG. 10 illustrates a flow diagram of method 1000 for implementing Real-Time Data Mesh Integration and Dynamic SKU Searches within System 700, according to embodiments of the present disclosure. This flowchart delineates operations aimed at accessing real-time data and optimizing search results through dynamic SKU searches.

At Operation 1001, the system initiates the integration process by establishing connections with a real-time data mesh, facilitated by RTDM 710. This data mesh serves as a centralized hub for accessing and analyzing data from various sources, including SKUs, inventory systems, and market intelligence platforms.

At Operation 1002, RTDM 710 aggregates and standardizes real-time data streams, ensuring the availability of up-to-date information for analysis. This includes data on product specifications, inventory levels, pricing, and customer interactions, among others, optimizing search relevancy and user experience.

At Operation 1003, AAML Module 715 utilizes advanced analytics and machine learning techniques to analyze the real-time data streams. By processing data from multiple sources, including SKUs and customer interactions, AAML Module 715 identifies patterns and trends that influence search relevancy and user engagement.

At Operation 1004, based on the analysis conducted by AAML Module 715, Real-Time Relevancy Adjustment Module 735 dynamically adjusts search relevancy in response to changing conditions. This includes factors such as customer segment, personalization preferences, and historical interactions, ensuring that search results remain relevant and up-to-date.

At Operation 1005, Dynamic SKU Search Engine 725 conducts dynamic and static SKU searches to retrieve comprehensive search results. This engine addresses the complexities of SKU standardization across different regions and vendors, ensuring that users have access to relevant products regardless of how SKUs are defined or updated.

At Operation 1006, Dynamic SKU Search Engine 725 retrieves and indexes both dynamic and static SKU data from various sources, such as inventory systems, product databases, and external APIs. This involves implementing data connectors and integration points to gather and consolidate SKU information from disparate sources.

At Operation 1007, the search algorithms employed by Dynamic SKU Search Engine 725 prioritize search results based on relevancy scores, considering factors such as product attributes, user preferences, historical interactions, and real-time market dynamics. These algorithms leverage machine learning models, natural language processing methodologies, and contextual analysis to deliver accurate and personalized search results.

At Operation 1008, the optimized search results are presented to the user through SPoG UI 705, providing a comprehensive and intuitive browsing experience. The system ensures that relevant products or services aligned with the user's intent are prominently featured, enhancing user satisfaction and engagement.

At Operation 1009, the user interacts with the search results, potentially refining their queries or exploring additional options. SPoG UI 705 captures user feedback and behavior, which is fed back into the system for continuous improvement and optimization.

At Operation 1010, the system measures the impact of real-time data mesh integration and dynamic SKU searches on search relevancy and user engagement metrics. Key performance indicators such as click-through rates, time spent on the platform, and conversion rates are analyzed to assess the effectiveness of the enhancements.

At Operation 1011, based on the impact assessment results, the system iteratively refines its algorithms and strategies to further enhance search relevancy and user experience. This iterative process ensures continuous improvement and adaptation to evolving user needs and preferences.

This operational flow leverages the architecture of System 700 to integrate real-time data mesh integration and dynamic SKU searches, ultimately enhancing the search experience and driving increased user engagement and satisfaction within the distribution environment.

Figure 11:
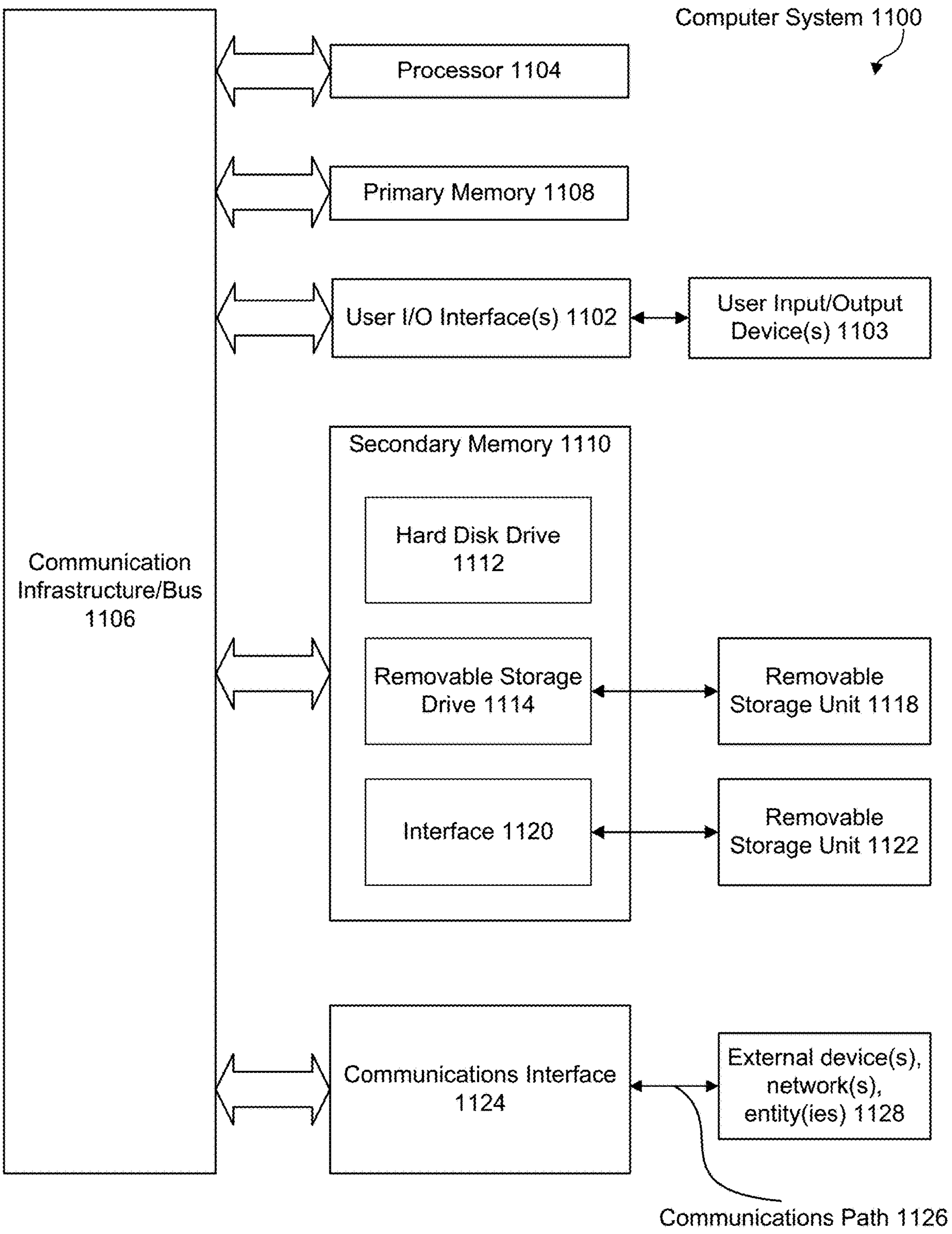
FIG. 11 is a block diagram of example components of device, according to some embodiments of the present disclosure.

FIG. 11 depicts a block diagram of example components of device 1100. One or more computer systems 1100 may be used, for example, to implement any of the embodiments discussed herein, as well as combinations and sub-combinations thereof. Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more processors 1104 may be a graphics processing unit (GPU). In an embodiment, a GPU may be a processor that can be a specialized electronic circuit configured to process mathematically intensive applications. The GPU may have a parallel structure that can be efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114.

Removable storage drive 1114 may interact with a removable storage unit 1118. Removable storage unit 1118 may include a computer-usable or readable storage device having stored thereon computer software (control logic) and/or data. Removable storage unit 1118 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Figure 12A:
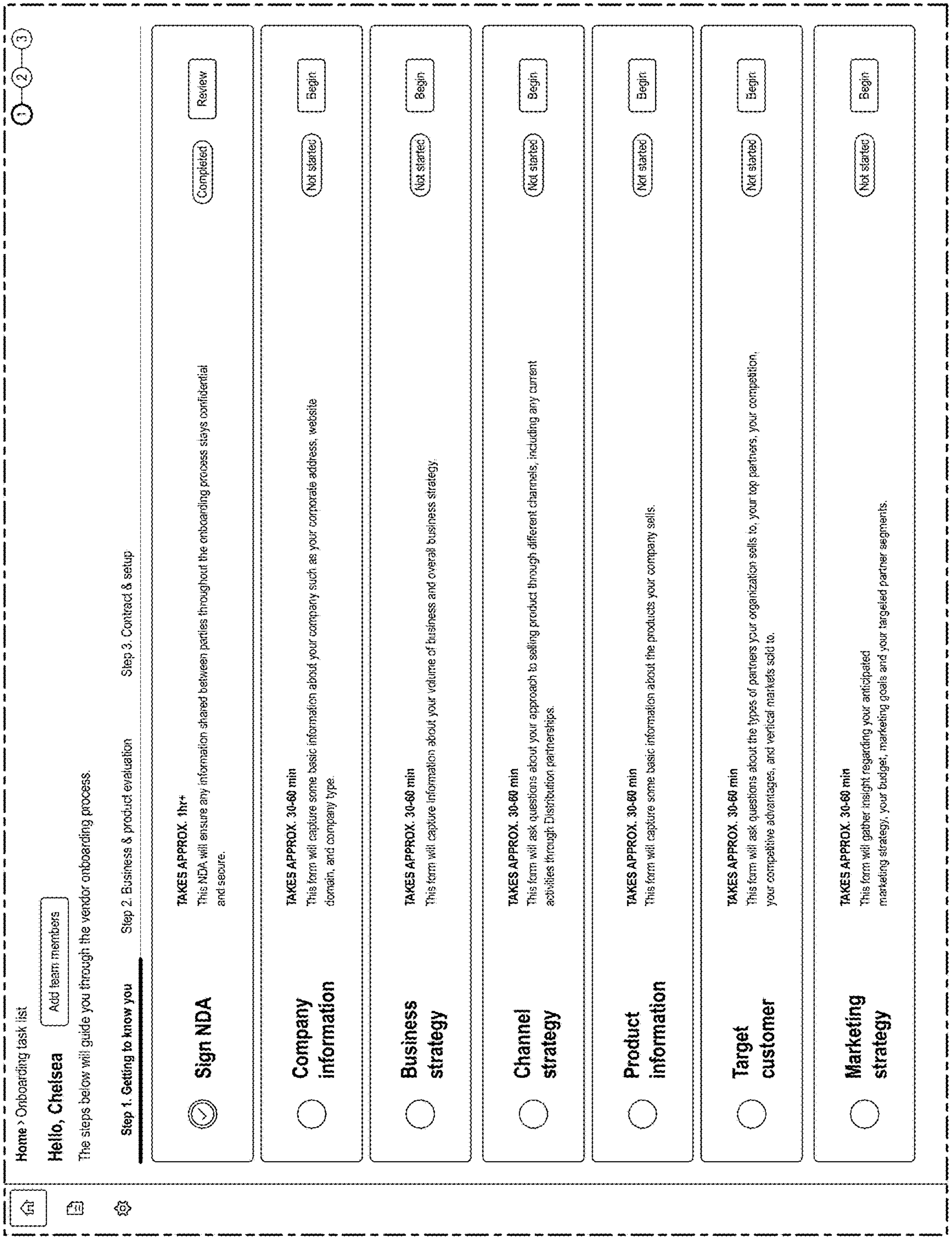
FIGS. 12A to 12Q depict various screens and functionalities of the SPoG UI, according to some embodiments.
Figure 12B:
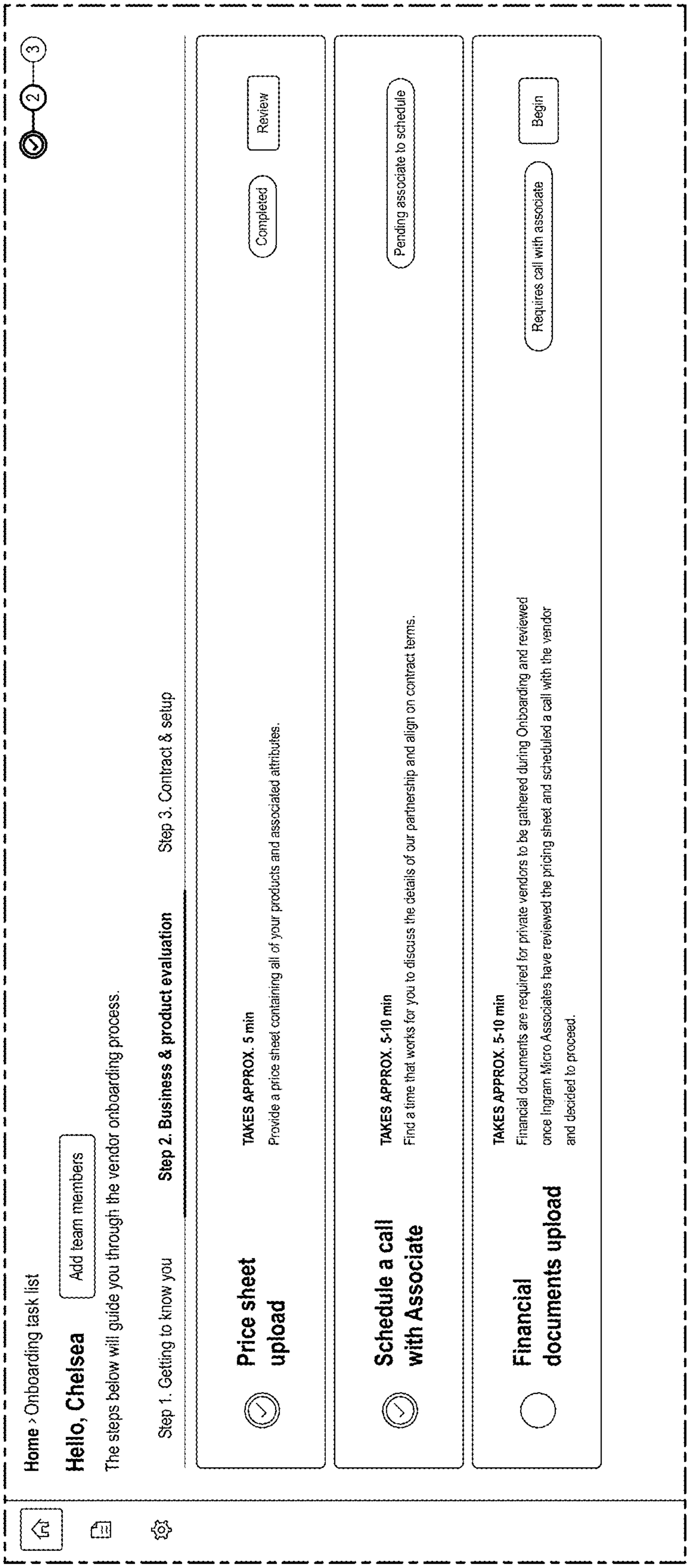
Figure 12C:
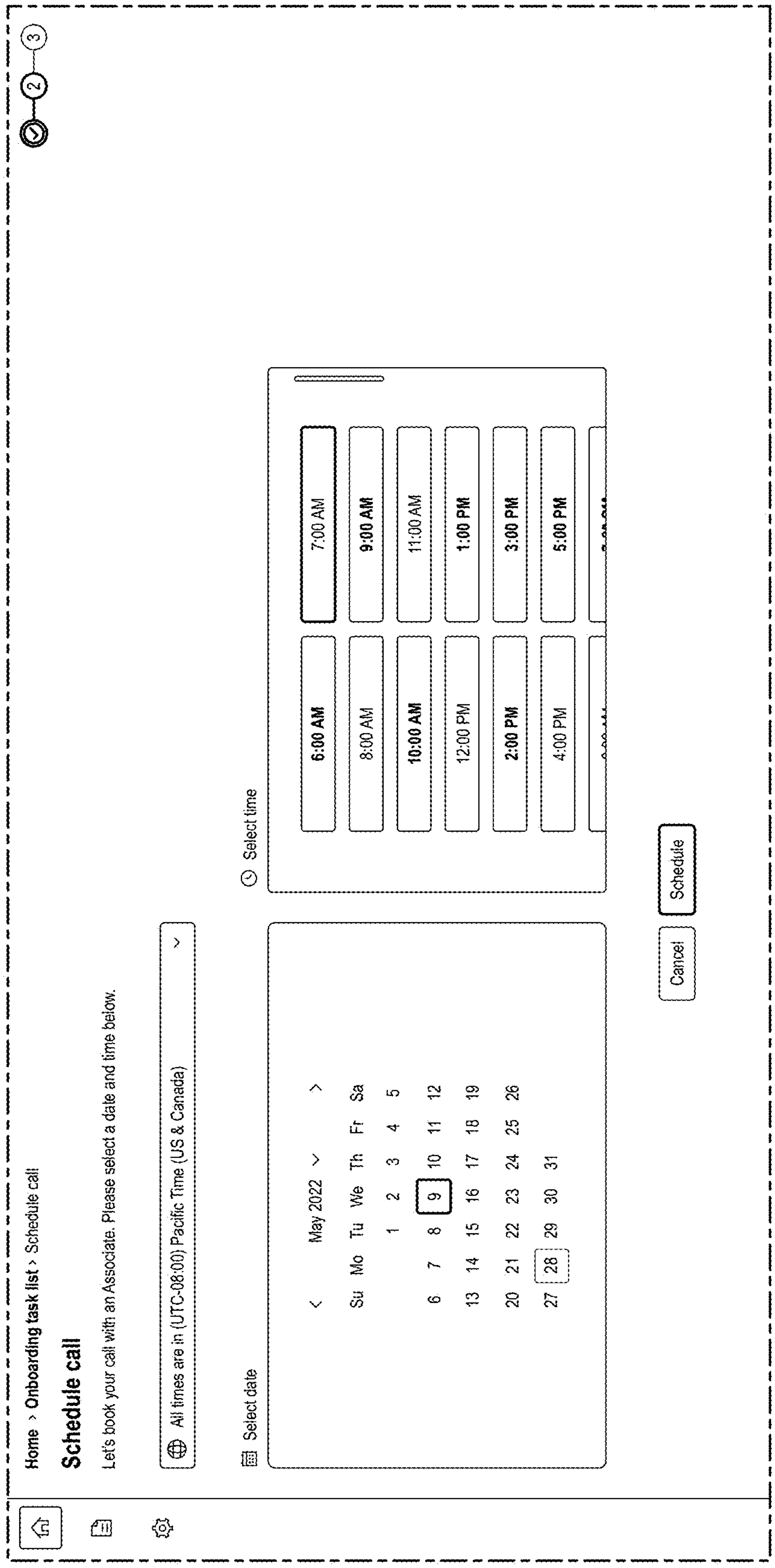
Figure 12D:
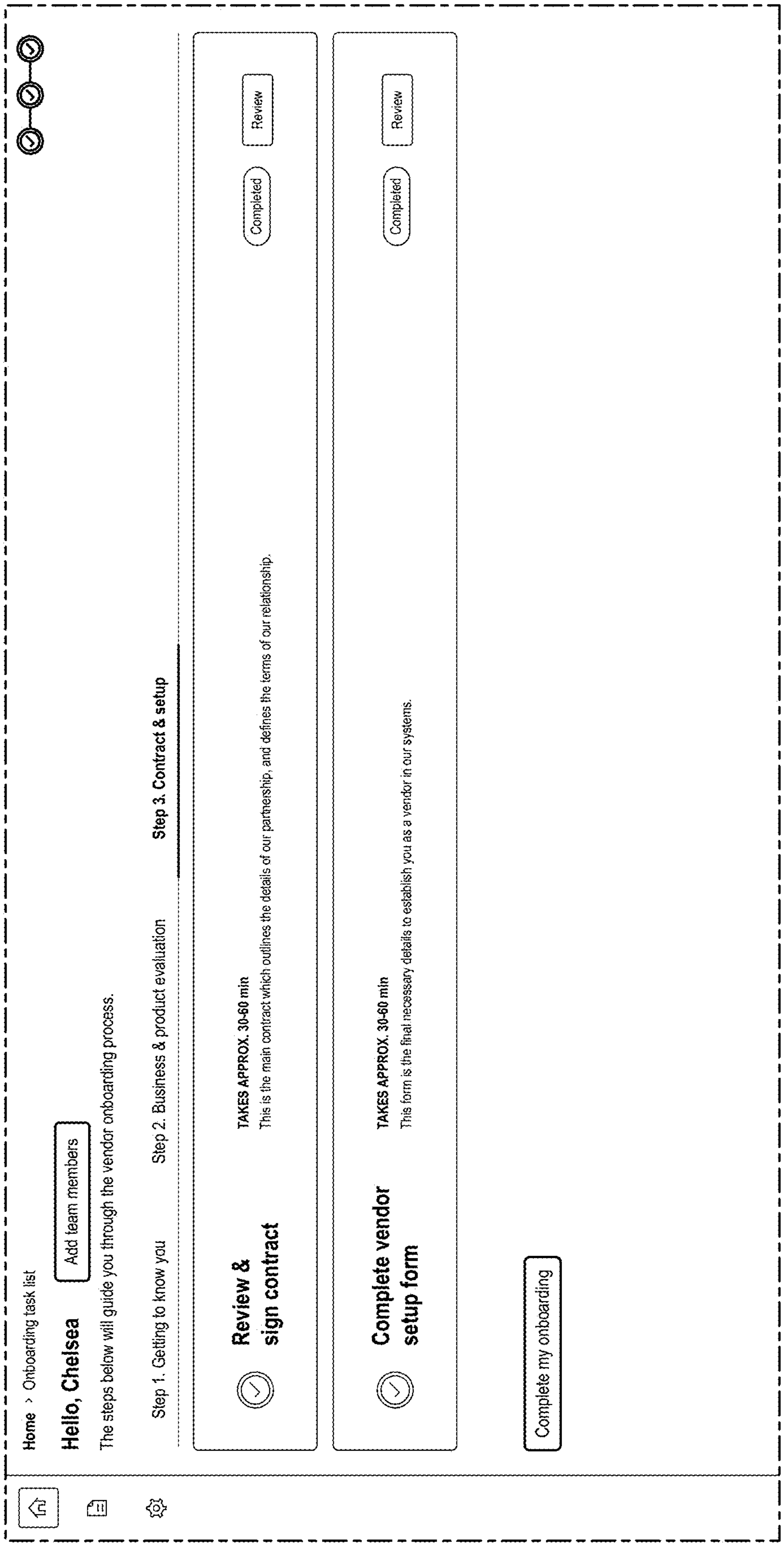
Figure 12E:
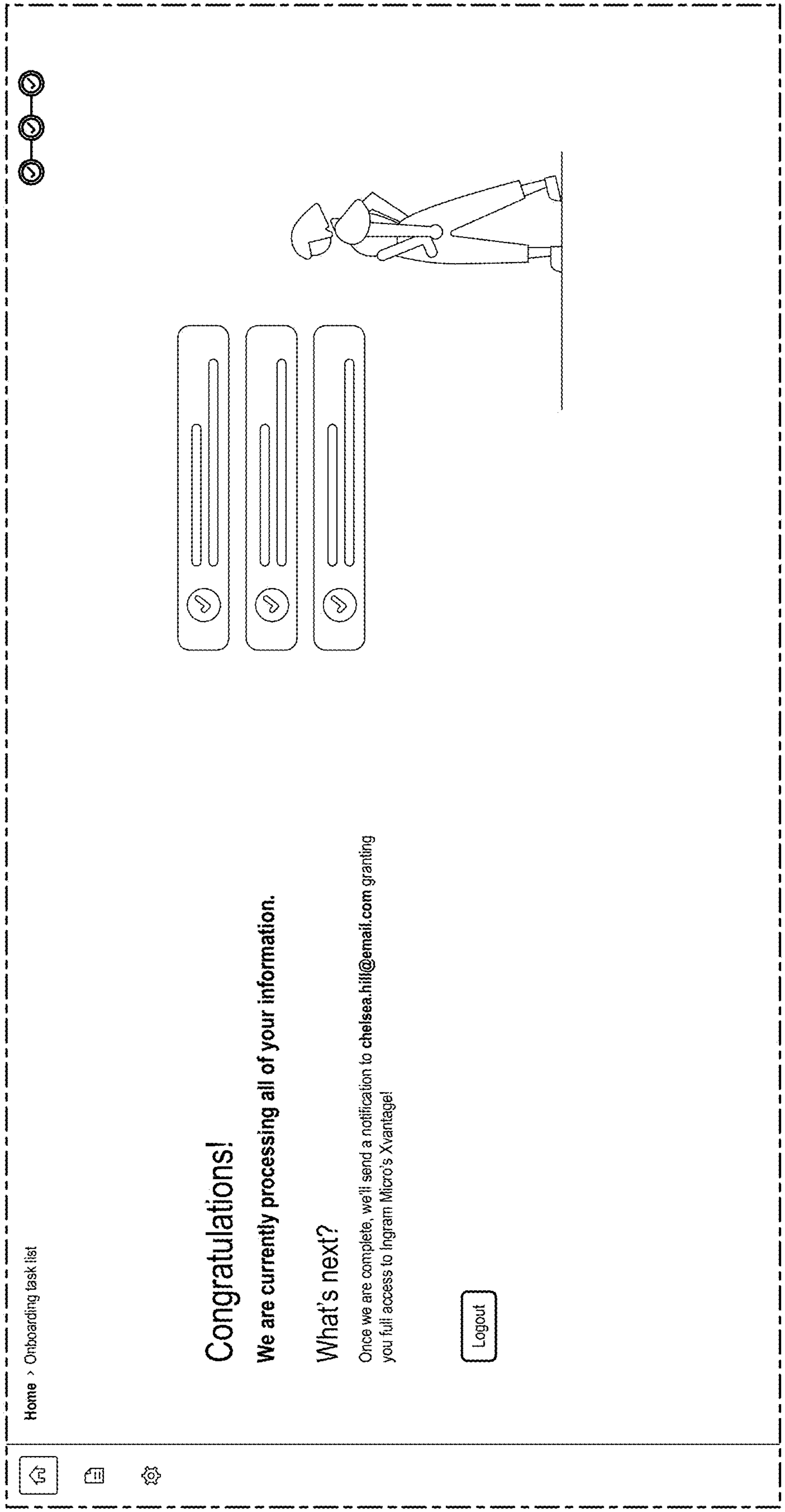
Figure 12F:
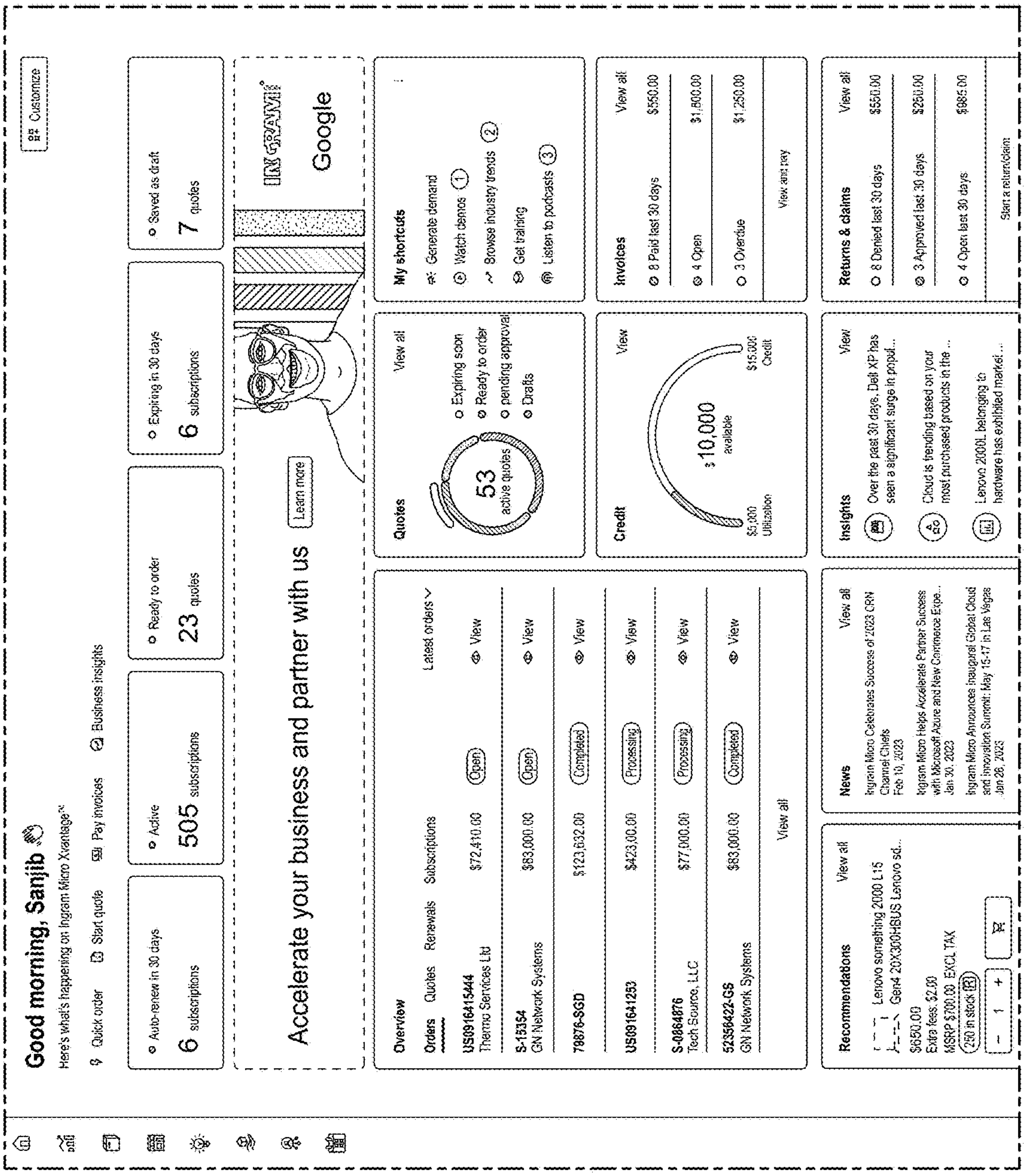
Figure 12G:
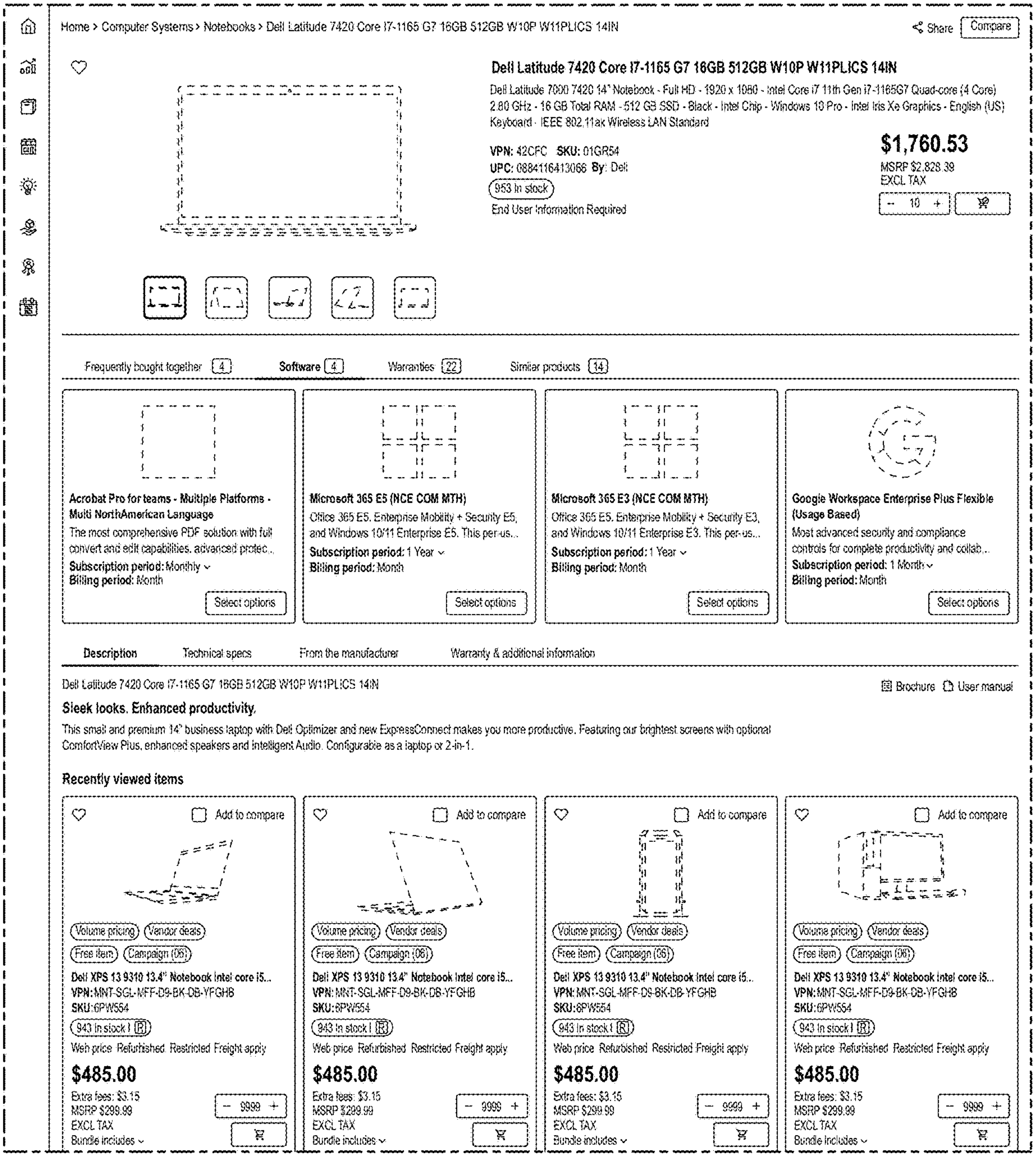
Figure 12H:
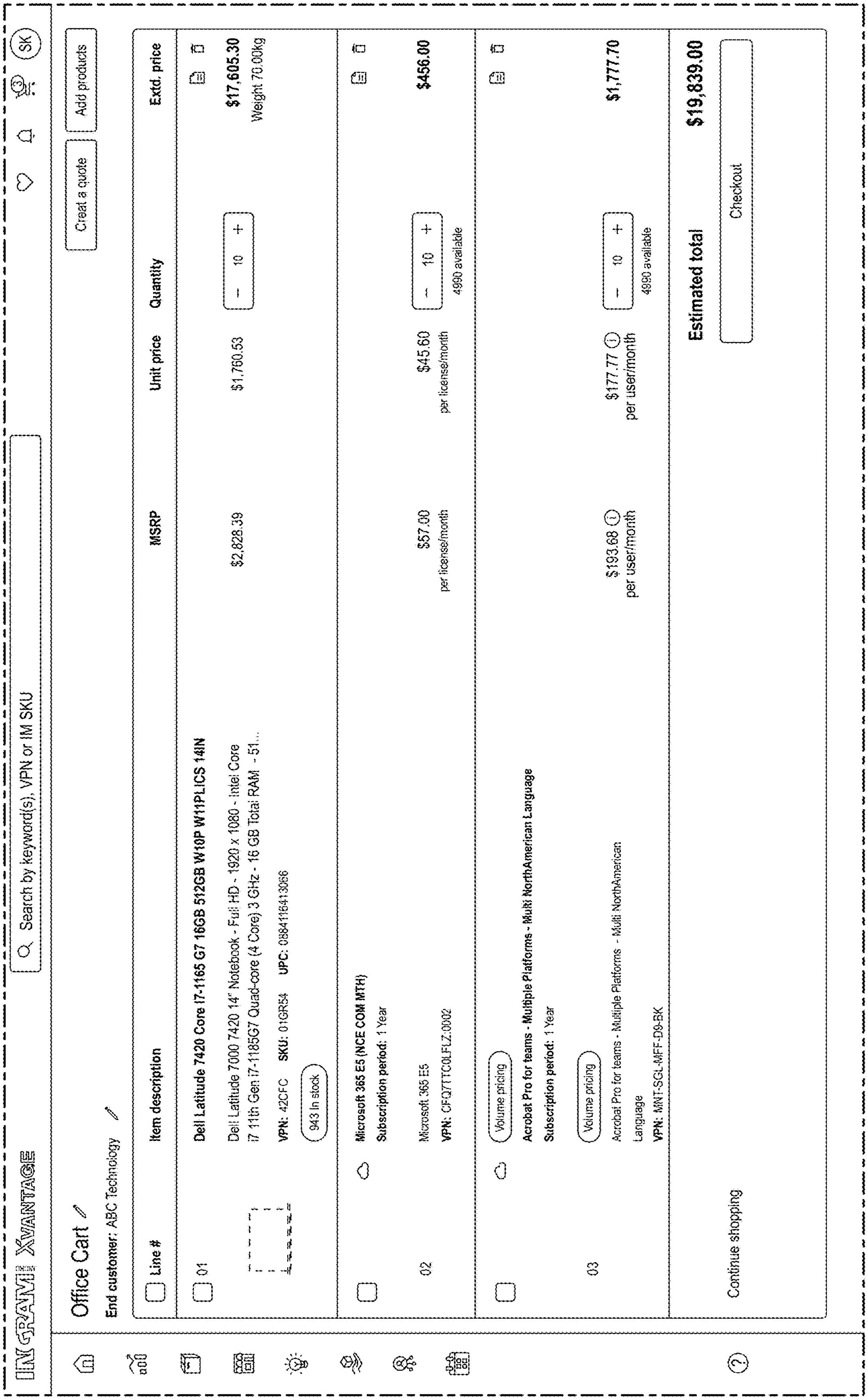
Figure 12I:
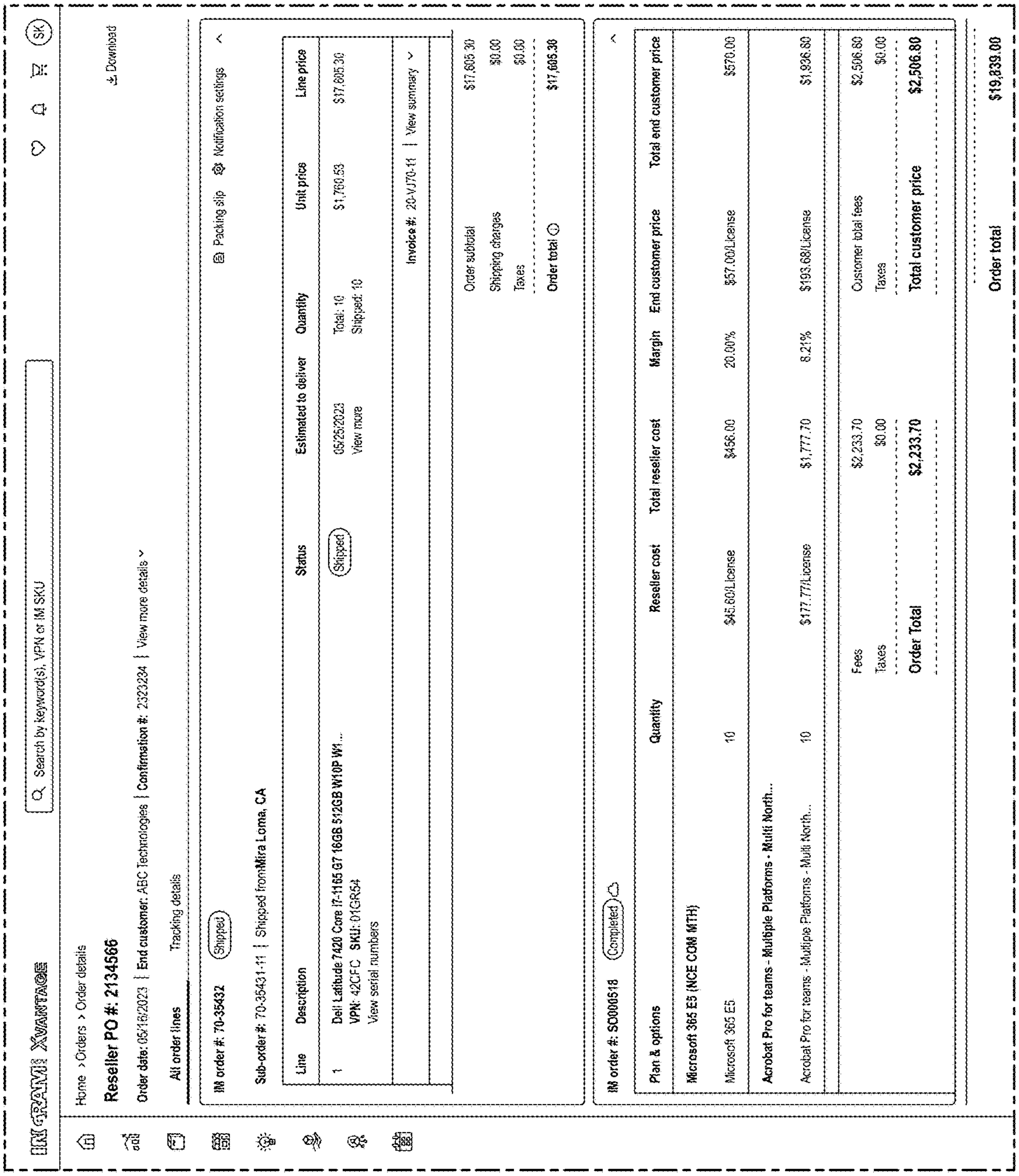
Figure 12J:
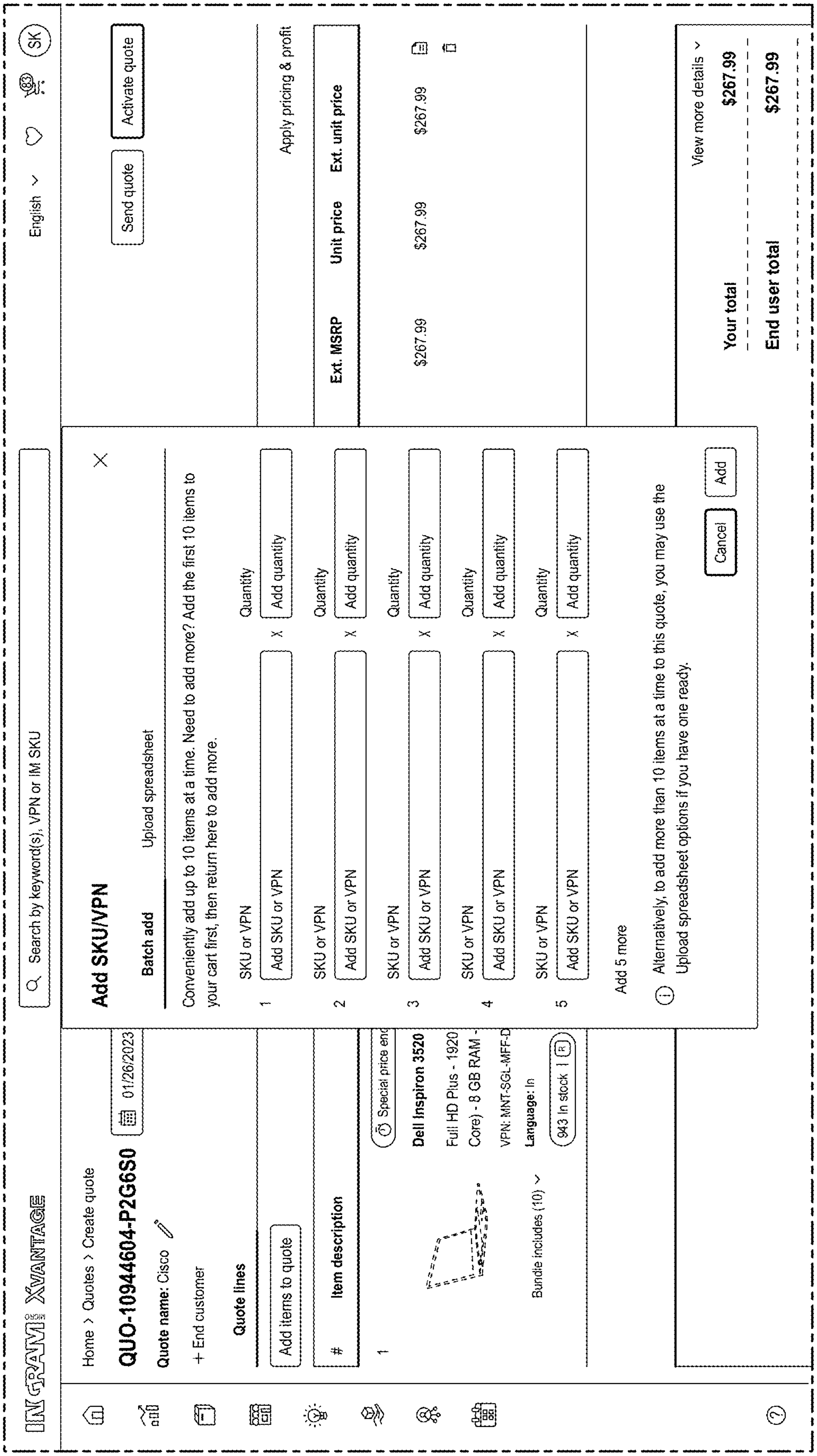
Figure 12K:
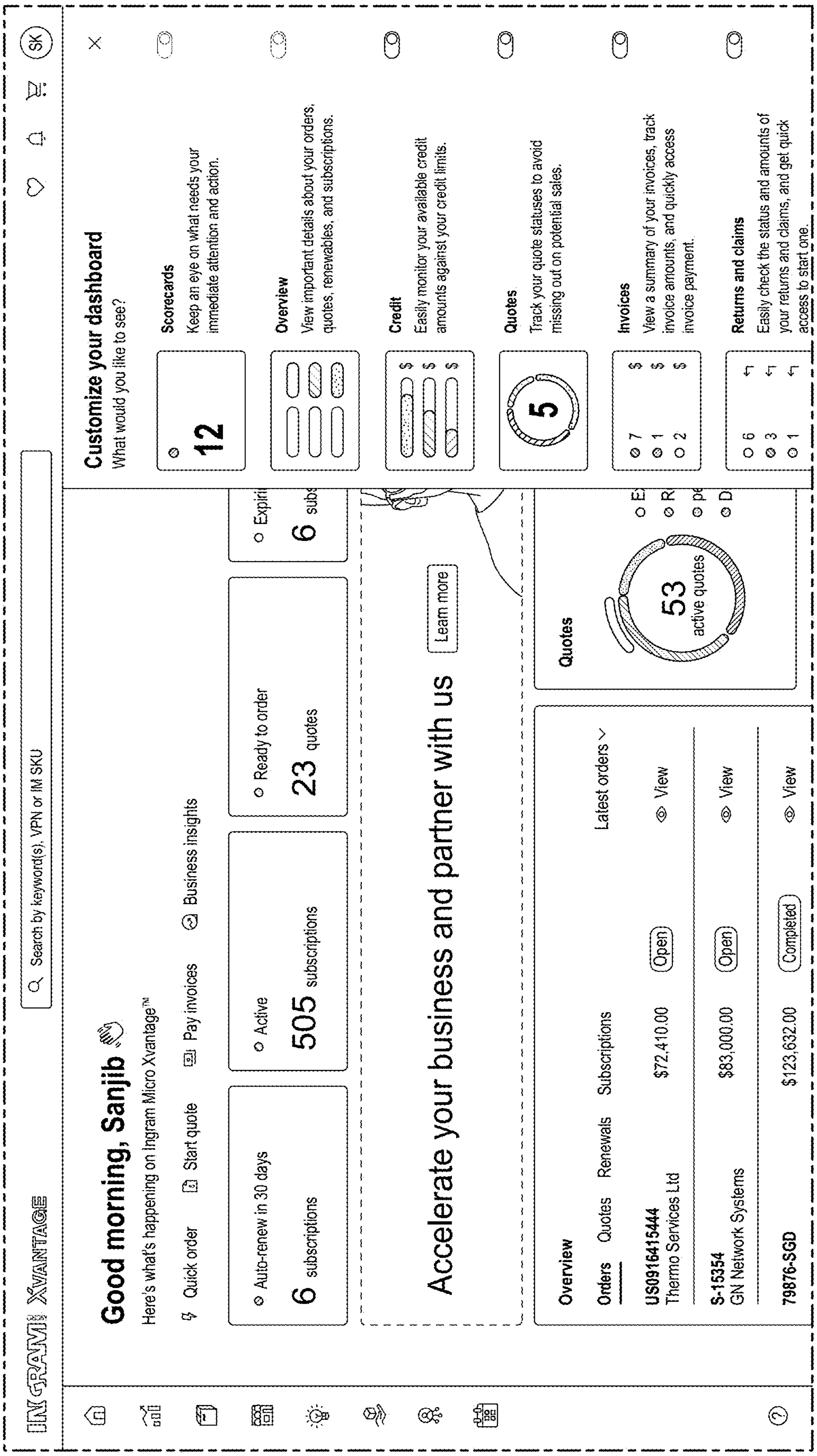
Figure 12L:
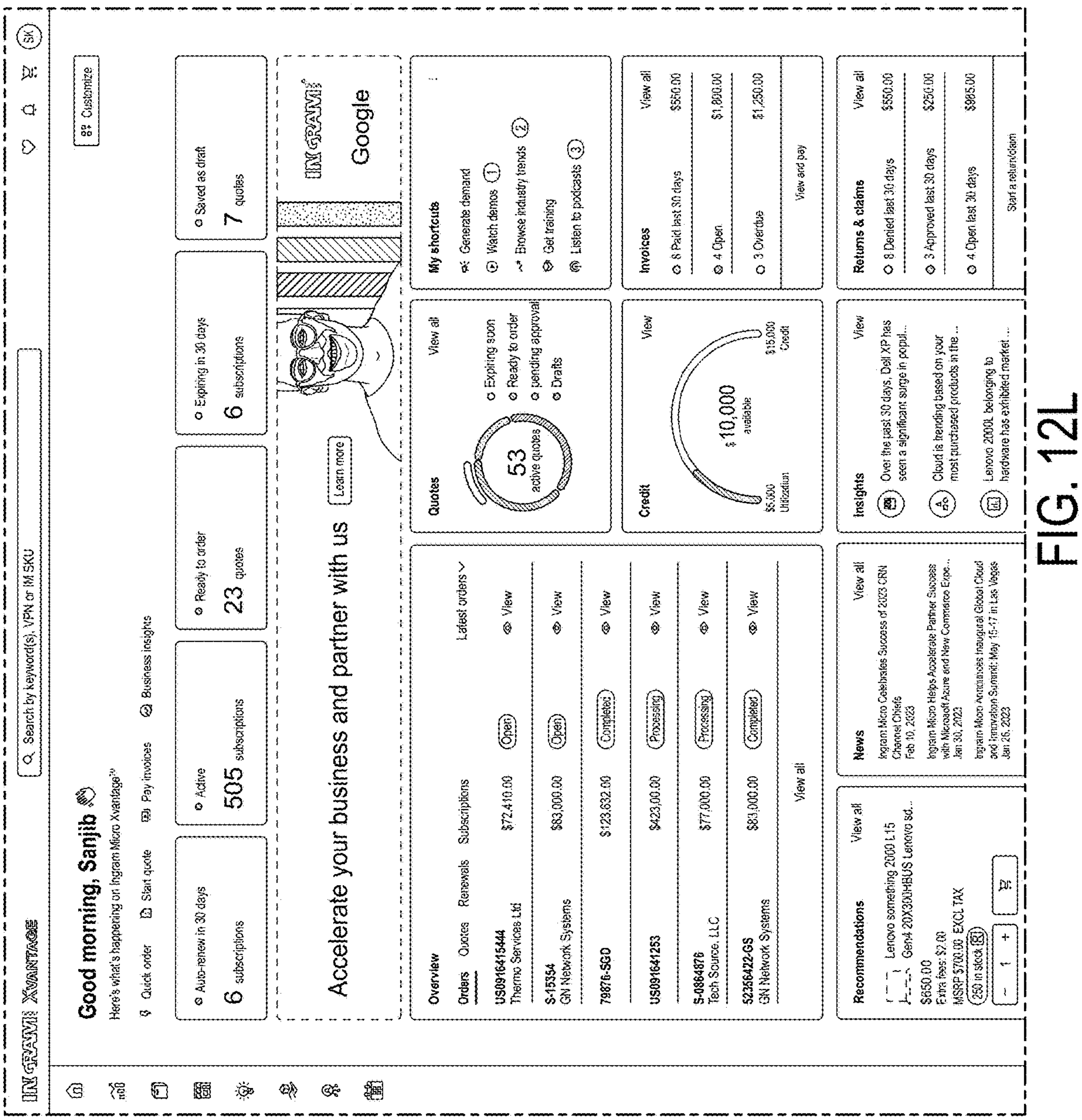
Figure 12M:
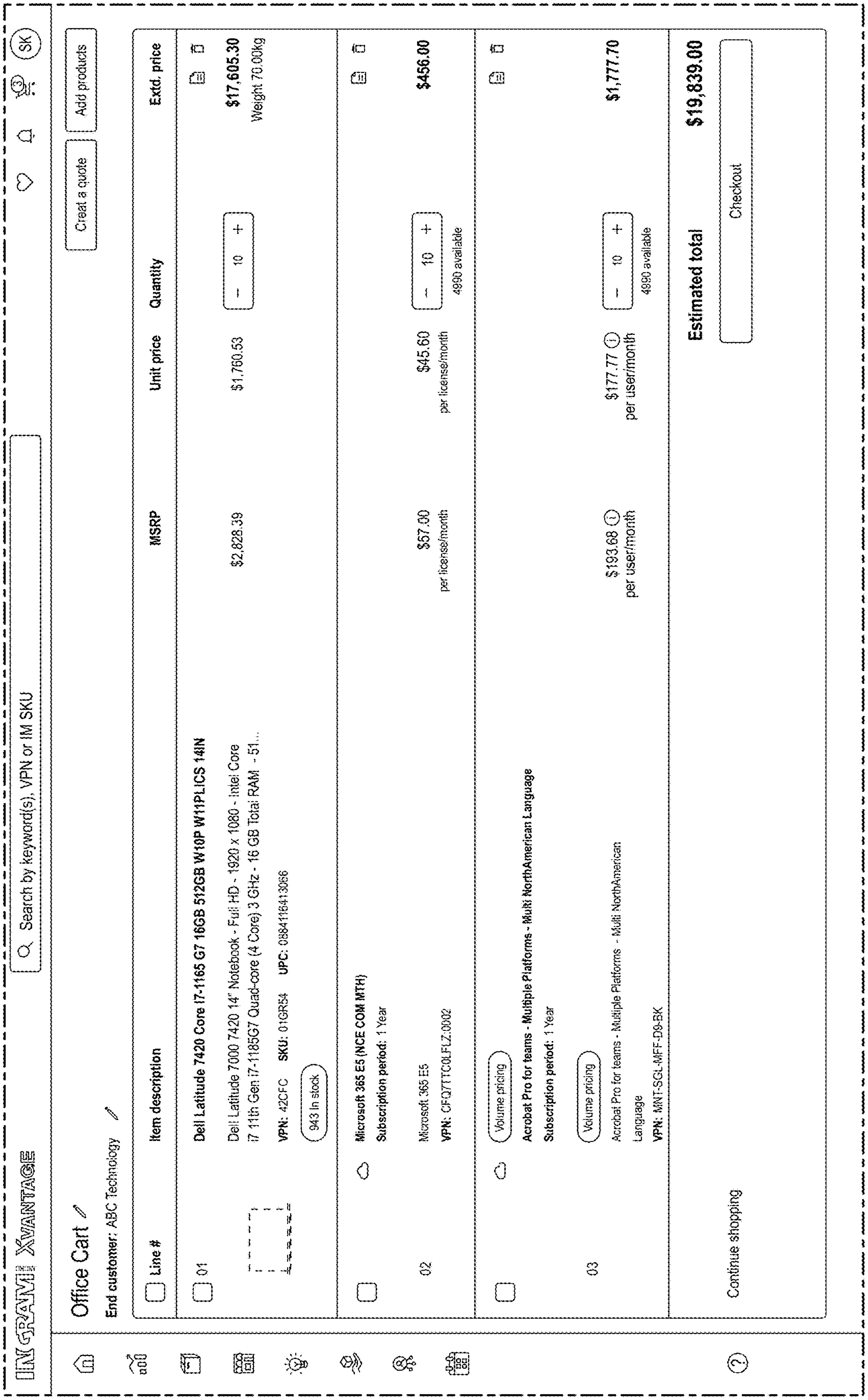
Figure 12N:
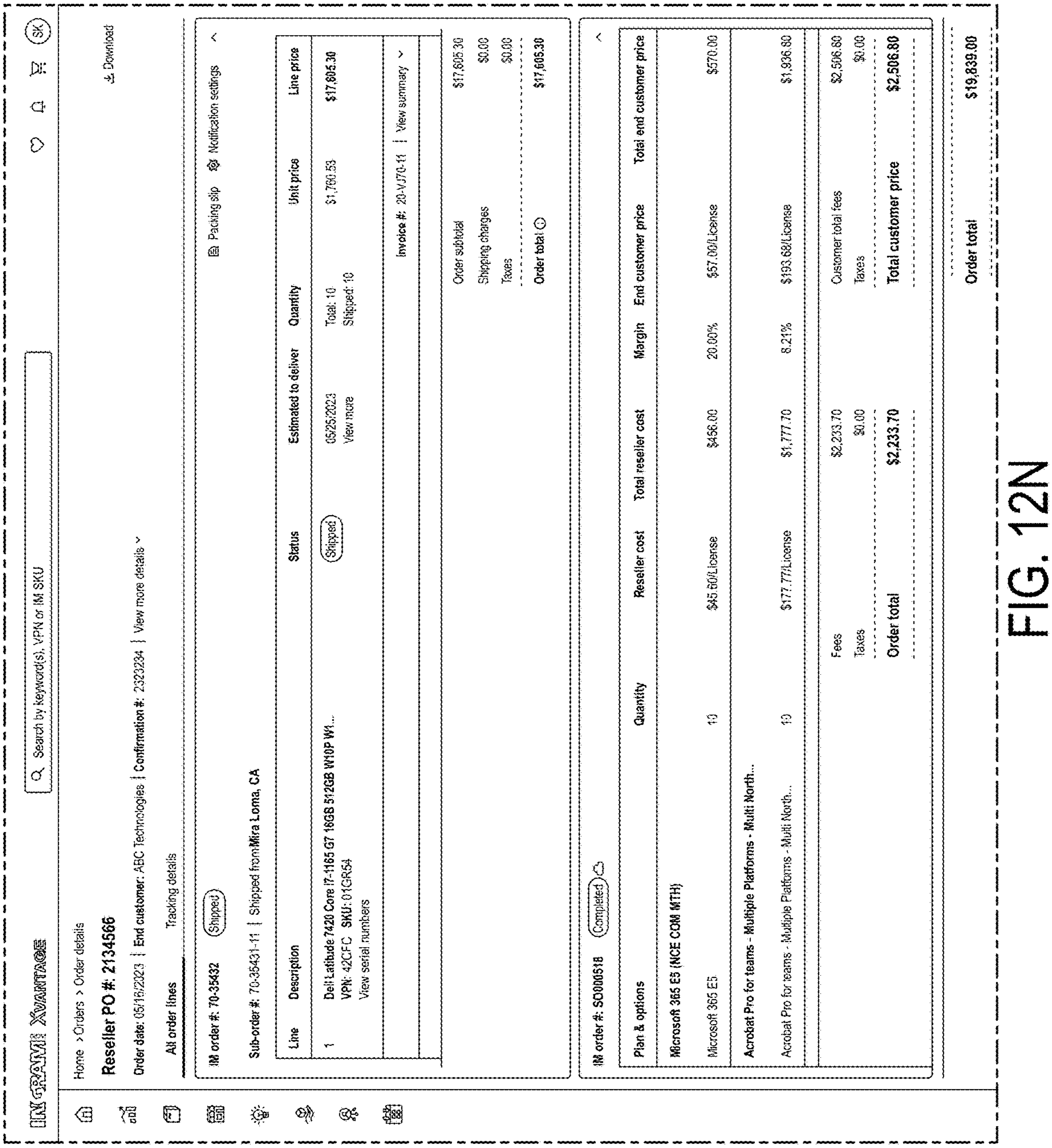
Figure 12O:
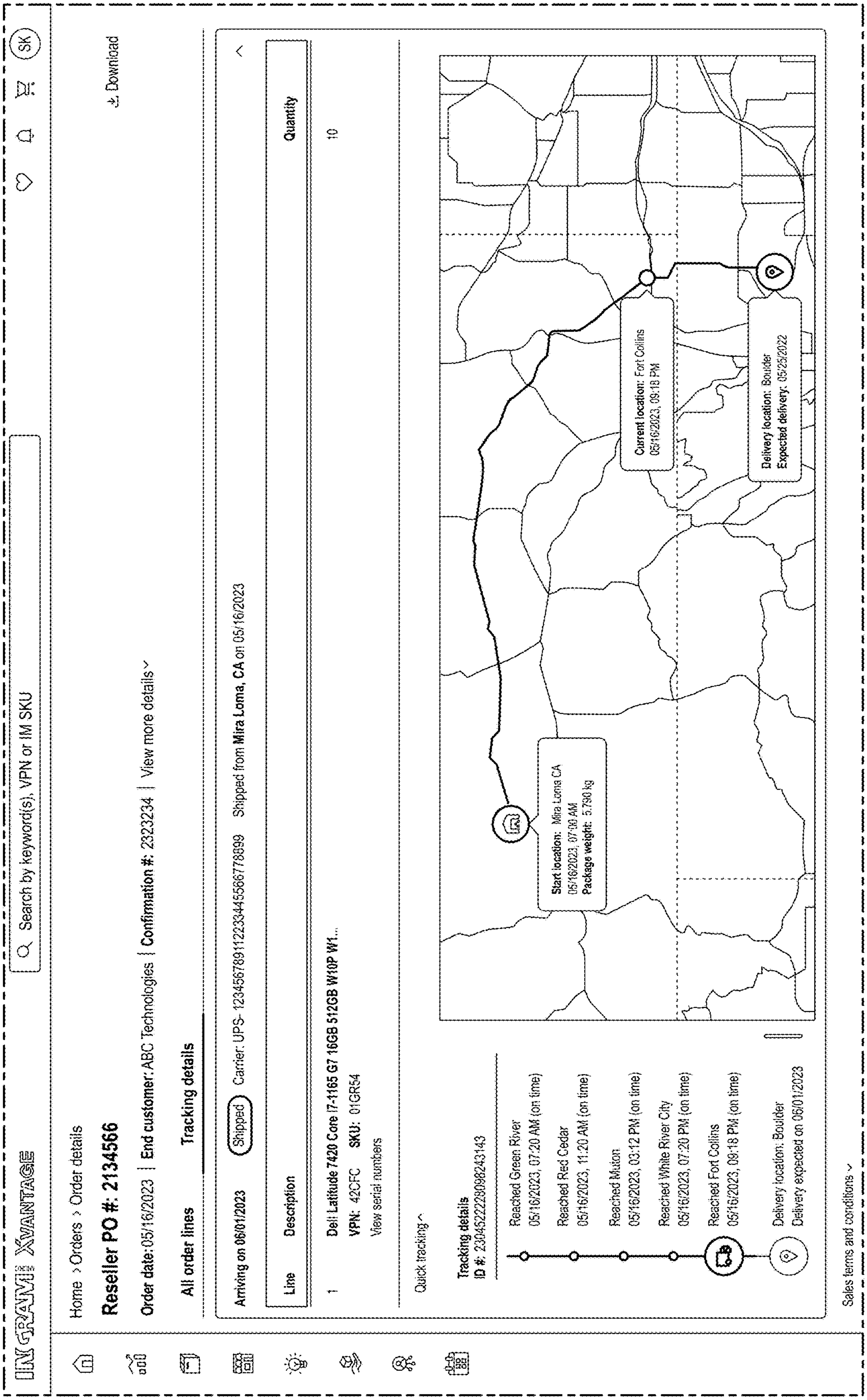
Figure 12P:
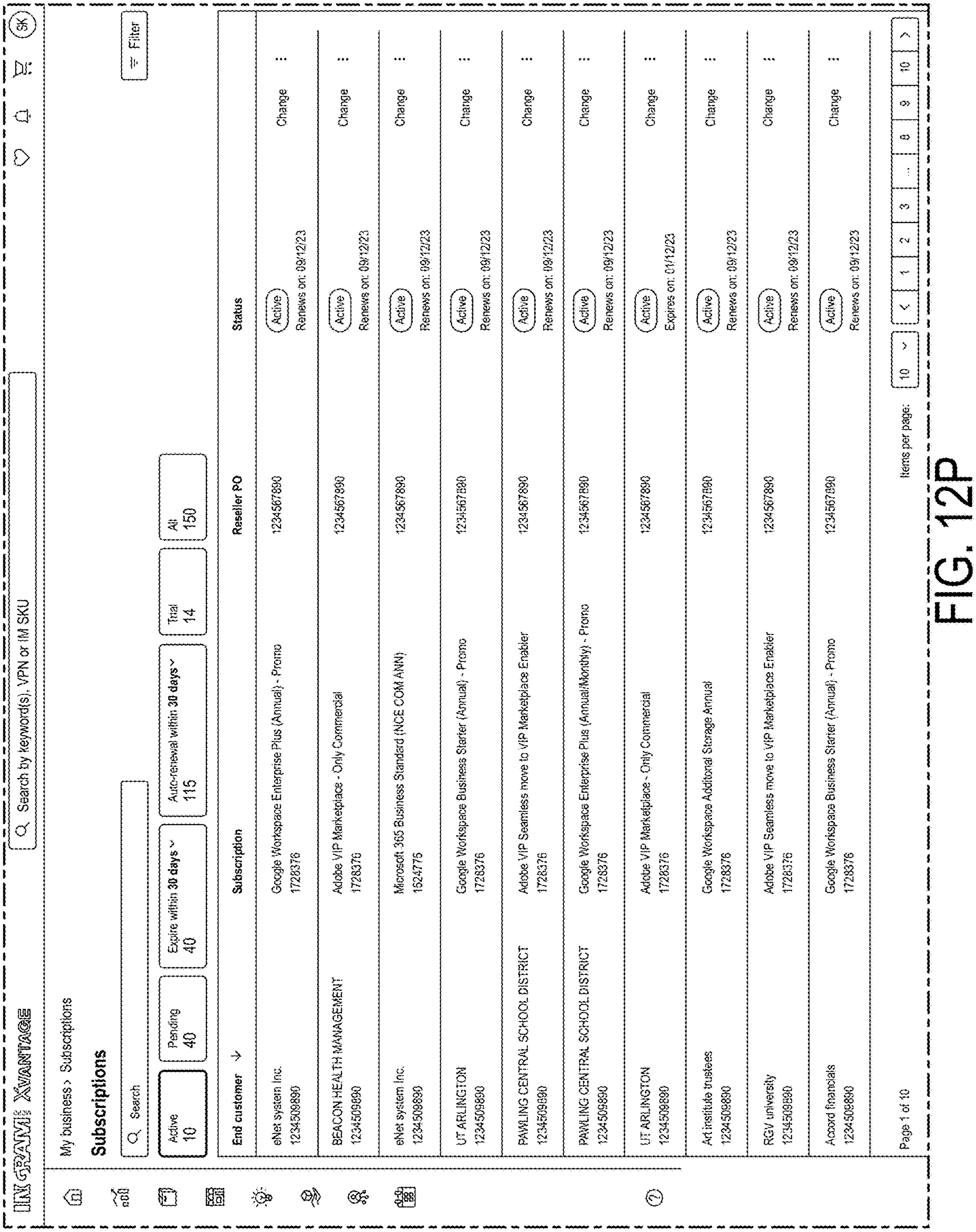
Figure 12Q:
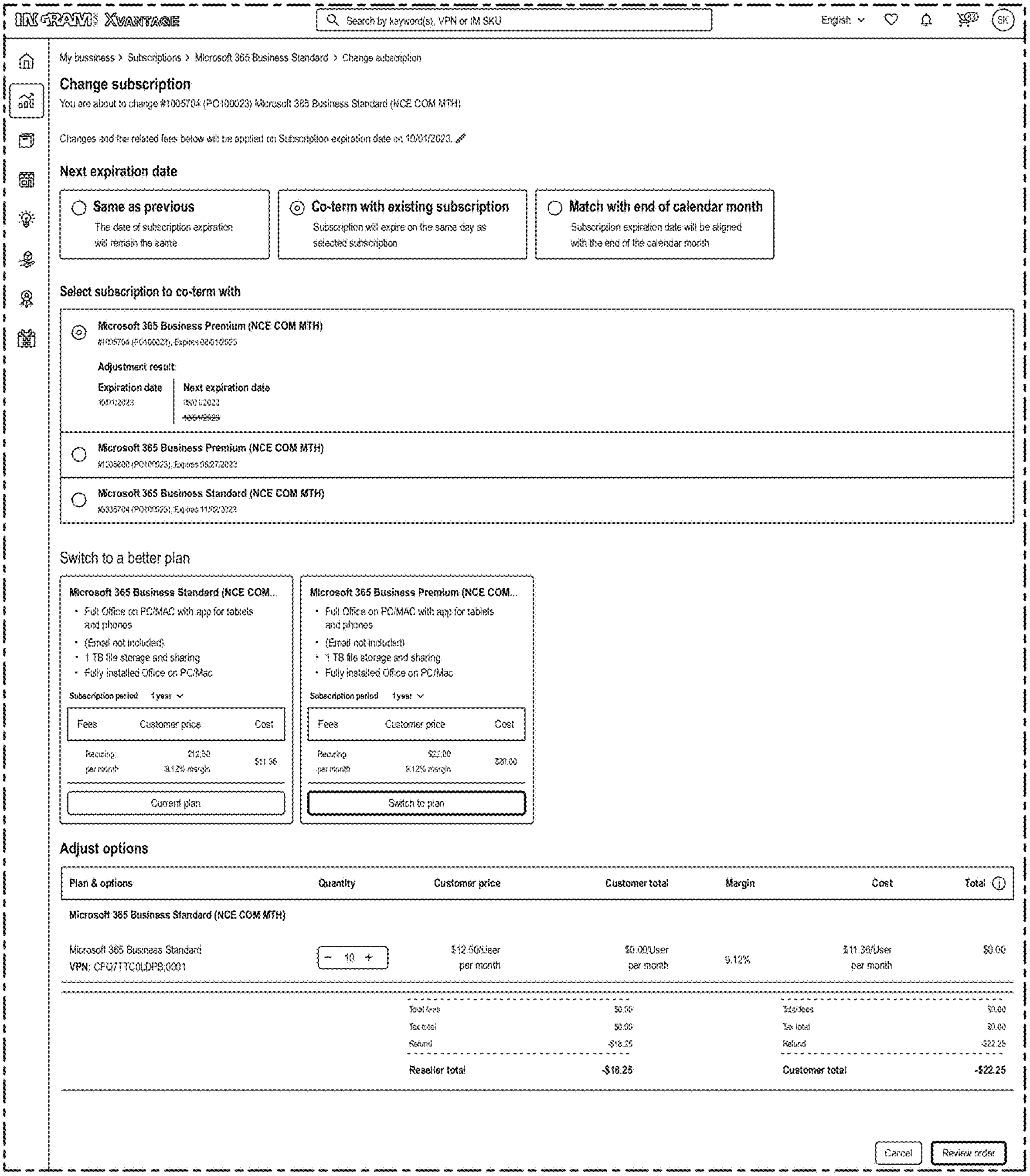

FIGS. 12A to 12Q depict various screens and functionalities of the SPoG UI related to vendor onboarding, partner dashboard, customer carts, order summary, SKU generation, order tracking, shipment tracking, subscription history, and subscription modifications. A detailed description of each figure is provided below:

FIG. 12A depicts a Vendor Onboarding Initiation screen that represents the initial step of the vendor onboarding process. It provides a form or interface where vendors can express their interest in joining the distribution ecosystem. Vendors can enter their basic information, such as company details, contact information, and product catalogs.

FIG. 12B depicts a Vendor Onboarding Guide that displays a step-by-step guide or checklist for vendors to follow during the onboarding process. It outlines the necessary tasks and requirements, ensuring that vendors have a clear understanding of the onboarding process and can progress smoothly.

FIG. 12C depicts a Vendor Onboarding Call Scheduler that facilitates scheduling calls or meetings between vendors and platform associates or representatives responsible for guiding them through the onboarding process. Vendors can select suitable time slots or request a call, ensuring effective communication and assistance throughout the onboarding journey.

FIG. 12D depicts a Vendor Onboarding Task List that presents a comprehensive task list or dashboard that outlines the specific steps and actions required for successful vendor onboarding. It provides an overview of pending tasks, completed tasks, and upcoming deadlines, helping vendors track their progress and ensure timely completion of each onboarding task.

FIG. 12E depicts a Vendor Onboarding Completion Screen that confirms the successful completion of the vendor onboarding process. It may display a congratulatory message or summary of the completed tasks, indicating that the vendor is now officially onboarded into the distribution ecosystem.

FIG. 12F depicts a Partner Dashboard that offers partners or users a centralized view of relevant information and metrics related to their partnership with the distribution ecosystem. It provides an overview of performance indicators, key data points, and actionable insights to facilitate effective collaboration and decision-making.

FIG. 12G depicts a Customer Product Cart that represents the customer's product cart, where they can add items they wish to purchase. It displays a list of selected products, quantities, prices, and other relevant details. Customers can review and modify their cart contents before proceeding to the checkout process.

FIG. 12H depicts a Customer Subscription Cart that allows customers to manage their subscription-based purchases. It displays the selected subscription plans, pricing, and duration. Customers can review and modify their subscription details before finalizing their choices.

FIG. 12I depicts a Customer Order Summary that provides a summary of the customer's order, including details such as the products or subscriptions purchased, quantities, pricing, and any applied discounts or promotions. It allows customers to review their order before confirming the purchase.

FIG. 12J depicts a Vendor SKU Generation screen for generating unique Stock Keeping Unit (SKU) codes for vendor products. It may include fields or options where vendors can specify the product details, attributes, and pricing, and the system automatically generates the corresponding SKU code.

FIGS. 12K and 12L depicts Dashboard Order Summary to display summarized information about orders placed within the distribution ecosystem. They present key order details, such as order number, customer name, product or subscription information, quantity, and order status. The dashboard provides an overview of order activity, enabling users to track and manage orders efficiently.

FIG. 12M depicts a Customer Subscription Cart that permits a customer to add, modify, or remove subscription plans. It can display a list of selected subscriptions, pricing, and renewal dates. Customers can manage their subscriptions and make changes according to their preferences and requirements.

FIG. 12N depicts a Customer Order Tracking screen that enables customers to track the status and progress of their orders within the supply chain. It displays real-time updates on order fulfillment, including processing, packaging, and shipping. Customers can monitor the movement of their orders and anticipate delivery times.

FIG. 12O depicts a Customer Shipment Tracking that provides customers with real-time tracking information about their shipments. It may include details such as the carrier, tracking number, current location, and estimated delivery date. Customers can stay informed about the whereabouts of their shipments.

FIG. 12P depicts a Customer Subscription History, that presents a historical record of the customer's subscription activities. It displays a list of previous subscriptions, including the subscription plan, duration, and status. Customers can review their subscription history, track past payments, and refer to previous subscription details.

FIG. 12Q depicts a Customer Subscription Modifications dialog, that allows customers to modify their existing subscriptions. It offers options to upgrade or downgrade subscription plans, change billing details, or adjust other subscription-related preferences. Customers can manage their subscriptions according to their evolving needs or preferences.

The depicted UI screens are not limiting. In some embodiments the UI screens of FIGS. 12A to 12Q collectively represent the diverse functionalities and features offered by the SPoG UI, providing users with a comprehensive and user-friendly interface for vendor onboarding, partnership management, customer interaction, order management, subscription management, and tracking within the distribution ecosystem.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system configured to enhance search capabilities within technology distribution platforms, comprising:

a Real-Time Data Mesh (RTDM) module configured to aggregate and standardize real-time data from various sources, including product specifications, subscription usage patterns, and market trends, wherein the RTDM is configured to establish a centralized, unified data hub;

a Single Pane of Glass User Interface (SPoG UI) module enhanced with a push model integrating advanced search functionalities, wherein the SPoG UI is configured to enable users to access relevant products and services, improve search experience and facilitate efficient navigation and discovery of products personalized to user preferences and requirements;

an Advanced Analytics and Machine-Learning (AAML) module containing specialized rules and algorithms for analyzing search queries, product compatibility, and market trends, wherein the AAML module is configured to employ analytics tools for big data processing and deep learning;

a Relevancy Search Engine Module employing algorithms via the AAML module to prioritize search results based on relevancy scores, wherein the Relevancy Search Engine Module delivers personalized search results based on individual user preferences and requirements, wherein the Relevancy Search Engine Module is configured to perform relevance detection across unstructured or inconsistent data formats without requiring prior normalization or rule-based cleansing; and a Dynamic SKU Search Engine module configured to implement algorithms and data processing methodologies to enable dynamic and responsive search functionalities personalized to users' specific needs and preferences, wherein the Dynamic SKU Search Engine module retrieves and indexes both static and dynamic SKU data from various sources, ensuring comprehensive coverage and accuracy.

2. The system of claim 1, wherein the Real-Time Data Mesh (RTDM) module interfaces with asset management systems to support efficient inventory management and product discovery.

3. The system of claim 1, wherein the Advanced Analytics and Machine-Learning (AAML) module employs sentiment analysis, trend forecasting, and behavioral analytics to understand and anticipate market and user demands.

4. The system of claim 1, wherein the Relevancy Search Engine Module incorporates fuzzy logic and Natural Language Processing (NLP) techniques to improve search query interpretation and result relevance.

5. The system of claim 1, further comprising a Personalization Engine module providing personalized recommendations and search experiences based on user profiles, preferences, and historical interactions.

6. A computerized method for integrating Generative AI and Large Language Models within a technology distribution platform, comprising:

initiating the integration process through the Single Pane of Glass User Interface (SPoG UI) module, gathering initial user preferences and system requirements;

executing preliminary analytics using the Advanced Analytics and Machine-Learning (AAML) module to identify specific requirements for integration, leveraging data structures within the Real-Time Data Mesh (RTDM);

efficiently gathering relevant data for integration from various sources using the RTDM module, employing data warehousing and data lakes to handle both structured and unstructured data efficiently;

processing users' requests through an Integration Engine within the Relevancy Search Engine Module, via a Dynamic SKU Search Engine and Personalization Engine, wherein the Relevancy Search Engine Module is configured to perform relevance detection across unstructured or inconsistent data formats without requiring prior normalization or rule-based cleansing;

validating the proposed integration plan using Real-Time Relevancy Adjustment Module, ensuring accuracy and feasibility with advanced error-checking mechanisms;

presenting the proposed integration plan back to the user through SPoG UI for review and approval;

analyzing the integration process post-implementation using machine learning models within AAML Module and continuously monitoring the performance of the integrated Generative AI and Large Language Models.

7. The computerized method of claim 6, wherein the preliminary analytics executed by the Advanced Analytics and Machine-Learning (AAML) module include assessing the compatibility of existing data structures with Generative AI and Large Language Models.

8. The computerized method of claim 6, wherein the relevant data for integration is continuously aggregated and standardized from various sources using the Real-Time Data Mesh (RTDM) module, ensuring perpetual integration with Generative AI and Large Language Models.

9. The computerized method of claim 6, wherein the Integration Engine within the Relevancy Search Engine Module employs algorithms such as clustering and association rule mining to facilitate a technical integration process by identifying patterns and dependencies within the data.

10. The computerized method of claim 6, further comprising validating the proposed integration plan using anomaly detection and outlier analysis conducted by the Real-Time Relevancy Adjustment Module to minimize the risk of errors or inconsistencies.

11. The computerized method of claim 6, wherein the integration plan is presented back to the user through the Single Pane of Glass User Interface (SPoG UI) module for review and approval, fostering continuous collaboration between users and the system.

12. The computerized method of claim 6, wherein machine learning models within the Advanced Analytics and Machine-Learning (AAML) module continuously monitor the performance of the integrated Generative AI and Large Language Models, identifying areas for improvement and optimization based on real-time data updates.

13. A computerized method for implementing enhanced relevancy searches within a technology distribution platform, the computerized method comprising:

initiating an enhancement process by queries from a user through a Single Pane of Glass User Interface (SPoG UI) module;

analyzing the incoming search queries using one or more Natural Language Processing (NLP) algorithms within the Advanced Analytics and Machine-Learning (AAML) module;

processing the interpreted search queries via a Fuzzy Logic and NLP Enhancement Module within a Relevancy Search Engine Module, wherein the Relevancy Search Engine Module is configured to perform relevance detection across unstructured or inconsistent data formats without requiring prior normalization or rule-based cleansing;

optimizing search results, by a dynamic SKU search engine and/or a personalization engine based on the interpreted queries;

continuously monitoring, by a real-Time Relevancy Adjustment Modul, feedback to adapt search results dynamically;

presenting, by the SPoG UI, the optimized search results to the user to facilitate an intuitive browsing experience;

measuring performance of the enhancements on one or more search relevancy and/or user engagement metrics, analyzing performance indicators to assess effectiveness;

iteratively refining one or more algorithms based on the effectiveness assessment to further enhance search relevancy and user experience.

14. The method of claim 13, wherein the enhancement process initiated by the system comprises receiving user queries through the Single Pane of Glass User Interface (SPoG UI) module, which serves as the primary interface for user interaction.

15. The method of claim 13, wherein the interpreted search queries are processed through the Fuzzy Logic and Natural Language Processing (NLP) Enhancement Module within the Relevancy Search Engine Module, utilizing fuzzy logic algorithms to handle imprecise or uncertain information inherent in vague search queries.

16. The method of claim 13, further comprising dynamically adjusting search relevancy in response to one or more changing conditions selected from customer segment, personalization preferences, and historical interactions, enabling current search results.

17. The method of claim 13, wherein the dynamic SKU search engine retrieves and indexes dynamic and static SKU data from one or more sources selected from inventory systems, product databases, and external APIs, ensuring comprehensive accuracy for search queries.

18. The method of claim 13, wherein the measuring the performance of real-time data mesh integration and dynamic SKU searches on search relevancy and user engagement metrics is measured based on key performance indicators selected from click-through rates, time spent on the platform, and/or conversion rates, to assess the effectiveness of the enhancements.

* * * * *